(12) United States Patent
Chen et al.

(10) Patent No.: US 12,445,825 B2
(45) Date of Patent: Oct. 14, 2025

(54) COMMUNICATION METHOD AND APPARATUS

(71) Applicant: Huawei Technologies Co., Ltd., Shenzhen (CN)

(72) Inventors: Jing Chen, Shenzhen (CN); Chuankui Jiang, Shanghai (CN); Zhenyu Tao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 733 days.

(21) Appl. No.: 17/698,665

(22) Filed: Mar. 18, 2022

(65) Prior Publication Data

US 2022/0210702 A1 Jun. 30, 2022

Related U.S. Application Data

(63) Continuation of application No. PCT/CN2020/110627, filed on Aug. 21, 2020.

(30) Foreign Application Priority Data

Sep. 19, 2019 (CN) .......................... 201910888796.1
Jun. 16, 2020 (CN) .......................... 202010550068.2

(51) Int. Cl.
*H04W 8/00* (2009.01)
*H04W 36/00* (2009.01)
(Continued)

(52) U.S. Cl.
CPC ..... *H04W 8/005* (2013.01); *H04W 36/00222* (2023.05); *H04W 48/18* (2013.01); *H04W 60/04* (2013.01)

(58) Field of Classification Search
CPC .................................................... H04W 8/005
See application file for complete search history.

(56) References Cited

U.S. PATENT DOCUMENTS 11,528,761 B2 * 12/2022 Zong ..................... H04W 8/02
11,711,729 B2 * 7/2023 Shi ....................... H04W 36/00
370/331
(Continued)

FOREIGN PATENT DOCUMENTS

CN 107087255 A 8/2017
CN 108924849 A 11/2018
(Continued)

OTHER PUBLICATIONS

Ericsson, et al., "DNS procedures to support Ethernet PDN", 3GPP TSG-CT WG4 Meeting #93 C4-193721, Wroclaw, Poland; Aug. 26-30, 2019, 2 pages.
(Continued)

*Primary Examiner* — Abdeltif Ajid
(74) *Attorney, Agent, or Firm* — Conley Rose, P.C.

(57) ABSTRACT

A communication method and apparatus, where the method includes: A first mobility management network element in a first network obtains information about N intermediate session management network elements that are capable of serving a terminal in the first network, and determines that a combined intermediate session management network element (which is capable of providing session management in the first network and in a second network) in the N intermediate session management network elements is a first intermediate session management network element corresponding to a first session of the terminal in the first network, such that overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

20 Claims, 18 Drawing Sheets

(51) Int. Cl.
*H04W 48/18* (2009.01)
*H04W 60/04* (2009.01)

(56) References Cited

U.S. PATENT DOCUMENTS

| | | |
|---|---|---|
| 2018/0270715 A1 | 9/2018 | Lee et al. |
| 2018/0270877 A1 | 9/2018 | Lee et al. |
| 2018/0288693 A1 | 10/2018 | Li et al. |
| 2018/0324646 A1 | 11/2018 | Lee et al. |
| 2018/0352483 A1 | 12/2018 | Youn et al. |
| 2019/0246370 A1 | 8/2019 | Xu et al. |
| 2019/0261233 A1 | 8/2019 | Duan et al. |
| 2019/0268422 A1 | 8/2019 | Yu et al. |
| 2020/0007590 A1* | 1/2020 | Dodd-Noble ....... H04L 65/1069 |
| 2020/0029375 A1 | 1/2020 | Yao et al. |
| 2020/0221539 A1 | 7/2020 | Yang et al. |
| 2020/0329403 A1 | 10/2020 | Yuan et al. |
| 2020/0344827 A1 | 10/2020 | Zong et al. |
| 2020/0383151 A1* | 12/2020 | Wang ................. H04W 36/0066 |
| 2021/0185585 A1* | 6/2021 | Chen ................. H04W 36/0027 |

FOREIGN PATENT DOCUMENTS

| | | |
|---|---|---|
| CN | 109673026 A | 4/2019 |
| CN | 109981316 A | 7/2019 |
| CN | 110035040 A | 7/2019 |
| CN | 110035423 A | 7/2019 |
| CN | 110149665 A | 8/2019 |
| CN | 108353352 B | 6/2020 |
| WO | 2018082221 A1 | 5/2018 |
| WO | 2018086123 A1 | 5/2018 |
| WO | 2018142021 A1 | 8/2018 |
| WO | WO-2019121957 A1 * | 6/2019 ........ H04W 36/1443 |
| WO | 2019157942 A1 | 8/2019 |

OTHER PUBLICATIONS

Daigle, L., et al., "Domain-Based Application Service Location Using SRV RRs and the Dynamic Delegation Discovery Service (DDDS)," Network Working Group, Request for Comments: 3958, Jan. 2005, 25 pages.

3rd Generation Partnership Project; Technical Specification Group Core Network and Terminals; Numbering, addressing and identification (Release 15), 3GPP TS 23.003 V15.7.0, Jun. 2019, 131 pages.

3GPP TS 23.501 V16.1.0, Jun. 2019, "3rd Generation Partnership Project; Technical Specification Group Services and System Aspects; System Architecture for the 5G System; Stage 2 (Release 16)," 368 pages.

3GPPTS 29.510 V16.1.0, Sep. 2019, "3rd Generation Partnership Project; Technical Specification Group Core Network and Terminals; 5G System;Network Function Repository Services; Stage 3 (Release 16)," 149 pages.

Nokia et al., "Extensions for I-SMF and I-UPF selection",3GPP TSG-CT WG4 Meeting #93 C4-193540,Wroclaw, Poland; Aug. 26-30, 2019, Total 4 Pages.

* cited by examiner

1001: When a terminal needs to be migrated from a source network to a target network, a second AMF in a first network obtains information about N intermediate session management network elements corresponding to a session of the terminal in the source network, where the information about the N intermediate session management network elements is used to indicate a type of each of the N intermediate session management network elements, and the type includes an independent intermediate session management network element or an SGW-C+I-SMF 1002: The second AMF determines, based on the types of the N intermediate session management network elements, a second intermediate session management network element corresponding to a session of the terminal in the target network

FIG. 10

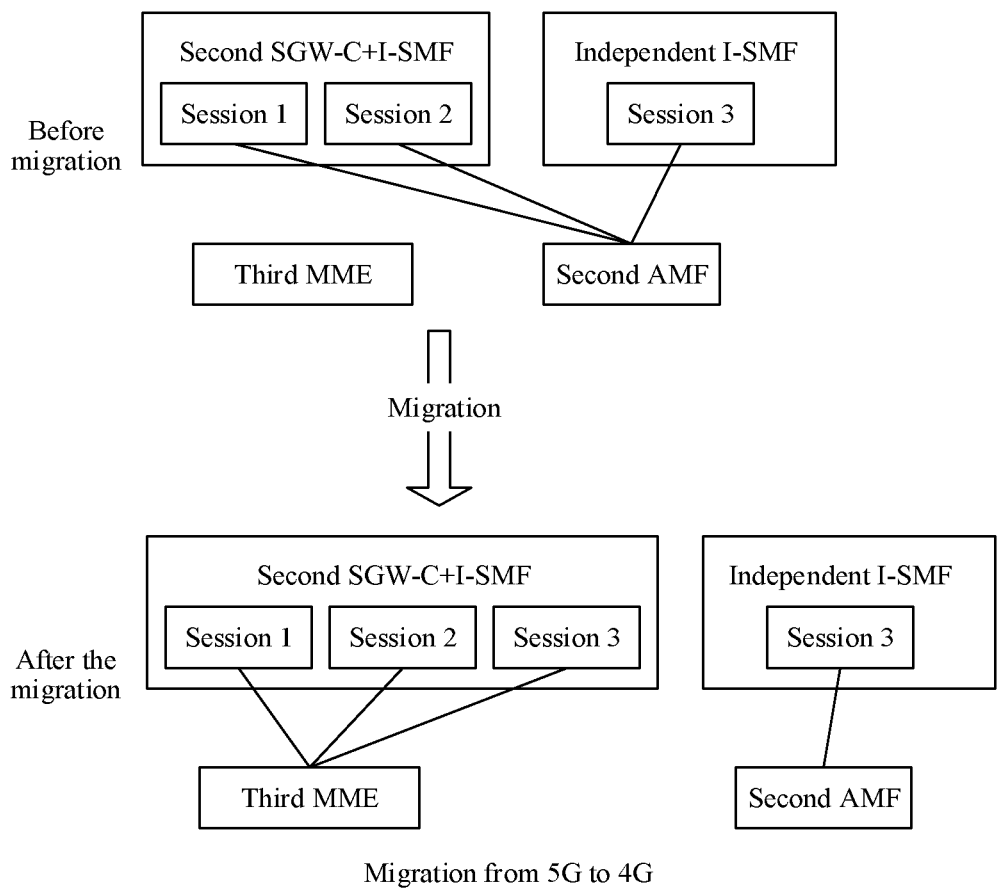

Migration from 5G to 4G

FIG. 11

COMMUNICATION METHOD AND APPARATUS

CROSS-REFERENCE TO RELATED APPLICATIONS

This is a continuation of International Patent Application No. PCT/CN2020/110627, filed on Aug. 21, 2020, which claims priority to Chinese Patent Application No. 201910888796.1, filed on Sep. 19, 2019, and Chinese Patent Application No. 202010550068.2, filed on Jun. 16, 2020. All of the aforementioned patent applications are hereby incorporated by reference in their entireties.

TECHNICAL FIELD

This application relates to the field of communication technologies, and in particular, to a communication method and apparatus.

BACKGROUND

For a terminal that can access a 4th generation (4G) network and a 5th generation (5G) network, how to ensure that a service of the terminal is not affected when the terminal is moved between the 4G network and the 5G network, to improve overall communication efficiency of the network is a problem that urgently needs to be resolved.

SUMMARY

Embodiments of this application provide a communication method and apparatus, to improve overall communication efficiency of a network.

To achieve the foregoing objective, this application provides the following technical solutions.

According to a first aspect, a communication method is provided. The method includes: A first mobility management network element in a first network obtains information about N intermediate session management network elements that are capable of serving a terminal in the first network. If the N intermediate session management network elements include a combined intermediate session management network element, the first mobility management network element determines that the combined intermediate session management network element is a first intermediate session management network element corresponding to a first session of the terminal in the first network, and N is an integer greater than 0. The combined intermediate session management network element is capable of providing session management in the first network and is capable of providing session management in a second network. The first network may be a 5G network. In this case, the second network may be a 4G network. Alternatively, the first network may be a 4G network. In this case, the second network may be a 5G network. According to the method provided in the first aspect, when selecting an intermediate session management network element, the first mobility management network element preferentially selects the combined intermediate session management network element for the terminal, to improve overall communication efficiency of the network. For example, network address resources are reduced to simplify network planning and deployment complexity, a quantity of nodes in the network is reduced to simplify network operation and maintenance workload, and signaling between the nodes in the network is reduced to reduce network service load.

In a possible implementation, the first network is the 5G network and the second network is the 4G network, and the method is applied to the following scenario: The first session is the $1^{st}$ session established by the terminal on the first mobility management network element; or an intermediate session management network element corresponding to a session that has been established by the terminal on the first mobility management network element is not the combined intermediate session management network element.

In a possible implementation, the first network is the 5G network and the second network is a 4G network; and that the first mobility management network element determines that the combined intermediate session management network element is a first intermediate session management network element corresponding to a first session of the terminal in the first network includes: When an intermediate session management network element corresponding to at least one session that has been established by the terminal on the first mobility management network element is the combined intermediate session management network element, the first mobility management network element determines that the combined intermediate session management network element is the first intermediate session management network element corresponding to the first session. In this possible implementation, the combined intermediate session management network element does not need to re-establish the session, but only needs to update the session. This can avoid a waste of resources.

In a possible implementation, the first network is the 4G network and the second network is the 5G network, and the method is applied to the following scenario: The first session is the $1^{st}$ session established by the terminal on the first mobility management network element.

In a possible implementation, an intermediate session management network element that is in the information about the N intermediate session management network elements and that includes indication information is the combined intermediate session management network element, and the method further includes: The first mobility management network element determines the combined intermediate session management network element based on the indication information.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, and the indication information is a node name of the combined intermediate session management network element when the combined intermediate session management network element serves as the anchor session management network element in the 4G network.

According to a second aspect, a communication method is provided. The method includes: When a terminal needs to be migrated from a source network to a target network, a second mobility management network element in a first network obtains information about N intermediate session management network elements corresponding to a session of the terminal in the source network, and determines, based on types of the N intermediate session management network elements, a second intermediate session management network element corresponding to a session of the terminal in the target network. The information about the N intermediate session management network elements is used to indicate a type of each of the N intermediate session management network elements, the type includes an independent intermediate session management network element or a combined intermediate session management network element, the combined intermediate session management network element is capable of providing session management in the first network and is capable of providing session management in a second network, the independent intermediate session management network element is capable of providing session management only in either one of the first network and the second network; the source network is the first network and the target network is the second network, or the source network is the second network and the target network is the first network; and N is an integer greater than 0. The first network may be a 5G network and the second network may be a 4G network. According to the method provided in the second aspect, when the terminal needs to be migrated from the source network to the target network, the intermediate session management network element corresponding to the session of the terminal in the target network may be determined depending on whether the intermediate session management network element is the combined intermediate session management network element. If the combined intermediate session management network element needs to be determined for the session of the terminal in the target network, the combined intermediate session management network element may be preferentially determined for the session of the terminal in the target network, such that the session of the terminal is anchored to the combined intermediate session management network element after the network migration. Therefore, overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

In a possible implementation, the source network is the first network, the first network is the 5G network, the target network is the second network, and the second network is the 4G network; and that the second mobility management network element determines, based on types of the N intermediate session management network elements, a second intermediate session management network element corresponding to a session of the terminal in the target network includes: If the N intermediate session management network elements include the combined intermediate session management network element, the second mobility management network element selects the combined intermediate session management network element in the N intermediate session management network elements as the second intermediate session management network element corresponding to the session of the terminal in the second network.

In a possible implementation, the method further includes: The second mobility management network element sends a relocation request to a third mobility management network element in the second network, where the relocation request includes information about the second intermediate session management network element and indication information, and the indication information is used to indicate that the second intermediate session management network element is the combined intermediate session management network element.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an access and mobility function (AMF) based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

In a possible implementation, the source network is the second network, the second network is the 4G network, the target network is the first network, the first network is the 5G network, and N=1. The method further includes: The second mobility management network element obtains information about M intermediate session management network elements that are capable of serving the terminal in the first network, where the information about the M intermediate session management network elements is used to indicate a type of each of the M intermediate session management network elements. That the second mobility management network element determines, based on types of the N intermediate session management network elements, a second intermediate session management network element corresponding to a session of the terminal in the target network includes: The second mobility management network element determines, based on the types of the N intermediate session management network elements and the types of the M intermediate session management network elements, the second intermediate session management network element corresponding to a second session of the terminal in the first network.

In a possible implementation, that the second mobility management network element determines, based on the types of the N intermediate session management network elements and the types of the M intermediate session management network elements, the second intermediate session management network element corresponding to a second session of the terminal in the first network includes: If the N intermediate session management network elements include the combined intermediate session management network element, and the combined intermediate session management network element belongs to the M intermediate session management network elements, the second mobility management network element preferentially selects, from the M intermediate session management network elements, the combined intermediate session management network element as the second intermediate session management network element corresponding to the second session; or if the N intermediate session management network elements do not include the combined intermediate session management network element, or the N intermediate session management network elements include the combined intermediate session management network element but the combined intermediate session management network element does not belong to the M intermediate session management network elements, the second mobility management network element preferentially selects, from the M intermediate session management network elements, a combined intermediate session management network element as the second intermediate session management network element corresponding to the second session. If the N intermediate session management network elements include the combined intermediate session management network element, and the combined intermediate session management network element belongs to the M intermediate session management network elements, the combined intermediate session management network element selected using this possible implementation does not need to re-establish the session, but only needs to update the session. This can avoid a waste of resources.

In a possible implementation, the method further includes: The second mobility management network element sends a request message to the combined intermediate session management network element, where the request message is used to request the combined intermediate session management network element to update the corresponding session, and the request message includes a session identifier allocated by the combined intermediate session management network element to the terminal in the second network.

According to a third aspect, a communication method is provided. The method includes: A third mobility management network element in a second network receives a relocation request from a second mobility management network element in a first network, where the relocation request includes information about a second intermediate session management network element and indication information, the second intermediate session management network element is an intermediate session management network element that is determined by the second mobility management network element for a terminal and that corresponds to a session of the terminal in the second network, the indication information is used to indicate that the second intermediate session management network element is a combined intermediate session management network element, and the combined intermediate session management network element is capable of providing session management in the first network and is capable of providing session management in the second network; the third mobility management network element obtains information about M intermediate session management network elements that are capable of serving the terminal in the second network; and the third mobility management network element determines, based on the relocation request and the M intermediate session management network elements, that one combined intermediate session management network element is the intermediate session management network element corresponding to the session of the terminal in the second network. The first network may be a 5G network and the second network may be a 4G network. According to the method provided in the third aspect, when the terminal needs to be migrated from the 5G network to the 4G network, the combined intermediate session management network element may be preferentially determined for the session of the terminal in the 4G network, such that the session of the terminal is anchored to the combined intermediate session management network element after the network migration. Therefore, overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

In a possible implementation, the method further includes: If the second intermediate session management network element belongs to the M intermediate session management network elements, the third mobility management network element determines that the second intermediate session management network element is the intermediate session management network element corresponding to the session of the terminal in the second network; or if the second intermediate session management network element does not belong to the M intermediate session management network elements, the third mobility management network element determines that one combined intermediate session management network element in the M intermediate session management network elements is the intermediate session management network element corresponding to the session of the terminal in the second network. If the second intermediate session management network element belongs to the M intermediate session management network elements, the combined intermediate session management network element selected using this possible implementation does not need to re-establish the session, but only needs to update the session. This can avoid a waste of resources.

According to a fourth aspect, a communication method is provided. The method includes: When a terminal needs to be migrated from a first network to a second network, a fourth mobility management network element in the second network obtains information about N intermediate session management network elements that are capable of serving the terminal in the second network; the fourth mobility management network element obtains, from a subscriber data management network element, information about M intermediate session management network elements that serve the terminal in the first network; and if a session created by the terminal on the fourth mobility management network element is the $1^{st}$ session, the fourth mobility management network element determines, based on types of the N intermediate session management network elements and the M intermediate session management network elements, an intermediate session management network element corresponding to the $1^{st}$ session, where the types include an independent intermediate session management network element and a combined intermediate session management network element, the combined intermediate session management network element is capable of providing session management in the first network and is capable of providing session management in the second network, and the independent intermediate session management network element is capable of providing session management only in either one of the first network and the second network. The first network may be a 5G network. In this case, the second network may be a 4G network. Alternatively, the first network may be a 4G network. In this case, the second network may be a 5G network. According to the method provided in the fourth aspect, when the terminal needs to be migrated from the first network to the second network, the combined intermediate session management network element may be preferentially determined for the session of the terminal in the second network, such that the session of the terminal is anchored to the combined intermediate session management network element after the network migration. Therefore, overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

In a possible implementation, that the fourth mobility management network element determines, based on types of the N intermediate session management network elements and the M intermediate session management network elements, an intermediate session management network element corresponding to the $1^{st}$ session includes: If there is a combined intermediate session management network element belonging to both the M intermediate session management network elements and the N intermediate session management network elements, the fourth mobility management network element selects the combined intermediate session management network element belonging to both the M intermediate session management network elements and the N intermediate session management network elements as the intermediate session management network element corresponding to the $1^{st}$ session; or if the M intermediate session management network elements do not include the combined intermediate session management network element, or the M intermediate session management network elements include the combined intermediate session management network element but the combined intermediate session management network element in the M intermediate session management network elements does not belong to the N intermediate session management network elements, the fourth mobility management network element preferentially selects a combined intermediate session management network element in the N intermediate session management network elements as the intermediate session management network element corresponding to the $1^{st}$ session. If the combined intermediate session management network element belongs to both the M intermediate session management network elements and the N intermediate session management network elements, the combined intermediate session management network element selected using this possible implementation does not need to re-establish the session, but only needs to update the session. This can avoid a waste of resources.

In a possible implementation, the first network is the 4G network and the second network is the 5G network, and the method further includes: If the session created by the terminal on the fourth mobility management network element is not the $1^{st}$ session, the fourth mobility management network element preferentially selects a combined intermediate session management network element in an intermediate session management network element corresponding to a session that has been established by the terminal on the fourth mobility management network element as an intermediate session management network element corresponding to the created session.

According to a fifth aspect, a communication method is provided. The method includes: A network discovery network element in a first network receives a registration request from an intermediate session management network element in the first network, where the registration request includes information about the intermediate session management network element, the information about the intermediate session management network element includes indication information, the indication information is used to indicate that the intermediate session management network element is a combined intermediate session management network element, and the combined intermediate session management network element is capable of providing session management in the first network and is capable of providing session management in a second network; and the network discovery network element sends a registration response to the intermediate session management network element. The first network may be a 5G network and the second network may be a 4G network. According to the method provided in the fifth aspect, the combined intermediate session management network element may register with the network discovery network element, and the network discovery network element may determine, using the carried indication information, which intermediate session management network elements are combined intermediate session management network elements and which intermediate session management network elements are independent intermediate session management network elements, to support a subsequent process such as intermediate session management network element selection.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

According to a sixth aspect, a communication method is provided. The method includes: An intermediate session management network element in a first network sends a registration request to a network discovery network element in the first network, where the registration request includes information about the intermediate session management network element, the information about the intermediate session management network element includes indication information, the indication information is used to indicate that the intermediate session management network element is a combined intermediate session management network element, and the combined intermediate session management network element is capable of providing session management in the first network and is capable of providing session management in a second network; and the intermediate session management network element receives a registration response from the network discovery network element. The first network may be a 5G network and the second network may be a 4G network. According to the method provided in the sixth aspect, the combined intermediate session management network element may register with the network discovery network element, and the network discovery network element may determine, using the carried indication information, which intermediate session management network elements are combined intermediate session management network elements and which intermediate session management network elements are independent intermediate session management network elements, to support a subsequent process such as intermediate session management network element selection.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

According to a seventh aspect, a communication method is provided. The method includes: A subscriber data management network element receives a registration request from a combined intermediate session management network element, where the registration request includes an identifier of an intermediate session management network element that is in a second network and that corresponds to a session managed by the combined intermediate session management network element in a first network, and the combined intermediate session management network element is capable of providing session management in the first network and is capable of providing session management in the second network; and the subscriber data management network element sends a registration response to the combined intermediate session management network element. According to the method provided in the seventh aspect, when no N26 interface exists between an AMF and a mobility management entity (MME), the subscriber data management network element may obtain the identifier of the intermediate session management network element that is in the second network and that corresponds to the session managed by the combined intermediate session management network element in the first network. As such, the identifier of the intermediate session management network element that is in the second network and that corresponds to the session is sent to a mobility management network element in the second network as required by the mobility management network element in the second network.

In a possible implementation, the identifier of the intermediate session management network element that is in the second network and that corresponds to the session managed by the combined intermediate session management network element in the first network is derived using a node name that is of an anchor session management network element in the second network and that corresponds to the session managed by the combined intermediate session management network element in the first network.

According to an eighth aspect, a communication method is provided. The method includes: A combined intermediate session management network element sends a registration request to a subscriber data management network element, where the registration request includes an identifier of an intermediate session management network element that is in a second network and that corresponds to a session managed by the combined intermediate session management network element in a first network, and the combined intermediate session management network element is capable of providing session management in the first network and is capable of providing session management in the second network; and the combined intermediate session management network element receives a registration response from the subscriber data management network element. According to the method provided in the eighth aspect, when no N26 interface exists between an AMF and an MME, the subscriber data management network element may obtain the identifier of the intermediate session management network element that is in the second network and that corresponds to the session managed by the combined intermediate session management network element in the first network, such that the identifier of the intermediate session management network element that is in the second network and that corresponds to the session is sent to a mobility management network element in the second network as required.

In a possible implementation, the identifier of the intermediate session management network element that is in the second network and that corresponds to the session managed by the combined intermediate session management network element in the first network is derived using a node name that is of an anchor session management network element in the second network and that corresponds to the session managed by the combined intermediate session management network element in the first network.

According to a ninth aspect, a communication apparatus is provided. The apparatus is located in a first network and includes: an obtaining unit configured to obtain information about N intermediate session management network elements that are capable of serving a terminal in a first network, where the N intermediate session management network elements include a combined intermediate session management network element, the combined intermediate session management network element is capable of providing session management in the first network and is capable of providing session management in a second network, and N is an integer greater than 0; and a determining unit configured to determine that the combined intermediate session management network element is a first intermediate session management network element corresponding to a first session of the terminal in the first network.

In a possible implementation, the first network is a 5G network, the second network is a 4G network, and the first session is the $1^{st}$ session established by the terminal on the apparatus; or an intermediate session management network element corresponding to a session that has been established by the terminal on the apparatus is not the combined intermediate session management network element.

In a possible implementation, the first network is a 5G network and the second network is a 4G network; and the determining unit is configured to: when an intermediate session management network element corresponding to at least one session that has been established by the terminal on the apparatus is the combined intermediate session management network element, determine that the combined intermediate session management network element is the first intermediate session management network element corresponding to the first session.

In a possible implementation, the first network is a 4G network and the second network is a 5G network, and the first session is the $1^{st}$ session established by the terminal on the apparatus.

In a possible implementation, an intermediate session management network element that is in the information about the N intermediate session management network elements and that includes indication information is the combined intermediate session management network element, and the determining unit is further configured to determine the combined intermediate session management network element based on the indication information.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, and the indication information is a node name of the combined intermediate session management network element when the combined intermediate session management network element serves as the anchor session management network element in the 4G network.

According to a tenth aspect, a communication apparatus is provided. The apparatus is located in a first network and includes: an obtaining unit configured to: when a terminal needs to be migrated from a source network to a target network, obtain information about N intermediate session management network elements corresponding to a session of the terminal in the source network, where the information about the N intermediate session management network elements is used to indicate a type of each of the N intermediate session management network elements, the type includes an independent intermediate session management network element or a combined intermediate session management network element, the combined intermediate session management network element is capable of providing session management in the first network and is capable of providing session management in a second network, the independent intermediate session management network element is capable of providing session management only in either one of the first network and the second network; the source network is the first network and the target network is the second network, or the source network is the second network and the target network is the first network; and N is an integer greater than 0; and a determining unit configured to determine, based on the types of the N intermediate session management network elements, a second intermediate session management network element corresponding to a session of the terminal in the target network.

In a possible implementation, the source network is the first network, the first network is a 5G network, the target network is the second network, and the second network is a 4G network; and the determining unit is configured to: if the N intermediate session management network elements include the combined intermediate session management network element, select the combined intermediate session management network element in the N intermediate session management network elements as the second intermediate session management network element corresponding to the session of the terminal in the second network.

In a possible implementation, the apparatus further includes a sending unit configured to send a relocation request to a third mobility management network element in the second network, where the relocation request includes information about the second intermediate session management network element and indication information, and the indication information is used to indicate that the second intermediate session management network element is the combined intermediate session management network element.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

In a possible implementation, the source network is a second network, the second network is a 4G network, the target network is a first network, the first network is a 5G network, and N=1; the obtaining unit is further configured to obtain information about M intermediate session management network elements that can serve the terminal in the first network, where the information about the M intermediate session management network elements is used to indicate a type of each of the M intermediate session management network elements; and; the determining unit is configured to determine, according to types of the N intermediate session management network elements and types of the M intermediate session management network elements, the second intermediate session management network element corresponding to the second session of the terminal in the first network.

In a possible implementation, the determining unit is configured to: if the N intermediate session management network elements include the combined intermediate session management network element, and the combined intermediate session management network element belongs to the M intermediate session management network elements, preferentially select, from the M intermediate session management network elements, the combined intermediate session management network element as the second intermediate session management network element corresponding to the second session; or the determining unit is configured to: if the N intermediate session management network elements do not include the combined intermediate session management network element, or the N intermediate session management network elements include the combined intermediate session management network element but the combined intermediate session management network element does not belong to the M intermediate session management network elements, preferentially select, from the M intermediate session management network elements, a combined intermediate session management network element as the second intermediate session management network element corresponding to the second session.

In a possible implementation, the sending unit is further configured to send a request message to the combined intermediate session management network element, where the request message is used to request the combined intermediate session management network element to update the second session, and the request message includes a session identifier allocated by the combined intermediate session management network element to the terminal in the second network.

According to an eleventh aspect, a communication apparatus is provided. The apparatus is located in a second network and includes: a communication unit configured to receive a relocation request from a second mobility management network element in a first network, where the relocation request includes information about a second intermediate session management network element and indication information, the second intermediate session management network element is an intermediate session management network element that is determined by the second mobility management network element for a terminal and that corresponds to a session of the terminal in the second network, the indication information is used to indicate that the second intermediate session management network element is a combined intermediate session management network element, and the combined intermediate session management network element is capable of providing session management in the first network and is capable of providing session management in the second network; and a processing unit configured to obtain information about M intermediate session management network elements that are capable of serving the terminal in the second network, where the processing unit is further configured to determine, based on the relocation request and the M intermediate session management network elements, that one combined intermediate session management network element is the intermediate session management network element corresponding to the session of the terminal in the second network.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

In a possible implementation, if the second intermediate session management network element belongs to the M intermediate session management network elements, the processing unit is configured to determine that the second intermediate session management network element is the intermediate session management network element corresponding to the session of the terminal in the second network; or if the second intermediate session management network element does not belong to the M intermediate session management network elements, the processing unit is configured to determine that one combined intermediate session management network element in the M intermediate session management network elements is the intermediate session management network element corresponding to the session of the terminal in the second network.

According to a twelfth aspect, a communication apparatus is provided. The apparatus is located in a second network and includes: an obtaining unit configured to: when a terminal needs to be migrated from a first network to a second network, obtain information about N intermediate session management network elements that are capable of serving the terminal in the second network, where the obtaining unit is further configured to obtain, from a subscriber data management network element, information about M intermediate session management network elements that serve the terminal in the first network; and a determining unit configured to: if a session created by the terminal on the apparatus is the $1^{st}$ session, determine, based on types of the N intermediate session management network elements and the M intermediate session management network elements, an intermediate session management network element corresponding to the $1^{st}$ session, where the types include an independent intermediate session management network element and a combined intermediate session management network element, the combined intermediate session management network element is capable of providing session management in the first network and is capable of providing session management in the second network, and the independent intermediate session management network element is capable of providing session management only in either one of the first network and the second network.

In a possible implementation, the determining unit is configured to: if there is a combined intermediate session management network element belonging to both the M intermediate session management network elements and the N intermediate session management network elements, select the combined intermediate session management network element belonging to both the M intermediate session management network elements and the N intermediate session management network elements as the intermediate session management network element corresponding to the $1^{st}$ session; and the determining unit is configured to: if the M intermediate session management network elements do not include the combined intermediate session management network element, or the M intermediate session management network elements include the combined intermediate session management network element but the combined intermediate session management network element in the M intermediate session management network elements does not belong to the N intermediate session management network elements, preferentially select a combined intermediate session management network element in the N intermediate session management network elements as the intermediate session management network element corresponding to the $1^{st}$ session.

In a possible implementation, the first network is a 4G network and the second network is a 5G network, and the determining unit is further configured to: if the session created by the terminal on the apparatus is not the $1^{st}$ session, preferentially select a combined intermediate session management network element in an intermediate session management network element corresponding to a session that has been established by the terminal on the apparatus as an intermediate session management network element corresponding to the created session.

According to a thirteenth aspect, a communication apparatus is provided. The apparatus is located in a first network and includes a processing unit and a communication unit. The processing unit is configured to receive a registration request from an intermediate session management network element in the first network through the communication unit, where the registration request includes information about the intermediate session management network element, the information about the intermediate session management network element includes indication information, the indication information is used to indicate that the intermediate session management network element is a combined intermediate session management network element, and the combined intermediate session management network element is capable of providing session management in the first network and is capable of providing session management in a second network. The processing unit is further configured to send a registration response to the intermediate session management network element through the communication unit. The first network may be a 5G network and the second network may be a 4G network.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

According to a fourteenth aspect, a communication apparatus is provided. The apparatus is located in a first network and includes a processing unit and a communication unit. The processing unit is configured to send a registration request to a network discovery network element in the first network through the communication unit, where the registration request includes information about an intermediate session management network element, the information about the intermediate session management network element includes indication information, the indication information is used to indicate that the intermediate session management network element is a combined intermediate session management network element, and the combined intermediate session management network element is capable of providing session management in the first network and is capable of providing session management in a second network. The processing unit is further configured to receive a registration response from the network discovery network element through the communication unit. The first network may be a 5G network and the second network may be a 4G network.

In a possible implementation, the indication information is a node name of the combined intermediate session management network element when the combined intermediate session management network element serves as an intermediate session management network element in the 4G network.

In a possible implementation, the combined intermediate session management network element further combines an anchor session management network element in the 4G network, the indication information is a node name of the combined intermediate session management network element when the combined intermediate session management network element serves as an intermediate session management network element in the 4G network, and the node name of the combined intermediate session management network element when the combined intermediate session management network element serves as the intermediate session management network element in the 4G network is associated with a node name of the combined intermediate session management network element when the combined intermediate session management network element serves as the anchor session management network element in the 4G network.

The node name of the combined intermediate session management network element when the combined intermediate session management network element serves as the intermediate session management network element in the 4G network may be derived by an AMF based on the node name of the combined intermediate session management network element when the combined intermediate session management network element serves as the anchor session management network element in the 4G network, or may be derived by the combined intermediate session management network element based on the node name of the combined intermediate session management network element when the combined intermediate session management network element serves as the anchor session management network element in the 4G network.

According to a fifteenth aspect, a communication apparatus is provided. The apparatus includes a processing unit and a communication unit. The processing unit is configured to receive a registration request from a combined intermediate session management network element through the communication unit, where the registration request includes an identifier of an intermediate session management network element that is in a second network and that corresponds to a session managed by the combined intermediate session management network element in a first network, and the combined intermediate session management network element is capable of providing session management in the first network and is capable of providing session management in the second network. The processing unit is further configured to send a registration response to the combined intermediate session management network element through the communication unit.

In a possible implementation, the identifier of the intermediate session management network element that is in the second network and that corresponds to the session managed by the combined intermediate session management network element in the first network is derived using a node name that is of an anchor session management network element in the second network and that corresponds to the session managed by the combined intermediate session management network element in the first network.

According to a sixteenth aspect, a communication apparatus is provided. The apparatus includes a processing unit and a communication unit. The processing unit is configured to send a registration request to a subscriber data management network element through the communication unit, where the registration request includes an identifier of an intermediate session management network element that is in a second network and that corresponds to a session managed by a combined intermediate session management network element in a first network, and the combined intermediate session management network element is capable of providing session management in the first network and is capable of providing session management in the second network. The processing unit is further configured to receive a registration response from the subscriber data management network element through the communication unit.

In a possible implementation, the identifier of the intermediate session management network element that is in the second network and that corresponds to the session managed by the combined intermediate session management network element in the first network is derived using a node name that is of an anchor session management network element in the second network and that corresponds to the session managed by the combined intermediate session management network element in the first network.

According to a seventeenth aspect, a communication apparatus is provided. The apparatus includes a processor. The processor is connected to a memory, the memory is configured to store computer-executable instructions, and the processor executes the computer-executable instructions stored in the memory, to implement the method provided in any one of the first aspect to the eighth aspect. The memory and the processor may be integrated together, or may be independent devices. If the memory and the processor are independent components, the memory may be located inside the communication apparatus, or may be located outside the communication apparatus.

In a possible implementation, the processor includes a logic circuit and at least one of an input interface and an output interface. The output interface is configured to perform a sending action in a corresponding method, and the input interface is configured to perform a receiving action in a corresponding method.

In a possible implementation, the communication apparatus further includes a communication interface and a communication bus. The processor, the memory, and the communication interface are connected through the communication bus. The communication interface is configured to perform sending and receiving actions in a corresponding method. The communication interface may also be referred to as a transceiver. Optionally, the communication interface includes at least one of a transmitter or a receiver. In this case, the transmitter is configured to perform a sending action in a corresponding method, and the receiver is configured to perform a receiving action in the corresponding method.

In a possible implementation, the communication apparatus exists in a product form of a chip.

According to an eighteenth aspect, a computer-readable storage medium is provided. The computer-readable storage medium includes instructions. When the instructions are run on a computer, the computer is enabled to perform the method provided in any one of the first aspect to the eighth aspect.

According to a nineteenth aspect, a computer program product including instructions is provided. When the instructions are run on a computer, the computer is enabled to perform the method provided in any one of the first aspect to the eighth aspect.

For technical effects brought by any implementation of the ninth aspect to the nineteenth aspect, refer to the technical effects brought by corresponding implementations of the first aspect to the eighth aspect. Details are not described herein again.

BRIEF DESCRIPTION OF DRAWINGS

FIG. 3 to FIG. 10 are flowcharts of a communication method according to at least one embodiment of this application;

FIG. 11 is a schematic diagram of network migration according to an embodiment of this application;

FIG. 22 to FIG. 24A and FIG. 24B are flowcharts of a communication method according to at least one embodiment of this application.

DESCRIPTION OF EMBODIMENTS

In descriptions of this application, unless otherwise specified, "/" means "or". For example, A/B may represent A or B. "And/or" in this specification describes only an association relationship for describing associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, the word such as "example" or "for example" is used to represent giving an example, an illustration, or a description. Any embodiment or design scheme described as an "example" or with "for example" in this application should not be explained as being more preferred or having more advantages than another embodiment or design scheme. Use of the word such as "example" or "for example" is intended to present a relative concept in a specific manner.

Technical solutions provided in the embodiments of this application may be applied to a multi-radio access technology (multi-RAT) dual-connectivity (MR-DC) system, a plurality of communication combination systems, and a future evolved system. For ease of description, in the embodiments of this application, a communication combination system of a 4G network and a 5G network is used as an example to describe a method provided in this application. However, it may be understood that the embodiments of this application are also applicable to another communication combination system similar to the communication combination system in this application. The 4G network may also be referred to as a Long-Term Evolution (LTE) system or an evolved packet system (EPS). The 5G network may also be referred to as a new radio (NR) system.

Figure 1:
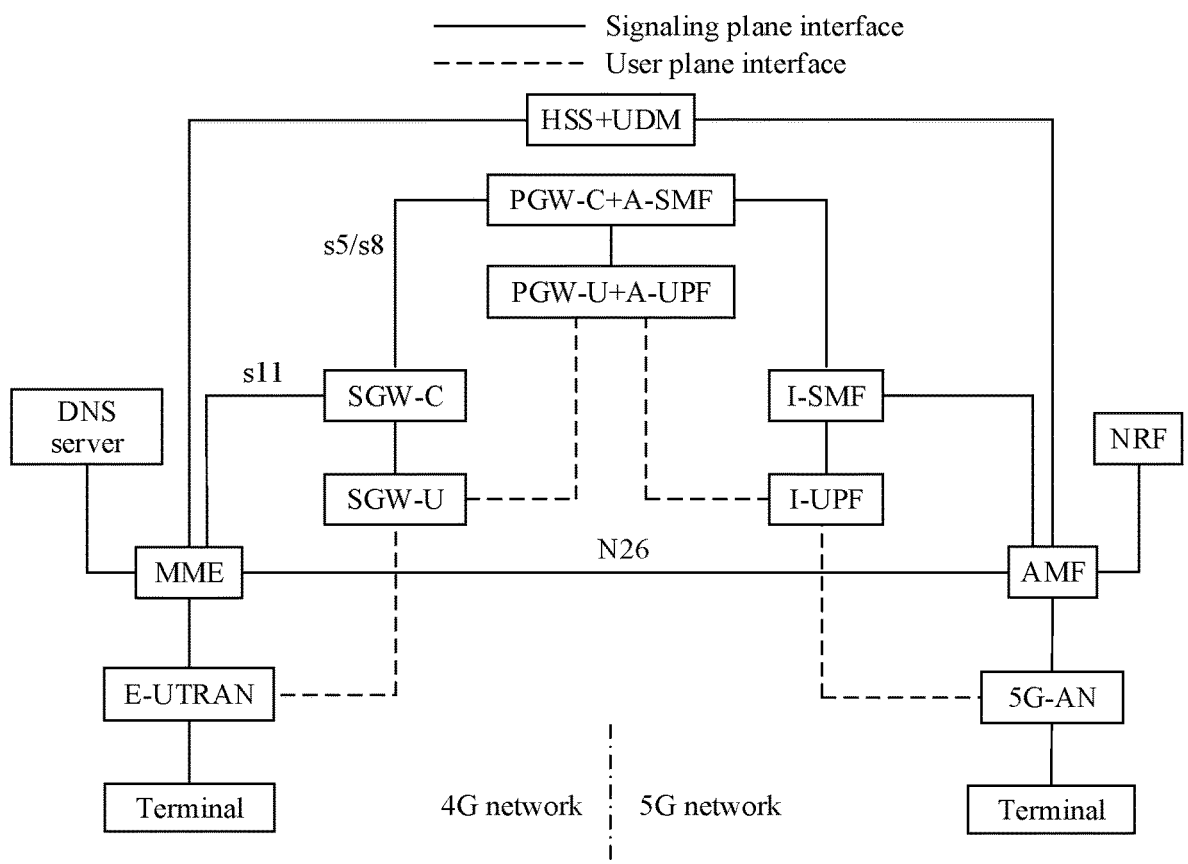
FIG. 1 and FIG. 2 are schematic composition diagrams of a network architecture.

When both the 5G network and the 4G network are deployed, a network system architecture is shown in FIG. 1. In FIG. 1, network elements on the left are network elements in the 4G network, and network elements on the right are network elements in the 5G network. An N26 interface is an interface between an AMF and an MME, and is configured to: when a terminal is moved between the 4G network and the 5G network, transmit terminal-related information between the AMF and the MME. The N26 interface is optional and may not be deployed in the network. For functions of the network elements, refer to Table 1.

TABLE 1

| Network element type | 5G network element | 4G network element | Network element function |
|---|---|---|---|
| Subscriber data management network element | Unified Data Management (UDM) | Home Subscriber Server (HSS) | The network element is responsible for managing subscriber subscription data and dynamic subscriber data that needs to be coordinated among multiple systems. |
| Anchor session management network element | Anchor Session Management Function (A-SMF) | Packet Network Data (PDN) Gateway (PGW) Control Plane Function (PGW-C) | The network element is responsible for managing an anchor user plane network element, and selecting a proper anchor user plane network element to provide a data service for the terminal. |
| Anchor user plane network element | Anchor User Plane Function (A-UPF) | PGW User Plane Function (PGW-U) | The network element provides, for the terminal, routing and forwarding of data between the terminal and an external data network. |
| Intermediate session management network element | Intermediate SMF (I-SMF) | Serving Gateway (SGW) Control Plane Function (SGW-C) | The network element is responsible for managing an intermediate user plane network element and selecting a proper intermediate user plane network element to provide a data service for the terminal. |
| Intermediate user plane network element | Intermediate UPF (I-UPF) | SGW User Plane Function (SGW-U) | The network element provides, for the terminal, routing and forwarding of data between an access network element and the anchor user plane network element. |
| Mobility management network element | AMF | MME | The network element processes various service flows generated due to location movement of the terminal and selects a proper I-SMF and a proper A-SMF to provide related data services for the terminal. |
| Access network element | Evolved Universal Terrestrial Radio Access Network (E-UTRAN) | $5^{th}$ Generation Access Network (5G-AN) | The network element mainly completes radio resource management of the terminal and routing and forwarding of air interface signaling and data. |
| Network discovery network element | Network Repository Function (NRF) | Domain Name System (DNS) Server | The network element is responsible for addressing a network element and returns network element address information that satisfies a query condition provided by a requester. |

Chinese definitions of the network elements in Table 1 are as follows: HSS: home subscriber server; UDM: unified data management; A-SMF: anchor access and mobility management function; PGW-C: packet data network (PDN) gateway-control plane; A-UPF: anchor-user plane function; PGW-U: packet data network gateway-user plane; I-SMF: intermediate-access and mobility management function; SGW-C: serving gateway-control plane function; I-UPF: intermediate-user plane function; SGW-U: serving gateway-user plane function; AMF: core access and mobility management function; MME: mobility management entity; E-UTRAN: evolved-universal terrestrial radio access network; 5G-AN: 5G access network; NRF: network repository function; and DNS server: domain name service (DNS) server.

A terminal in the embodiments of this application can access the 4G network and the 5G network, and is configured to provide one or both of a voice service and a data connectivity service for a user. Alternatively, the terminal may be referred to as a user equipment (UE), a terminal device, an access terminal, a subscriber unit, a subscriber station, a mobile station, a remote station, a remote terminal, a mobile device, a user terminal, a wireless communication device, a user agent, or a user apparatus. The terminal may be a mobile station (MS), a subscriber unit, an unmanned aerial vehicle, an internet of things (IoT) device, a station (ST) in a wireless local area network (WLAN), a cellular phone, a smartphone (smart phone), a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device or another processing device connected to a wireless modem, a vehicle-mounted device, or a wearable device (which may also be referred to as a wearable intelligent device). The terminal may alternatively be a terminal in a next-generation communication system, for example, a terminal in a future evolved public land mobile network (PLMN).

Refer to FIG. 1. When both the 5G network and the 4G network are deployed, the function network elements in the 5G network and the function network elements in the 4G network may be combined. Combined network elements defined in the 3rd Generation Partnership Project (3GPP) protocol includes: HSS+UDM, PGW-C+A-SMF, and PGW-U+A-UPF. The combined network element may perform a corresponding function in the 5G network, and may also perform a corresponding function in the 4G network. For example, the HSS+UDM may manage subscriber subscription data and dynamic subscriber data that needs to be coordinated between multiple systems in the 5G network, and may also manage subscriber subscription data and dynamic subscriber data that needs to be coordinated between multiple systems in the 4G network. The PGW-C+A-SMF may manage an anchor user plane network element, and select a proper anchor user plane network element to provide a data service for the terminal in the 5G network, and may also manage an anchor user plane network element, and select a proper anchor user plane network element to provide a data service for the terminal in the 4G network. The PGW-U+A-UPF may provide, for the terminal, routing and forwarding of data between the terminal and an external data network in the 5G network, and may also provide, for the terminal, routing and forwarding of data between the terminal and an external data network in the 4G network.

Figure 2:
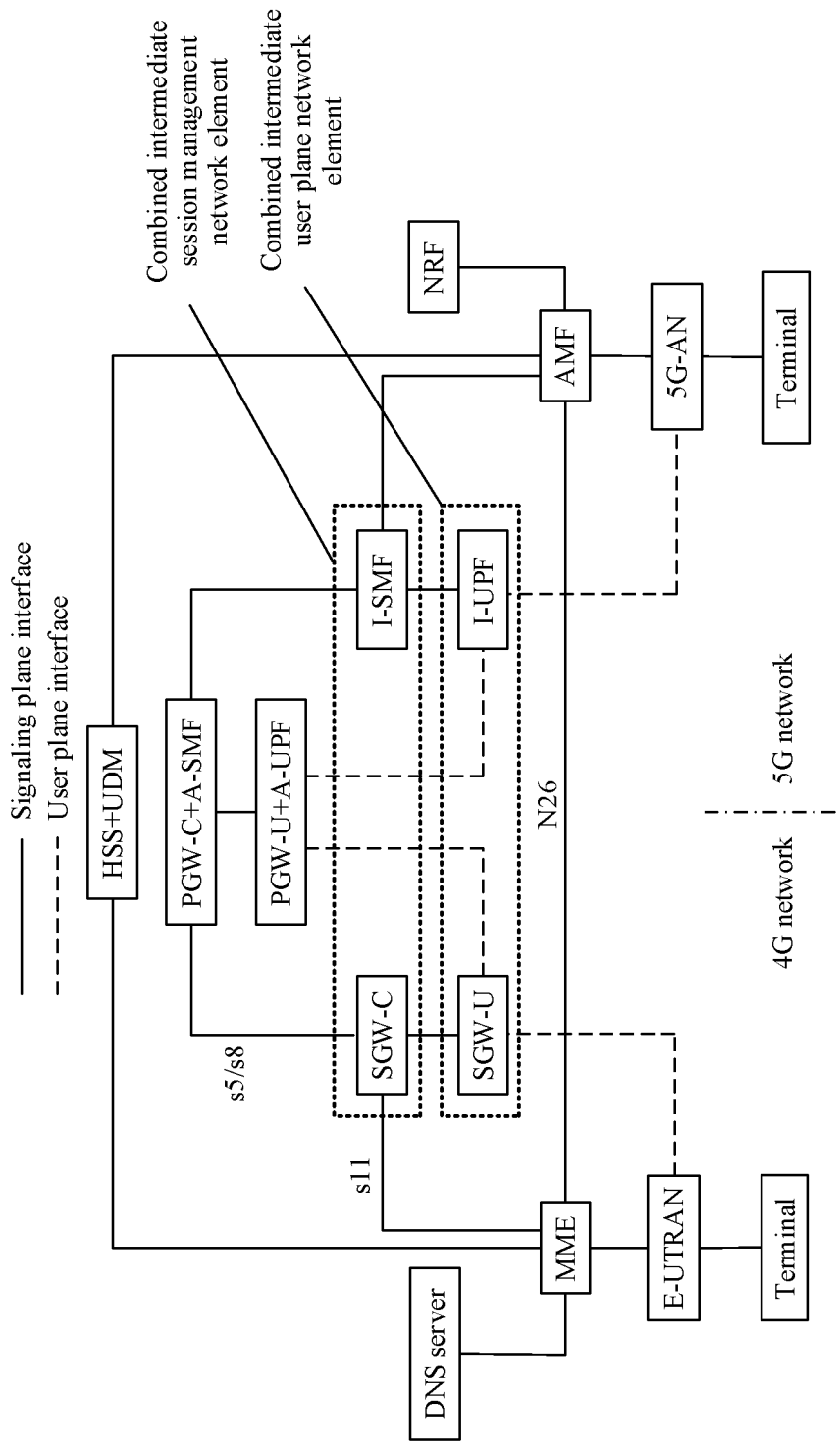

A combined intermediate session management network element and a combined intermediate user plane network element are not defined in the 3GPP protocol. However, in actual network deployment, referring to FIG. 2, to improve overall communication efficiency of the network, a combined intermediate session management network element and a combined intermediate user plane network element may be deployed.

However, when selecting an intermediate session management network element in the 5G network, the AMF does not preferentially select the combined intermediate session management network element. Similarly, when selecting an intermediate session management network element in the 4G network, the MME does not preferentially select the combined intermediate session management network element. Therefore, the overall communication efficiency of the network cannot be improved using the combined intermediate session management network element.

When the terminal is migrated from the 5G network to the 4G network, if there is the N26 interface, information sent by the AMF to the MME through the N26 interface does not include information related to the SGW-C; or if there is no N26 interface, information obtained by the MME from the HSS does not include information related to the SGW-C. Consequently, it cannot be ensured that a session is anchored on the combined intermediate session management network element in the 5G network after the terminal is handed over to the 4G network, and the combined intermediate user plane network element cannot be selected using the combined intermediate session management network element. Similarly, when the terminal is migrated from the 4G network to the 5G network, if there is the N26 interface, although information sent by the MME to the AMF through the N26 interface includes information related to the SGW-C, the AMF does not use the information when selecting an intermediate session management network element. If there is no N26 interface, information obtained by the AMF from the UDM does not include information related to the SGW-C. Consequently, it cannot be ensured that a session is anchored on the combined intermediate session management network element in the 4G network after the terminal switches to the 5G network, and the combined intermediate user plane network element cannot be selected using the combined intermediate session management network element. Consequently, the overall communication efficiency of the network cannot be improved using the combined intermediate session management network element and the combined intermediate user plane network element.

This application provides a communication method. In the communication method, when selecting an intermediate session management network element, an AMF or an MME preferentially selects a combined intermediate session management network element. During migration from a 5G network to a 4G network or migration from a 4G network to a 5G network, a combined intermediate session management network element in the network before the handover is preferentially selected, such that overall communication efficiency of the network is improved.

To make the embodiments of this application clearer, meanings of some terms in the embodiments of this application are first briefly described.

1. Combined Intermediate Session Management Network Element and Independent Intermediate Session Management Network Element The combined intermediate session management network element is an intermediate session management network element that can perform session management (for example, managing an intermediate user plane network element, and selecting a proper intermediate user plane network element to provide a data service for a terminal) in a 5G network, and can also perform session management in a 4G network. For ease of description, the combined intermediate session management network element is denoted as an I-SMF+SGW-C below.

The independent intermediate session management network element is an intermediate session management network element that can perform session management only in either one of the 4G network and the 5G network.

Based on the two concepts, in the embodiments of this application, there are two types of SGW-Cs: an I-SMF+SGW-C and an independent SGW-C. The independent SGW-C is an SGW-C that can perform session management only in the 4G network. There are also two types of I-SMFs: an I-SMF+SGW-C and an independent I-SMF. The independent I-SMF is an I-SMF that can perform session management only in the 5G network.

2. Combined Intermediate User Plane Network Element and Independent Intermediate User Plane Network Element The combined intermediate user plane network element is an intermediate user plane network element that can perform routing management (for example, providing routing and forwarding of data between an access network element and an anchor user plane network element for a terminal) in a 5G network, and can also perform routing management in a 4G network. For ease of description, the combined intermediate user plane network element is denoted as an I-UPF+SGW-U below.

The independent intermediate user plane network element is an intermediate user plane network element that can perform routing management only in either one of the 4G network and the 5G network.

Based on the two concepts, in the embodiments of this application, there are two types of SGW-Us: an I-UPF+SGW-U and an independent SGW-U. The independent SGW-U is an SGW-U that can perform routing management only in the 4G network. There are also two types of I-UPFs: an I-UPF+SGW-U and an independent I-UPF. The independent I-UPF is an I-UPF that can perform routing management only in the 5G network.

3. SGW Node Name (Node Name)

The SGW node name is used to uniquely identify an SGW-C device in the entire world. Generally, in a 4G network, internet protocol (internet protocol, IP) address information of each interface of the SGW-C device corresponding to the SGW node name needs to be configured on a DNS server.

In the embodiments of this application, the SGW node name may alternatively be replaced with another identifier that uniquely identifies an SGW-C device in the entire world.

4. SGW Fully Qualified Tunnel Endpoint Identifier (F-TEID)

The SGW F-TEID is an identifier allocated by an SGW-C to each terminal served by the SGW-C, and the SGW F-TEID includes an Internet Protocol (IP) address of an s11 interface and a tunnel endpoint identifier (TEID) of the SGW-C. The TEID uniquely identifies a terminal within a range of the SGW-C, that is, the SGW F-TEID uniquely identifies the terminal served by the SGW-C.

In the embodiments of this application, the SGW F-TEID may alternatively be replaced with another identifier that uniquely identifies the terminal served by the SGW-C.

5. EPS Bearer ID (Bearer ID)

The EPS bearer ID is a session identifier of each terminal in a 4G network and is allocated by a network side to the terminal. The EPS bearer ID is unique for the terminal.

6. Protocol Data Unit (PDU) Session Identifier (Session ID)

The PDU session identifier is a session identifier of each terminal in a 5G network, is allocated by the terminal, and is notified by the terminal to a network side. The PDU session identifier is unique for the terminal.

In addition, it should be noted that, in a 4G network, each terminal may have a plurality of sessions, but each terminal can access only one SGW-C. In a 5G network, each terminal may have a plurality of sessions, and different I-SMFs may be selected for different sessions.

The method provided in the embodiments of this application is described using examples from three aspects: registration of an I-SMF+SGW-C, selection of an intermediate session management network element in a session establishment process, and selection of an intermediate session management network element in a network migration process, which are described below using the first part to the third part.

First Part: Registration of an I-SMF+SGW-C

When serving as an I-SMF, the SGW-C+I-SMF needs to register with an NRF. When serving as an SGW-C, the SGW-C+I-SMF needs to be configured on a DNS server.

Figure 3:
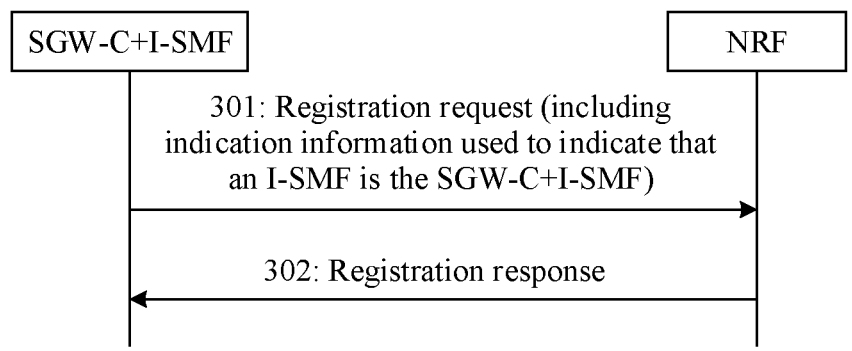

When an SGW-C+I-SMF serves as an I-SMF, this application provides a communication method. As shown in FIG. 3, the communication method includes the following steps.

301: An intermediate session management network element (namely, an I-SMF) in a first network sends a registration request to a network discovery network element (namely, an NRF) in the first network. Correspondingly, the NRF receives the registration request from the I-SMF.

The first network is a 5G network. The registration request includes information about the I-SMF.

In one case, when an I-SMF is an SGW-C+I-SMF, information about the I-SMF includes indication information, and the indication information is used to indicate that the I-SMF is the SGW-C+I-SMF. When an I-SMF is an independent I-SMF, information about the I-SMF does not include the indication information. For example, the indication information may be an SGW node name when the SGW-C+I-SMF serves as an SGW-C.

In another case, when an I-SMF is an SGW-C+I-SMF, information about the I-SMF includes indication information, and the indication information is used to indicate that the I-SMF is the SGW-C+I-SMF. When an I-SMF is an independent I-SMF, information about the I-SMF includes another piece of indication information, and the other piece of indication information is used to indicate that the I-SMF is the independent I-SMF.

In FIG. 3, an example in which the I-SMF is the SGW-C+I-SMF is used for drawing.

For example, the information about the I-SMF further includes information such as a location area and an interface address that are supported by the I-SMF.

302: The NRF sends a registration response to the I-SMF. Correspondingly, the I-SMF receives the registration response from the NRF.

When an SGW-C+I-SMF serves as an SGW-C, a carrier configures tracking area identity (TAI) domain name information on a DNS server. The TAI domain name information includes information such as a TAI, an SGW node name of the SGW-C corresponding to the TAI, service parameters, and an IP address of each interface.

In one case, when an SGW-C is an SGW-C+I-SMF, service parameters of the SGW-C may include indication information, and the indication information may indicate that the SGW-C is the SGW-C+I-SMF. When an SGW-C is an independent SGW-C, service parameters of the SGW-C do not include the indication information. For example, the indication information may be implemented by adding a suffix to the service parameters. For example, a suffix "+nc-smf" is added.

In another case, when an SGW-C is an SGW-C+I-SMF, information about the SGW-C includes indication information, and the indication information is used to indicate that the SGW-C is the SGW-C+I-SMF. When an SGW-C is an independent SGW-C, information about the SGW-C includes another piece of indication information, and the other piece of indication information is used to indicate that the SGW-C is the independent SGW-C.

In the method shown in the first part, the SGW-C+I-SMF may register with the NRF, and the NRF can determine, based on carried indication information, which I-SMFs are SGW-C+I-SMFs and which I-SMFs are independent I-SMFs, to support a subsequent process such as I-SMF selection. Similarly, the SGW-C+I-SMF can be configured on the DNS server. The DNS server can determine, using configuration indication information, which SGW-Cs are SGW-C+I-SMFs and which SGW-Cs are independent SGW-Cs, to support a subsequent process such as SGW-C selection.

Figure 4:
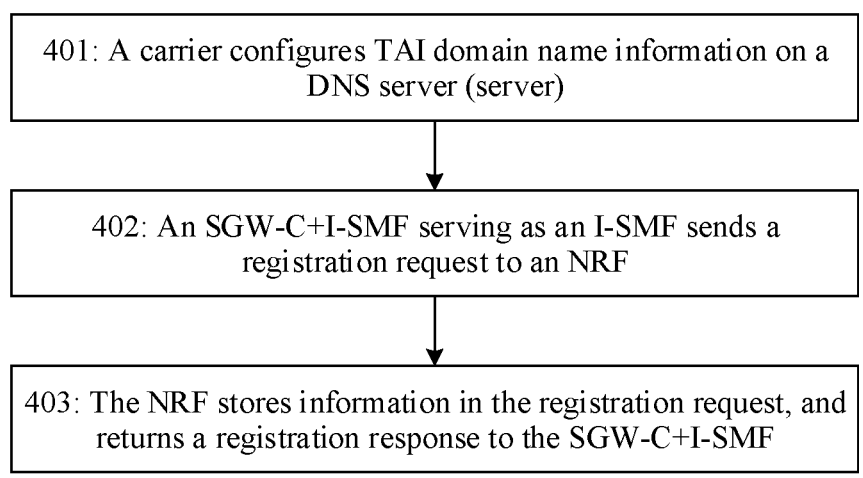

The following describes, using examples, a registration procedure when an SGW-C+I-SMF serves as an I-SMF and a configuration procedure when the SGW-C+I-SMF serves as an SGW-C. Refer to FIG. 4. The procedure includes the following steps.

401: A carrier configures TAI domain name information on a DNS server.

The TAI domain name information includes information such as a TAI, an SGW node name of an SGW-C corresponding to the TAI, service parameters, and an IP address of each interface.

The SGW-C corresponding to the TAI may be an independent SGW-C, or may be an SGW-C+I-SMF.

For distinguishing, compared with service parameters of an independent SGW-C, service parameters of an SGW-C+I-SMF have a suffix "+nc-smf". The suffix "+nc-smf" may indicate that a corresponding SGW-C is an SGW-C+I-SMF.

For example, for an s8 interface, formats of the service parameters of the independent SGW-C are as follows: "x-3gpp-sgw:x-s8-gtp" and "x-3gpp-sgw:x-s8-pmip". Formats of the service parameters of the SGW-C+I-SMF are as follows: "x-3gpp-sgw:x-s8-gtp+nc-smf" and "x-3gpp-sgw:x-s8-pmip+nc-smf". For an s5 interface, formats of the service parameters of the independent SGW-C are as follows: "x-3gpp-sgw:x-s5-gtp" and "x-3gpp-sgw:x-s5-pmip".

Formats of the service parameters of the SGW-C+I-SMF are as follows: "x-3gpp-sgw:x-s5-gtp+nc-smf" and "x-3gpp-sgw:x-s5-pmip+nc-smf".

402: An SGW-C+I-SMF serving as an I-SMF sends a registration request to an NRF.

The registration request includes information such as a location area and an interface address that are supported when the SGW-C+I-SMF serves as the I-SMF, and further includes the SGW node name when the SGW-C+I-SMF serves as the SGW-C. The SGW node name may indicate that the corresponding SGW-C is the SGW-C+I-SMF.

For example, the registration request may be an Nnrf_NF-Management_NFRegister Request message.

403: The NRF stores the information in the registration request, and returns a registration response to the SGW-C+I-SMF.

For example, the registration response may be an Nnrf_NFManagement_NFRegister Response message.

Figure 5:
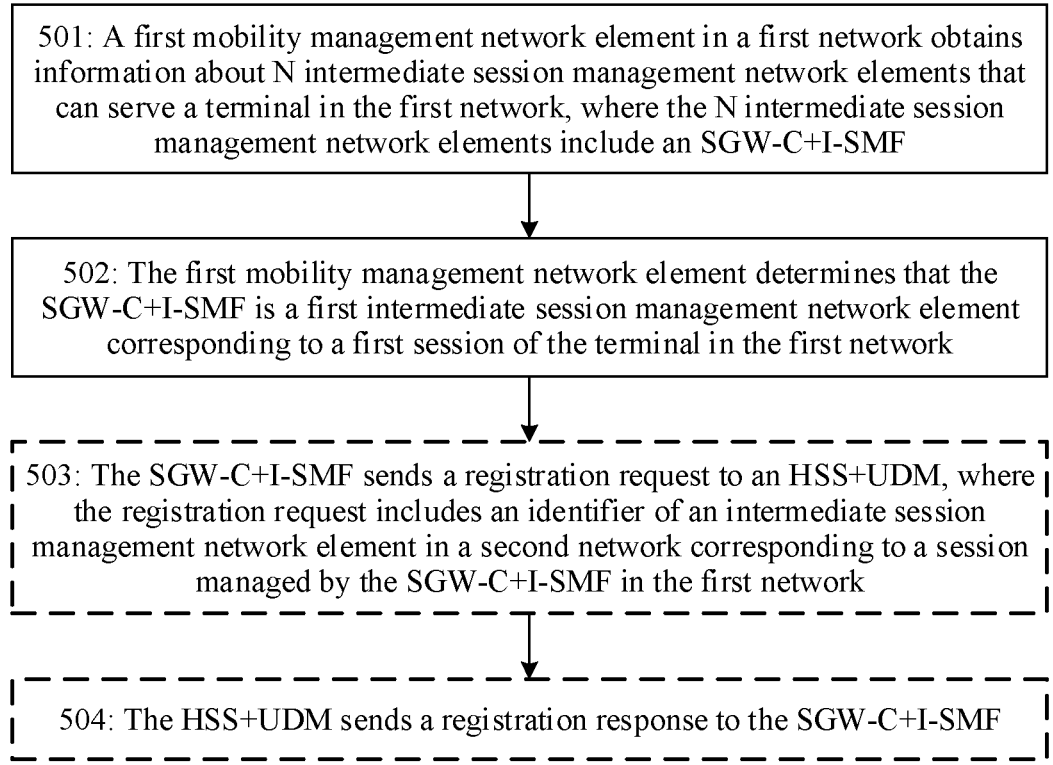

Second Part: Selection of an Intermediate Session Management Network Element in a Session Establishment Process The second part provides a communication method. As shown in FIG. 5, the method includes the following steps.

501: A first mobility management network element in a first network obtains information about N intermediate session management network elements that can serve a terminal in the first network, where the N intermediate session management network elements include an SGW-C+I-SMF.

The SGW-C+I-SMF can provide session management in the first network and can provide session management in a second network, and N is an integer greater than 0. The N intermediate session management network elements include one or more SGW-C+I-SMFs.

The first network may be a 5G network. In this case, the second network may be a 4G network. Alternatively, the first network may be a 4G network. In this case, the second network may be a 5G network.

502: The first mobility management network element determines that the SGW-C+I-SMF is a first intermediate session management network element corresponding to a first session of the terminal in the first network.

During implementation of step 502, the first mobility management network element may determine that one SGW-C+I-SMF in the N intermediate session management network elements is the first intermediate session management network element corresponding to the first session.

The first session may be any session of the terminal.

According to the method provided in the second part, when selecting an intermediate session management network element, the first mobility management network element preferentially selects the SGW-C+I-SMF for the terminal, to improve overall communication efficiency of the network. For example, network address resources are reduced to simplify network planning and deployment complexity, a quantity of nodes in the network is reduced to simplify network operation and maintenance workload, and signaling between the nodes in the network is reduced to reduce network service load. Due to a reason such as session establishment or a location area change of the terminal, the first mobility management network element may need to select an intermediate session management network element for a session. In this case, the first mobility management network element performs step 501 and step 502.

Optionally, when the first network is the 4G network and the second network is the 5G network, the method is applied to the following scenario 1.

Scenario 1: The first session is the 1$^{st}$ session established by the terminal on the first mobility management network element.

Optionally, when the first network is the 5G network and the second network is the 4G network, the method is applied to the foregoing scenario 1 or the following scenario 2.

Scenario 2: An intermediate session management network element corresponding to a session that has been established by the terminal on the first mobility management network element is not the foregoing SGW-C+I-SMF.

Scenario 2 may include the following two cases: (1) All intermediate session management network elements corresponding to the session that has been established by the terminal on the first mobility management network element are independent intermediate session management network elements. (2) Intermediate session management network elements corresponding to the session that has been established by the terminal on the first mobility management network element include SGW-C+I-SMFs, but the SGW-C+I-SMFs do not belong to the N intermediate session management network elements.

In addition, when the first network is the 5G network, the second network is the 4G network, and an intermediate session management network element corresponding to at least one session that has been established by the terminal on the first mobility management network element is the SGW-C+I-SMF, an implementation of step 502 may include: The first mobility management network element determines that the SGW-C+I-SMF is the first intermediate session management network element corresponding to the first session. In this possible implementation, the SGW-C+I-SMF does not need to re-establish the session, but only needs to update the session. This can avoid a waste of resources.

Optionally, an intermediate session management network element that is in the information about the N intermediate session management network elements and that includes indication information is the SGW-C+I-SMF, and the method further includes: The first mobility management network element determines the SGW-C+I-SMF based on the indication information.

For related descriptions of the indication information in the second part and another part, refer to the first part. Details are not described again.

After step 502, optionally, the method further includes:

503: The SGW-C+I-SMF (namely, the first intermediate session management network element corresponding to the first session) sends a registration request to a subscriber data management network element (namely, an HSS+UDM). Correspondingly, the HSS+UDM receives the registration request from the SGW-C+I-SMF.

The registration request includes an identifier of an intermediate session management network element in the second network corresponding to a session managed by the SGW-C+I-SMF in the first network. For example, if the second network is the 4G network, the registration request may include session-level SGW node name information of the session managed by the SGW-C+I-SMF in the first network. The session-level SGW node name information is information about an SGW node name of an SGW-C that manages a session.

Based on step 503, when no N26 interface exists between an AMF and an MME, the HSS+UDM may obtain the identifier of the intermediate session management network element that is in the second network and that corresponds to the session managed by the SGW-C+I-SMF in the first network, such that the identifier of the intermediate session management network element that is in the second network and that corresponds to the session is sent to a mobility management network element in the second network as required by the mobility management network element in the second network.

504: The HSS+UDM sends a registration response to the SGW-C+I-SMF. Correspondingly, the SGW-C+I-SMF receives the registration response from the HSS+UDM.

In the method provided in the second part, a procedure in which the mobility management network element selects the intermediate session management network element for the terminal is related to whether the N26 interface exists between the AMF and the MME and a current network in which the terminal is located. The following provides descriptions using an application scenario 1 and an application scenario 2 separately.

Application scenario 1: The N26 interface exists between the AMF and the MME.

In the application scenario 1, the AMF and the MME can directly exchange information.

If the terminal accesses the 5G network, due to a reason such as session establishment or a location area change of the terminal, the AMF needs to select an I-SMF for a session (denoted as a session 1). The following describes an example of an I-SMF selection process in the 5G network using FIG. 6.

Figure 6:
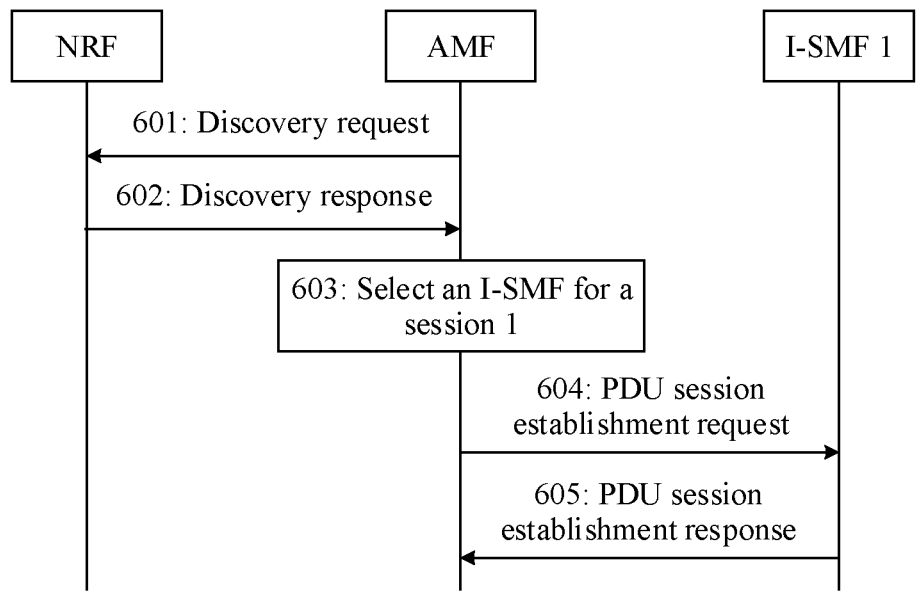

Refer to FIG. 6. The process includes the following steps.

601: The AMF sends a discovery request to an NRF, to request the NRF to perform I-SMF discovery.

The discovery request may include information such as a location of the terminal.

For example, the discovery request may be an Nnrf_NF-Discovery Request message.

602: The NRF returns a discovery response to the AMF.

The discovery response may include an I-SMF candidate list. The list includes address information of one or more I-SMFs that can provide related services for the terminal. The I-SMF may be an independent I-SMF or an SGW-C+I-SMF. For the SGW-C+I-SMF, the discovery response further includes SGW node name information when the SGW-C+I-SMF serves as an SGW-C.

It should be noted that the AMF may determine, depending on whether one I-SMF has corresponding SGW node name information, whether the I-SMF is an SGW-C+I-SMF. For example, when one I-SMF has corresponding SGW node name information, the I-SMF is an SGW-C+I-SMF. Otherwise, the I-SMF is an independent I-SMF.

During implementation of step 602, the NRF may determine, based on the location of the terminal and location areas supported by I-SMFs, I-SMFs that can serve the terminal, include information about the I-SMFs in the discovery response, and send the discovery response to the AMF.

For example, the discovery response may be an Nnrf_NF-Discovery Response message.

603: The AMF selects an I-SMF for the session 1.

If the session 1 has an I-SMF in use and the I-SMF is in the I-SMF candidate list, the AMF preferentially selects the I-SMF for the session 1. In this case, the I-SMF only needs to update the session 1, and does not need to re-establish the session 1.

Otherwise, the AMF selects a new I-SMF (denoted as an I-SMF 1) for the session 1. (FIG. 6 is drawn using this case as an example. In this case, the I-SMF 1 needs to establish the session 1.) For example, there are the following three cases.

Case 1: The session 1 is the 1$^{st}$ session established by the terminal.

In the case 1, the AMF preferentially selects an I-SMF having SGW node name information (namely, an SGW-C+I-SMF) in the I-SMF candidate list as the I-SMF of the session 1.

Case 2: The terminal already has SGW-C+I-SMFs selected for other sessions in the I-SMF candidate list.

In the case 2, the AMF selects one SGW-C+I-SMF in the SGW-C+I-SMFs selected for the other sessions as the I-SMF of the session 1.

Case 3: The terminal already has other sessions, but I-SMFs corresponding to the other sessions are all independent I-SMFs, or are SGW-C+I-SMFs but are not in the I-SMF candidate list.

In the case 3, the AMF preferentially selects an I-SMF having SGW node name information (namely, an SGW-C+I-SMF) in the I-SMF candidate list as the I-SMF of the session 1.

604: The AMF sends a PDU session establishment request to the I-SMF 1, to request to establish a PDU session.

For example, the PDU session establishment request may be an Nsmf_PDUSession_CreateSMContext Request message.

605: After completing service processing, for example, interaction with an A-SMF, based on the PDU session establishment request, the I-SMF 1 returns a PDU session establishment response to the AMF, indicating that the session is successfully established.

For example, the PDU session establishment response may be an Nsmf_PDUSession_CreateSMContext Response message.

If the terminal accesses the 4G network, due to a reason such as session establishment or a location area change of the terminal, the MME needs to select an SGW-C for a session (denoted as a session 2). The following describes an example of an SGW-C selection process in the 4G network using FIG. 7.

Figure 7:
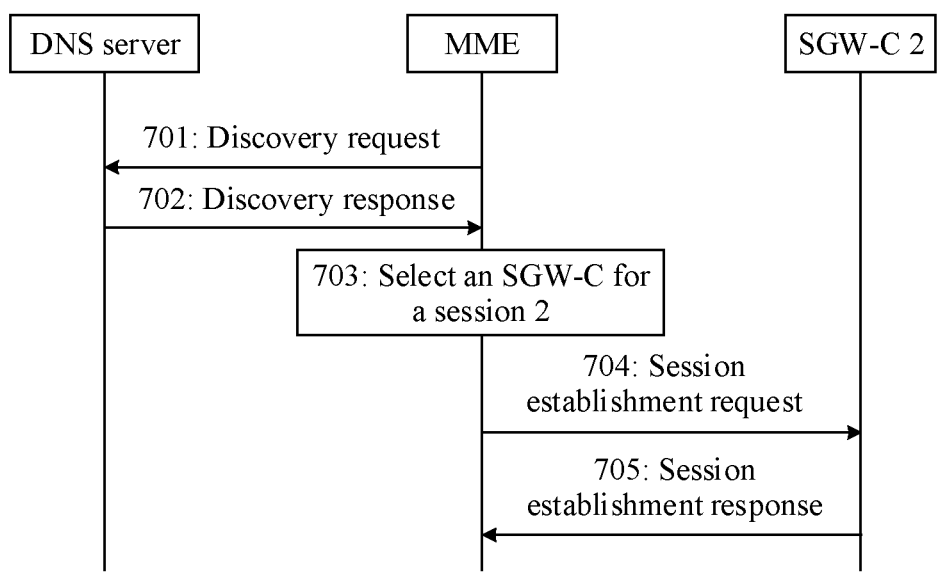

Refer to FIG. 7. The process includes the following steps.

701: The MME sends a discovery request to a DNS server, to request SGW-C discovery.

The discovery request may include information such as a location of the terminal.

For example, the discovery request may be a DNS Request message.

702: The DNS server returns a discovery response to the MME.

The discovery response may include an SGW-C candidate list, and the list includes SGW node names, service parameters, and IP address information of each interface of one or more SGW-Cs that can provide related services for the terminal. The SGW-C is an independent SGW-C or an SGW-C+I-SMF. For the SGW-C+I-SMF, the service parameters have a suffix "+nc-smf".

During implementation of step 702, the DNS server may determine, based on the location of the terminal and location areas (for example, TAIs) supported by SGW-Cs, SGW-Cs that can serve the terminal, include information about the SGW-Cs in the discovery response, and send the discovery response to the MME.

For example, the discovery response may be a DNS Response message.

703: The MME selects an SGW-C for the session 2.

During implementation of step 703, if the terminal has an SGW-C in use and the SGW-C is in the SGW-C candidate list, the MME preferentially selects the original SGW-C for the session 2. In this case, the original SGW-C only needs to update the session 2, and does not need to re-establish the session 2.

Otherwise, the MME selects a new SGW-C (denoted as an SGW-C 2) in the SGW-C candidate list. (FIG. 7 is drawn using this case as an example. In this case, the SGW-C 2 needs to establish the session 2.) The MME preferentially selects an SGW-C whose service parameters have the suffix "+nc-smf" (namely, an SGW-C+I-SMF) in the SGW-C candidate list as the SGW-C for session 2.

704: The MME sends a session establishment request to the SGW-C 2, to request to establish a session.

For example, the session establishment request may be a Create Session Request message.

705: After completing service processing, for example, interaction with a PGW-C, based on the session establishment request, the SGW-C 2 returns a session establishment response to the MME, indicating that the session is successfully established.

The session establishment response may include an SGW F-TEID allocated by the SGW-C2 to the terminal.

For example, the session establishment response may be a Create Session Response message.

Application scenario 2: No N26 interface exists between the AMF and the MME.

In the application scenario 2, the MME and the AMF need to exchange information through an HSS+UDM.

If the terminal accesses the 5G network, due to a reason such as session establishment or a location area change of the terminal, the AMF needs to select an I-SMF for a session (denoted as a session 3), and reports terminal-level SGW node name information (where the terminal-level SGW node name information is information about an SGW node name of an SGW-C that manages a session of a terminal) or session-level SGW node name information to the HSS+UDM. The following describes an example of an I-SMF selection process in the 5G network using FIG. 8.

Figure 8:
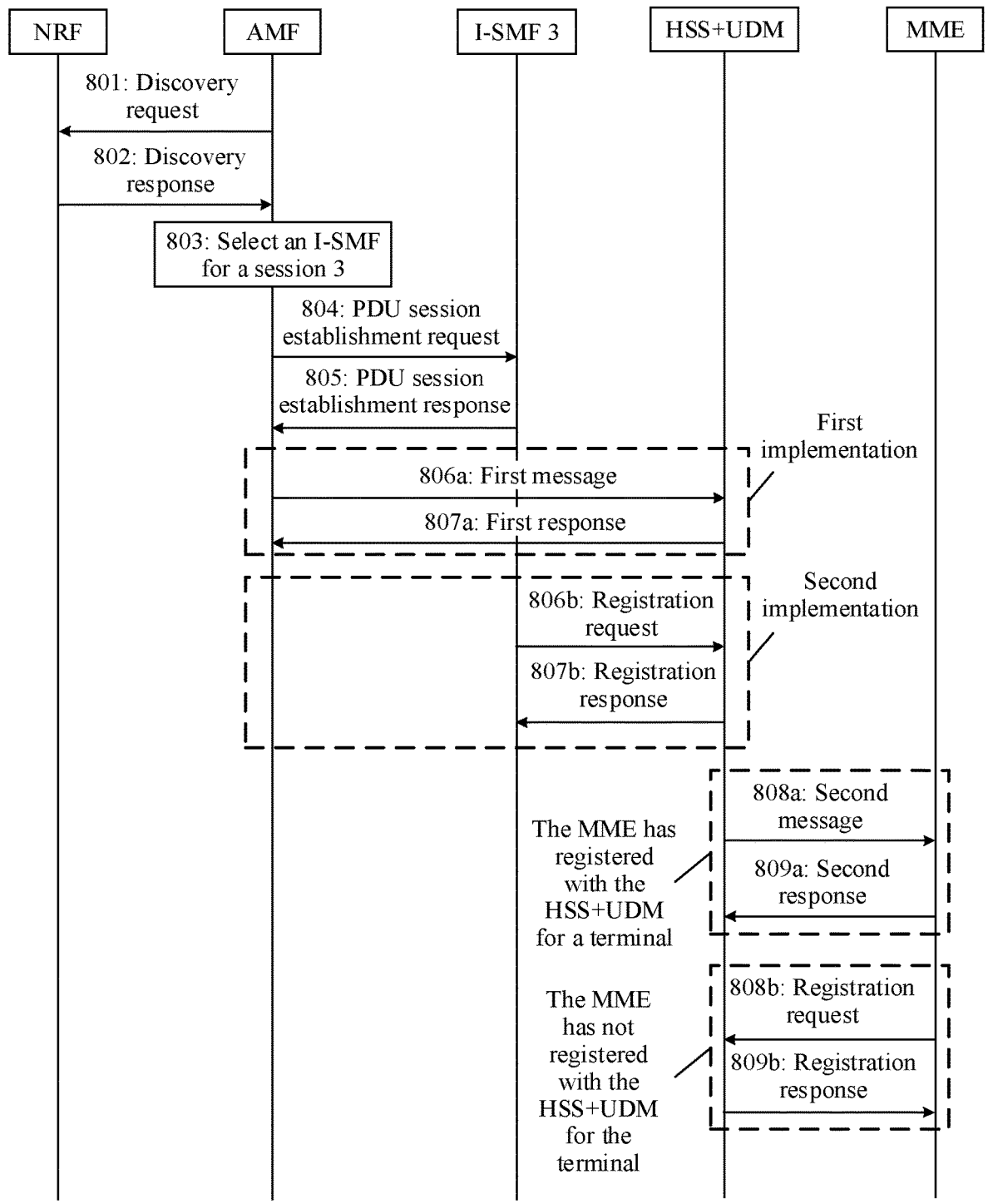

Refer to FIG. 8. The process includes the following steps.

801 to 805: Similar to 601 to 605, and a difference lies in that a session herein is the session 3, and a selected I-SMF, which is denoted as an I-SMF 3 herein, may be different from the I-SMF 2.

In a first implementation, after step 805, step 806a and step 807a are performed. In a second implementation, after step 805, step 806b and step 807b are performed.

806a: The AMF sends a first message to the HSS+UDM, to report, to the HSS+UDM, SGW node name information of an SGW-C+I-SMF corresponding to the session of the terminal.

During implementation of step 806a, the AMF may report the terminal-level SGW node name information or the session-level SGW node name information to the HSS+UDM. If the AMF reports the terminal-level SGW node name information to the HSS+UDM, the HSS+UDM stores only one piece of SGW node name information for one terminal, and the AMF reports only one terminal-level SGW node name to the HSS+UDM for one terminal. If there are a plurality of SGW-C+I-SMFs having SGW node names because the terminal has a plurality of sessions, the AMF selects one of the SGW node names for reporting. If the terminal-level SGW node name information of the terminal is changed in step 802, the AMF may send new terminal-level SGW node name information to the HSS+UDM. In this case, the first message may include the new terminal-level SGW node name information, for the HSS+UDM to update the terminal-level SGW node name information. If the AMF reports the session-level SGW node name information to the HSS+UDM, the HSS+UDM stores one piece of SGW node name information for one session of one terminal, where the SGW node name information is reported by the AMF. The AMF reports a session-level SGW node name to the HSS+UDM for each session. If the session-level SGW node name information of the terminal is changed in step 802, the AMF may send new session-level SGW node name information to the HSS+UDM. In this case, the first message may include the new session-level SGW node name information, for the HSS+UDM to update the session-level SGW node name information.

For example, if the AMF has not registered with the HSS+UDM for the terminal, the first message may be an Nudm_UECM_Registration Request message sent when the AMF registers with the HSS+UDM. If the AMF has registered with the HSS+UDM for the terminal, and after step 802, the terminal-level SGW node name information or the session-level SGW node name information is changed, the first message may be an Nudm_UECM_Update Request message sent by the AMF to the HSS+UDM.

807a: The HSS+UDM records the updated SGW node name information based on the first message, and returns a first response to the AMF.

For example, the first response may be an Nudm_UECM_Update Response message.

806b: The I-SMF 3, serving as an I-SMF, sends a registration request to the HSS+UDM.

The registration request may include a session-level SGW node name of the session of the I-SMF 3.

For example, the registration request may be an Nudm_UECM_Registration Request message.

807b: The HSS+UDM records information in the registration request, and returns a corresponding registration response to the I-SMF 3.

After step 807a or step 807b, if the MME has registered with the HSS+UDM for the terminal, step 808a and step 809a are performed. If the MME has not registered with the HSS+UDM for the terminal, step 808b and step 809b are performed.

808a: The HSS+UDM sends a second message to the MME.

The second message may include a terminal-level SGW node name or a session-level SGW node name.

For example, the second message may be an Insert Subscriber Data Request message.

If the MME supports only the terminal-level SGW node name but the HSS+UDM stores only session-level SGW node names, the HSS+UDM selects one of the session-level SGW node names as the terminal-level SGW node name.

809a: The MME records the terminal-level SGW node name or the session-level SGW node name based on the second message, and returns a second response to the HSS+UDM.

For example, the second response may be an Insert Subscriber Data Answer message.

808b: The MME sends a registration request to the HSS+UDM.

For example, the registration request may be an Update Location Request message.

809b: The HSS+UDM sends a registration response to the MME, where the registration response includes a terminal-level SGW node name or a session-level SGW node name. After receiving the registration response, the MME records information in the registration response.

For example, the registration response may be an Update Location Answer message.

If the terminal accesses the 4G network, due to a reason such as session establishment or a location area change of the terminal, the MME needs to select an SGW-C for a session (denoted as a session 4), and reports terminal-level SGW node name information to an HSS+UDM. The following describes an example of an SGW-C selection process in the 4G network using FIG. 9. It should be noted that there is no session-level SGW node name, but there is only a terminal-level SGW node name in the 4G network.

Figure 9:
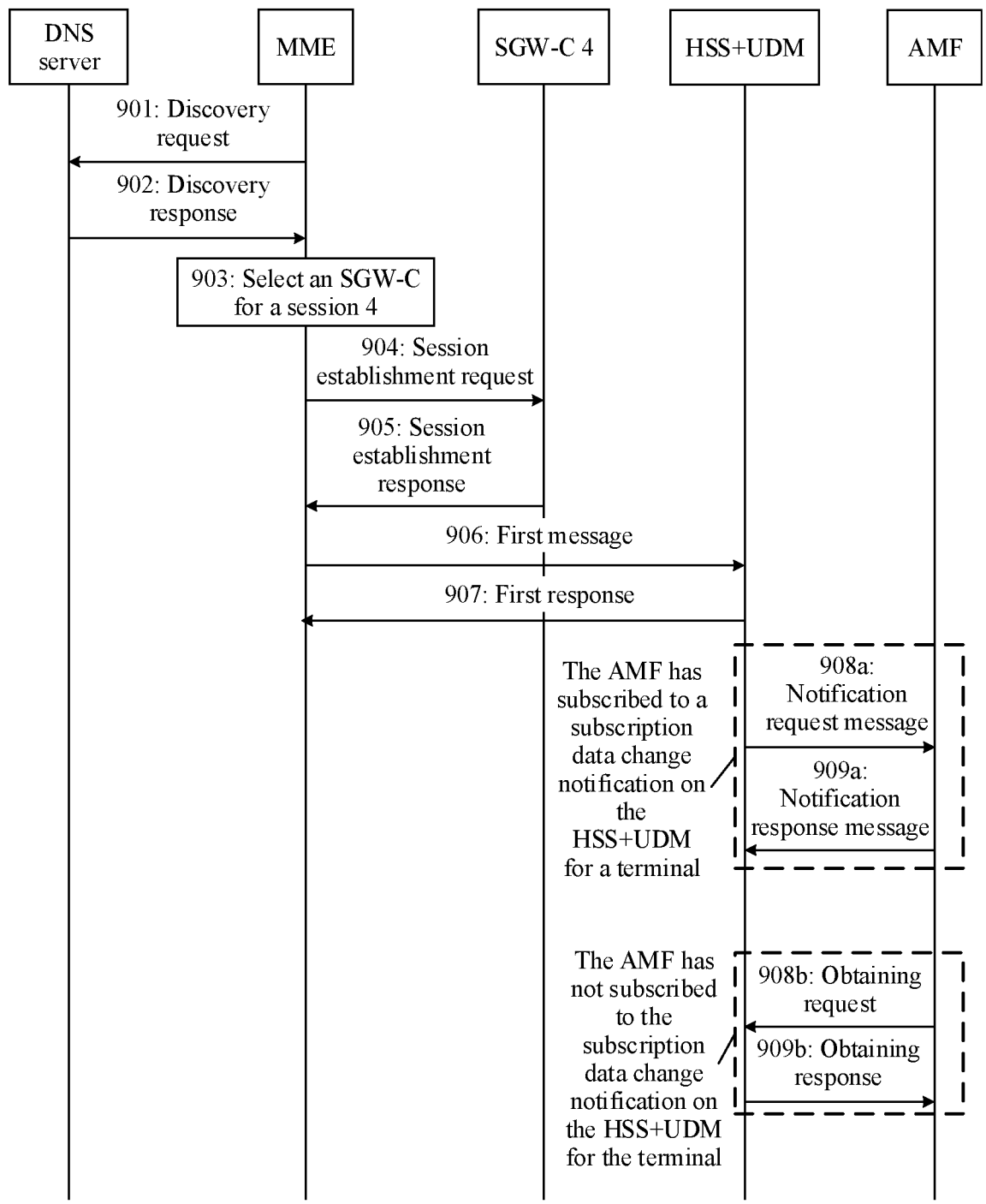

Refer to FIG. 9. The process includes the following steps.

901 to 905: Similar to 701 to 705, and a difference lies in that a session herein is the session 4, and a selected SGW-C, which is denoted as an SGW-C 4 herein, may be different from the SGW-C 2.

906: The MME sends a first message to the HSS+UDM, to report terminal-level SGW node name information to the HSS+UDM.

If the MME has not registered with the HSS+UDM for the terminal, the first message may be an Update Location Request message sent when the MME registers with the HSS+UDM. If the MME has registered with the HSS+UDM for the terminal, and a terminal-level SGW node name is changed after step 902, the first message may be a Notify Request message sent by the MME to the HSS+UDM. The first message may include a changed terminal-level SGW node name, to update the terminal-level SGW node name in the HSS+UDM.

907: The HSS+UDM records the terminal-level SGW node name based on the first message, and returns a first response to the MME.

After step 907, if the AMF has subscribed to a subscription data change notification on the HSS+UDM for the terminal, step 908*a* and step 909*a* are performed. If the AMF has not subscribed to a subscription data change notification on the HSS+UDM for the terminal, step 908*b* and step 909*b* are performed.

908*a*: The HSS+UDM sends a notification request message to the AMF.

The notification request message includes the terminal-level SGW node name.

For example, the notification request message may be an Nudm_SDM_Notification Request message.

909*a*: The AMF records the terminal-level SGW node name in the notification request message, and returns a notification response message to the HSS+UDM.

The notification response message may be an Nudm_SDM_Notification Response message.

908*b*: The AMF sends an obtaining request to the HSS+UDM, where the obtaining request is used to request to obtain subscription data.

For example, the obtaining request may be an Nudm_SDM_Get Request message.

909*b*: The HSS+UDM sends an obtaining response to the AMF based on the obtaining request.

The obtaining response may include the terminal-level SGW node name. The AMF records the terminal-level SGW node name based on the obtaining response.

For example, the obtaining response may be an Nudm_SDM_Get Response message.

Third Part: Selection of an Intermediate Session Management Network Element in a Network Migration Process The selection of the intermediate session management network element in the network migration process is related to whether an N26 interface exists between an AMF and an MME. The following provides descriptions using an application scenario 1 and an application scenario 2 separately.

Application scenario 1: The N26 interface exists between the AMF and the MME.

In the application scenario 1, the AMF and the MME can directly exchange information. This application provides a communication method. As shown in FIG. 10, the method includes the following steps.

1001: When a terminal needs to be migrated from a source network to a target network, a second mobility management network element (denoted as a second AMF) in a first network obtains information about N intermediate session management network elements corresponding to a session of the terminal in the source network, where the information about the N intermediate session management network elements is used to indicate a type of each of the N intermediate session management network elements, the type includes an independent intermediate session management network element or an SGW-C+I-SMF, the source network is the first network and the target network is a second network, or the source network is the second network and the target network is the first network, and N is an integer greater than 0.

The first network may be a 5G network and the second network may be a 4G network.

1002: The second AMF determines, based on the types of the N intermediate session management network elements, a second intermediate session management network element corresponding to a session of the terminal in the target network.

According to the method provided in FIG. 10, when the terminal needs to be migrated from the source network to the target network, the intermediate session management network element corresponding to the session of the terminal in the target network may be determined depending on whether the intermediate session management network element is the SGW-C+I-SMF. If the SGW-C+I-SMF needs to be determined for the session of the terminal in the target network, the SGW-C+I-SMF may be preferentially determined for the session of the terminal in the target network, such that the session of the terminal is anchored to the SGW-C+I-SMF after the network migration. Therefore, overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

The following describes the method shown in FIG. 10 in detail using a first scenario (where the source network is the 5G network and the target network is the 4G network) and a second scenario (where the source network is the 4G network and the target network is the 5G network).

First scenario: The source network is the 5G network and the target network is the 4G network.

The terminal may need to be migrated from the 5G network to the 4G network due to a reason such as cell handover or a tracking area update.

In the first scenario, in a first possible implementation, the N intermediate session management network elements include the SGW-C+I-SMF. In this case, during implementation, step 1002 may include the following.

(11) The second AMF selects the SGW-C+I-SMF in the N intermediate session management network elements as the second intermediate session management network element corresponding to the session of the terminal in the 4G network.

For example, in a scenario shown in FIG. 11, the N intermediate session management network elements are a second SGW-C+I-SMF. In this case, the second AMF may determine that the second SGW-C+I-SMF is the second intermediate session management network element corresponding to the session of the terminal in the 4G network.

After step (11), the second AMF may set a session management node identifier change bit corresponding to a session that is of the terminal and that is managed by the second intermediate session management network element in the 5G network to false, and set a session management node identifier change bit corresponding to another session of the terminal in the 5G network to true.

If a session management node identifier change bit corresponding to a session is set to false, it indicates that an intermediate session management network element corresponding to the session is not changed before and after migration. If a session management node identifier change bit corresponding to a session is set to true, it indicates that an intermediate session management network element corresponding to the session is changed before and after migration. The session management node identifier change bit may include one or more bits, and different values of the one or more bits indicate different meanings. For example, if the session management node identifier change bit is one bit, when the bit is set to 1, it may indicate that the session management node identifier change bit is set to false; or when the bit is set to 0, it may indicate that the session management node identifier change bit is set to true; and vice versa.

For example, based on the example shown in FIG. 11, before the migration, the 5G network includes a session 1, a session 2, and a session 3. If the second SGW-C+I-SMF is the second intermediate session management network element, after the migration, the second AMF considers that intermediate session management network elements corresponding to the session 1 and the session 2 remain unchanged, and considers that an intermediate session management network element corresponding to the session 3 is changed from an independent I-SMF to the second SGW-C+I-SMF. Therefore, the second AMF may set session management node flag bits corresponding to the session 1 and the session 2 to false, and set a session management node flag bit corresponding to the session 3 to true.

It should be noted that, the second AMF determines, using the second intermediate session management network element determined by the second AMF as a reference, whether the intermediate session management network element corresponding to the session before and after the migration is changed. However, whether an MME in the 4G network selects the second intermediate session management network element as an intermediate session management network element of the terminal is unknown. Therefore, the second AMF finally needs to determine, with reference to another condition, whether an intermediate session management network element corresponding to an actual session is changed before and after the migration.

Optionally, after step (11), the method further includes the following steps.

(12) The second AMF sends a relocation request (denoted as a first relocation request) to a third mobility management network element (denoted as a third MME) in the 4G network, where the first relocation request includes information about the second intermediate session management network element and indication information, and the indication information is used to indicate that the second intermediate session management network element is the SGW-C+I-SMF. Correspondingly, the third MME receives the first relocation request from the second AMF.

Optionally, the first relocation request further includes a session identifier allocated by the second intermediate session management network element to the terminal in the 4G network, for example, an SGW F-TEID allocated by the second intermediate session management network element to the terminal.

(13) The third MME obtains information about M intermediate session management network elements that can serve the terminal in the 4G network.

(14) The third MME determines, based on the first relocation request and the M intermediate session management network elements, that one SGW-C+I-SMF is an intermediate session management network element corresponding to the session of the terminal in the 4G network.

Optionally, during implementation, step (14) includes the following.

If the second intermediate session management network element belongs to the M intermediate session management network elements, the third MME determines that the second intermediate session management network element is the intermediate session management network element corresponding to the session of the terminal in the 4G network. For example, in the scenario shown in FIG. 11, the third MME may determine that the second SGW-C+I-SMF is the second intermediate session management network element corresponding to the session of the terminal in the 4G network. In this case, the second intermediate session management network element does not need to re-establish the session, but only needs to update the session. This can avoid a waste of resources.

Alternatively, if the second intermediate session management network element does not belong to the M intermediate session management network elements, the third MME determines that one SGW-C+I-SMF in the M intermediate session management network elements is the intermediate session management network element corresponding to the session of the terminal in the 4G network.

It should be noted that, in the 4G network, all sessions of the terminal correspond to a same intermediate session management network element. In step (14), after the terminal is migrated from the 5G network to the 4G network, the session of the terminal may be anchored to the SGW-C+I-SMF, to improve overall communication efficiency of the network. For example, network address resources are reduced to simplify network planning and deployment complexity, a quantity of nodes in the network is reduced to simplify network operation and maintenance workload, and signaling between the nodes in the network is reduced to reduce network service load.

In the first scenario, in a second possible implementation, the N intermediate session management network elements do not include the SGW-C+I-SMF. In this case, the method further includes the following steps.

(21) The second AMF sends a relocation request (denoted as a second relocation request) to a third MME, where the second relocation request may include a globally unique session identifier of the terminal. For example, the globally unique identifier may be: Identifier of the terminal+EPS bearer ID.

(22) The third MME receives the second relocation request, and determines that one SGW-C+I-SMF in the M intermediate session management network elements is an intermediate session management network element corresponding to the session of the terminal in the 4G network.

Based on the first possible implementation and the second possible implementation, after step (14) or step (22), if the intermediate session management network element corresponding to the session of the terminal in the 4G network is denoted as a third intermediate session management network element, optionally, the method further includes the following step (31) to step (33).

(31) The third MME sends a request message to the third intermediate session management network element, where the request message is used to request to locate the session of the terminal.

(32) The third intermediate session management network element receives the request message, and locates the corresponding session based on the request message.

(33) The third intermediate session management network element modifies an access type of the session corresponding to the third intermediate session management network element to the 4G network.

Before step (31), if the third MME receives the first relocation request, and the second intermediate session management network element belongs to the M intermediate session management network elements, the third MME sets a session management node identifier change bit of the terminal to false. If the third MME receives the second relocation request, or receives the first relocation request but the second intermediate session management network element does not belong to the M intermediate session management network elements, the third MME sets the session management node identifier change bit of the terminal to true.

If a session management node identifier change bit of a terminal is set to false, it indicates that an intermediate session management network element corresponding to the terminal is not changed before and after migration. Provided that an intermediate session management network element corresponding to one session of the terminal is not changed before and after the migration, it is considered that the intermediate session management network element corresponding to the terminal is not changed before and after the migration. If a session management node identifier change bit of a terminal is set to true, it indicates that an intermediate session management network element corresponding to a session is changed before and after migration. After intermediate session management network elements corresponding to all sessions of the terminal change before and after the migration, it is considered that the intermediate session management network element corresponding to the terminal is changed before and after the migration. For descriptions of the session management node identifier change bit, refer to the foregoing descriptions. Details are not described again.

During implementation of step (31), when the session management node identifier change bit of the terminal is set to false and a session identifier allocated by the third intermediate session management network element to the terminal in the 4G network (for example, an SGW F-TEID allocated by the third intermediate session management network element to the terminal) is valid, the request message includes the session identifier allocated by the third intermediate session management network element to the terminal in the 4G network. Otherwise, the request message may include the globally unique session identifier of the terminal.

During implementation of step (32), the third intermediate session management network element may locate the corresponding session based on the session identifier allocated by the third intermediate session management network element to the terminal in the 4G network or the globally unique session identifier of the terminal in the request message. If an intermediate session management network element corresponding to a session (for example, the session 1 and the session 2 in FIG. 11) is not changed, the third intermediate session management network element directly updates the session. If an intermediate session management network element corresponding to a session (for example, the session 3 in FIG. 11) is changed, the third intermediate session management network element re-establishes the session.

Optionally, the method further includes: If an I-UPF used for the session (for example, the session 1, the session 2, and the session 3 in FIG. 11) corresponding to the third intermediate session management network element in the 5G network is an I-UPF+SGW-U, and the I-UPF+SGW-U can continue to serve the session corresponding to the third intermediate session management network element, the third intermediate session management network element preferentially selects the I-UPF+SGW-U to continue to serve the terminal.

Based on the first possible implementation and the second possible implementation, after step (14) or step (22), optionally, the method further includes the following step (41) and step (42):

(41) The third MME sends a relocation response to the second AMF, where the relocation response includes a session management node identifier change bit of the terminal.

(42) The second AMF receives the relocation response from the third MME, and records the session management node identifier change bit of the terminal.

If a session management node identifier change bit corresponding to a session of the terminal in the 5G network is set to true, or a session management node identifier change bit corresponding to a session of the terminal in the 5G network is set to false, but the session management node identifier change bit of the terminal is set to true, it indicates that the intermediate session management network element corresponding to the session is changed before and after the migration. In this case, the second AMF may send a release request to the I-SMF corresponding to the session, and the I-SMF releases the session based on the release request. Alternatively, the second AMF may send a release request to I-SMFs corresponding to all sessions, and the I-SMF determines whether to release a session resource. For example, if an access type of a session corresponding to one SGW-C+I-SMF is modified to the 4G network, the SGW-C+I-SMF determines not to release a resource related to the session corresponding to the SGW-C+I-SMF.

For example, refer to FIG. 11. In the scenario shown in FIG. 11, the session management node identifier change bit of the terminal is set to false, the session management node identifier change bits of the session 1 and the session 2 in the second AMF are set to false, and the session management node identifier change bit of the session 3 is set to true. In this case, the second AMF may send a release request to the independent I-SMF in FIG. 11, and the independent I-SMF releases a session resource of the session 3 based on the release request.

Figure 12:
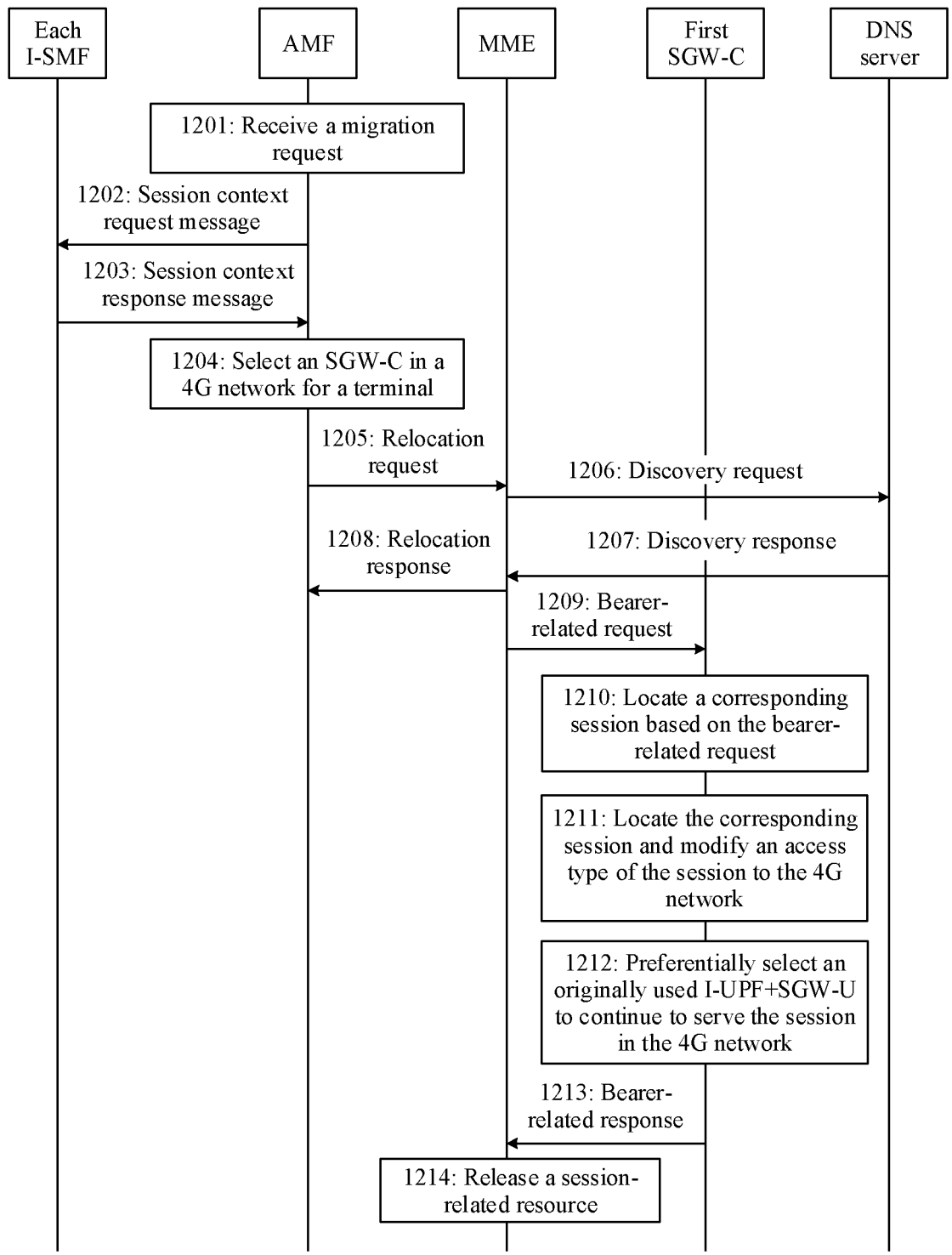
FIG. 12 is a flowchart of a communication method according to an embodiment of this application.

The following describes, using FIG. 12, an example of a procedure in which a terminal is migrated from a 5G network to a 4G network.

Refer to FIG. 12. The procedure includes the following steps.

1201: An AMF receives a migration request, where the migration request is used to request to migrate to the 4G network.

When the terminal is migrated to the 4G network through a cell handover procedure, the migration request may be a Handover Required message sent by a 5G-AN.

When the terminal is migrated to the 4G network through a tracking area update procedure, the migration request may be a Context Request message sent by an MME.

1202: The AMF sends a session context request message to each I-SMF, where the session context request message is used to request to obtain information about each session of the terminal.

For example, the session context request message may be an Nsmf_PDUSession_RetrieveSMContext Request message.

1203: Each I-SMF returns a session context response message to the AMF.

During implementation of step 1203, for a session served by an SGW-C+I-SMF, in addition to EPS bearer ID information allocated by the 4G network to the session, optionally, the session context response message further includes an SGW node name when the SGW-C+I-SMF serves as an SGW-C and an SGW F-TEID allocated to the terminal when the SGW-C+I-SMF serves as the SGW-C. The AMF may determine, depending on whether one I-SMF has corresponding SGW node name information, whether the I-SMF is an SGW-C+I-SMF.

For example, the session context response message may be an Nsmf_PDUSession_RetrieveSMContext Response message.

1204: The AMF selects an SGW-C in the 4G network for the terminal.

For example, if each session of the terminal uses one or more SGW-C+I-SMFs, the AMF may select one SGW-C+I-SMF (denoted as a first SGW-C+I-SMF) from the one or more SGW-C+I-SMFs used for each session of the terminal as the SGW-C of the terminal in the 4G network.

Optionally, if each session of the terminal uses one or more SGW-C+I-SMFs, the AMF further sets a session-level SGW change indication identifier of a session managed by the first SGW-C+I-SMF in the 5G network to false, and sets a session-level SGW change indication identifier of another session managed by the first SGW-C+I-SMF in the 5G network to true. If no session of the terminal uses the SGW-C+I-SMF, the AMF does not select an SGW-C for the terminal, and the AMF sets session-level SGW change indication identifiers of all sessions of the terminal to true.

The session-level SGW change indication identifier is the session management node identifier change bit of the session in the foregoing descriptions.

1205: The AMF sends a relocation request to the MME.

If the AMF selects the first SGW-C+I-SMF for the terminal, and the AMF obtains, using step 602 or step 1203, an SGW node name corresponding to the first SGW-C+I-SMF, the relocation request includes the SGW node name corresponding to the first SGW-C+I-SMF; otherwise, the relocation request does not include an SGW node name information element. Optionally, if an SGW F-TEID allocated to the terminal when the first SGW-C+I-SMF serves as the SGW-C is further obtained in step 1203, the relocation request further includes the SGW F-TEID; otherwise, an SGW F-TEID information element carries an invalid value.

If the AMF does not select the first SGW-C+I-SMF for the terminal, the relocation request does not include the SGW node name information element, and the SGW F-TEID information element carries the invalid value.

When the terminal is migrated to the 4G network through a cell handover procedure, the relocation request may be a Forward Relocation Request message.

When the terminal is migrated to the 4G network through a tracking area update procedure, the relocation request may be a Context Response message.

1206: The MME sends a discovery request to a DNS server, where the discovery request is used to request the DNS server to perform SGW-C discovery.

The discovery request includes information such as a location of the terminal.

For example, the discovery request may be a DNS Request message.

1207: The DNS server returns a discovery response to the MME based on the discovery request.

The discovery response includes an SGW-C candidate list, and the list includes SGW node names, service parameters, and IP address information of each interface of one or more SGW-Cs that can provide related services for the terminal. The SGW-C is an independent SGW-C or an SGW-C+I-SMF. For the SGW-C+I-SMF, the service parameters have a suffix "+nc-smf".

For example, the discovery response may be a DNS Response message.

1208: The MME selects an SGW-C of the terminal and sends a relocation response to the AMF, where the relocation response includes a terminal-level SGW change indication identifier of the terminal. The AMF stores the terminal-level SGW change indication identifier in the relocation response.

The terminal-level SGW change indication identifier is a session management node identifier change bit of the terminal.

In step 1208, the MME selects the SGW-C of the terminal from the SGW-C candidate list. When the relocation request carries the SGW node name corresponding to the first SGW-C+I-SMF, and the SGW node name is in the SGW-C list, the SGW-C that is of the terminal and that is selected by the MME of the terminal is an SGW-C (namely, the first SGW-C+I-SMF) represented by the SGW node name, and the terminal-level SGW change indication identifier of the terminal is set to false. Otherwise, the SGW-C that is of the terminal and that is selected by the MME is an SGW-C, in the SGW-C candidate list, whose service parameters have the suffix "+nc-smf" (namely, the SGW-C+I-SMF), and the terminal-level SGW change indication identifier is set to true.

For ease of description, the SGW-C selected by the MME is denoted as a first SGW-C below.

When the terminal is migrated to the 4G network through the cell handover procedure, the relocation response may be a Forward Relocation Response message sent by the MME to the AMF.

When the terminal is migrated to the 4G network through the tracking area update procedure, the relocation response may be a Context Acknowledge message sent by the MME to the AMF.

1209: The MME sends a bearer-related request to the first SGW-C.

If the terminal-level SGW change indication identifier of the terminal is false, and an SGW F-TEID allocated by the first SGW-C to the terminal is valid, the bearer-related request may be a Modify Bearer Request message. The message may include the SGW F-TEID allocated by the first SGW-C to the terminal.

If the terminal-level SGW change indication identifier of the terminal is true or the SGW F-TEID allocated by the first SGW-C to the terminal is invalid, the bearer-related request may be a Create Session Request message. The message does not include information about the SGW F-TEID, but includes an identifier of the terminal and the EPS bearer ID information obtained in step 1203.

1210: The first SGW-C locates a corresponding session based on the bearer-related request.

If the bearer-related request is the Modify Bearer Request message, the first SGW-C locates the corresponding session based on the SGW F-TEID in the message.

If the bearer-related request is the Create Session Request message, the first SGW-C locates the corresponding session based on the terminal identifier and the EPS bearer ID information in the message.

1211: If the first SGW-C locates the corresponding session, the first SGW-C modifies an access type of the session to the 4G network.

1212: For any session of the terminal in the 5G network, if an I-UPF used for the session is an I-UPF+SGW-U, and the I-UPF+SGW-U can continue to serve the session, the first SGW-C preferentially selects the originally used I-UPF+SGW-U to continue to serve the session in the 4G network.

In this case, the first SGW-C sends a session modification request to the originally used I-UPF+SGW-U. After completing related processing based on the session modification request, the I-UPF+SGW-U returns a session modification response to the first SGW-C.

The session modification request may be a PFCP Session Modification Request message. The session modification response may be a PFCP Session Modification Response message.

1213: After completing service processing, for example, interaction with a PGW-C, the first SGW-C returns a bearer-related response to the MME.

If the bearer-related request is the Modify Bearer Request message, the bearer-related response may be a Modify Bearer Response message.

If the bearer-related request is the Create Session Request message, the bearer-related response may be a Create Session Response message.

1214: The AMF releases a related resource of the session.

For one session, if the terminal-level SGW change indication identifier that is of the terminal and that is stored in the AMF is false, and a session-level SGW change indication identifier of the session is false, it indicates that an intermediate session management network element corresponding to the session is not changed before and after the migration and is the first SGW-C+I-SMF. In this case, the AMF does not send a release request to the first SGW-C+I-SMF for the session in a subsequent processing procedure. Otherwise, the AMF sends, based on existing processing, the release request for the session to a corresponding I-SMF, to request to release a related resource of the session.

For one I-SMF, if the I-SMF receives a release request, but an access type of a session managed by the I-SMF in the 5G network has been modified to the 4G network, the I-SMF does not delete the session managed in the 5G network, and returns a release response only to the AMF. If the I-SMF receives the release request, and the access type of the session managed by the I-SMF in the 5G network is not modified to the 4G network, the I-SMF deletes the session managed in the 5G network.

For example, the release request may be an Nsmf_PDUSession_ReleaseSMContext Request message. The release response may be an Nsmf_PDUSession_ReleaseSMContext Response message.

Second scenario: The source network is the 4G network and the target network is the 5G network. In this case, N=1.

After accessing the 4G network, due to a reason such as cell handover or a registration update, the terminal may need to be migrated from the 4G network to the 5G network.

In the second scenario, the method shown in FIG. 10 further includes: The second AMF obtains information about M intermediate session management network elements that can serve the terminal in the 5G network, where the information about the M intermediate session management network elements is used to indicate a type of each of the M intermediate session management network elements. In this case, step 1002 includes: 1002-A: The second AMF determines, based on the types of the N intermediate session management network elements and the types of the M intermediate session management network elements, the second intermediate session management network element corresponding to a second session of the terminal in the 5G network.

The second session may be any session of the terminal.

Optionally, during implementation, step 1002-A may include:

If the N intermediate session management network elements include the SGW-C+I-SMF, and the SGW-C+I-SMF belongs to the M intermediate session management network elements, the second AMF preferentially selects, from the M intermediate session management network elements, the SGW-C+I-SMF as the second intermediate session management network element corresponding to the second session. In this case, the SGW-C+I-SMF does not need to re-establish the session, but only needs to update the session. This avoids a waste of resources.

Alternatively, if the N intermediate session management network elements do not include the SGW-C+I-SMF, or the N intermediate session management network elements include the SGW-C+I-SMF but the SGW-C+I-SMF does not belong to the M intermediate session management network elements, the second AMF preferentially selects one SGW-C+I-SMF from the M intermediate session management network elements as the second intermediate session management network element corresponding to the second session.

Figure 13:
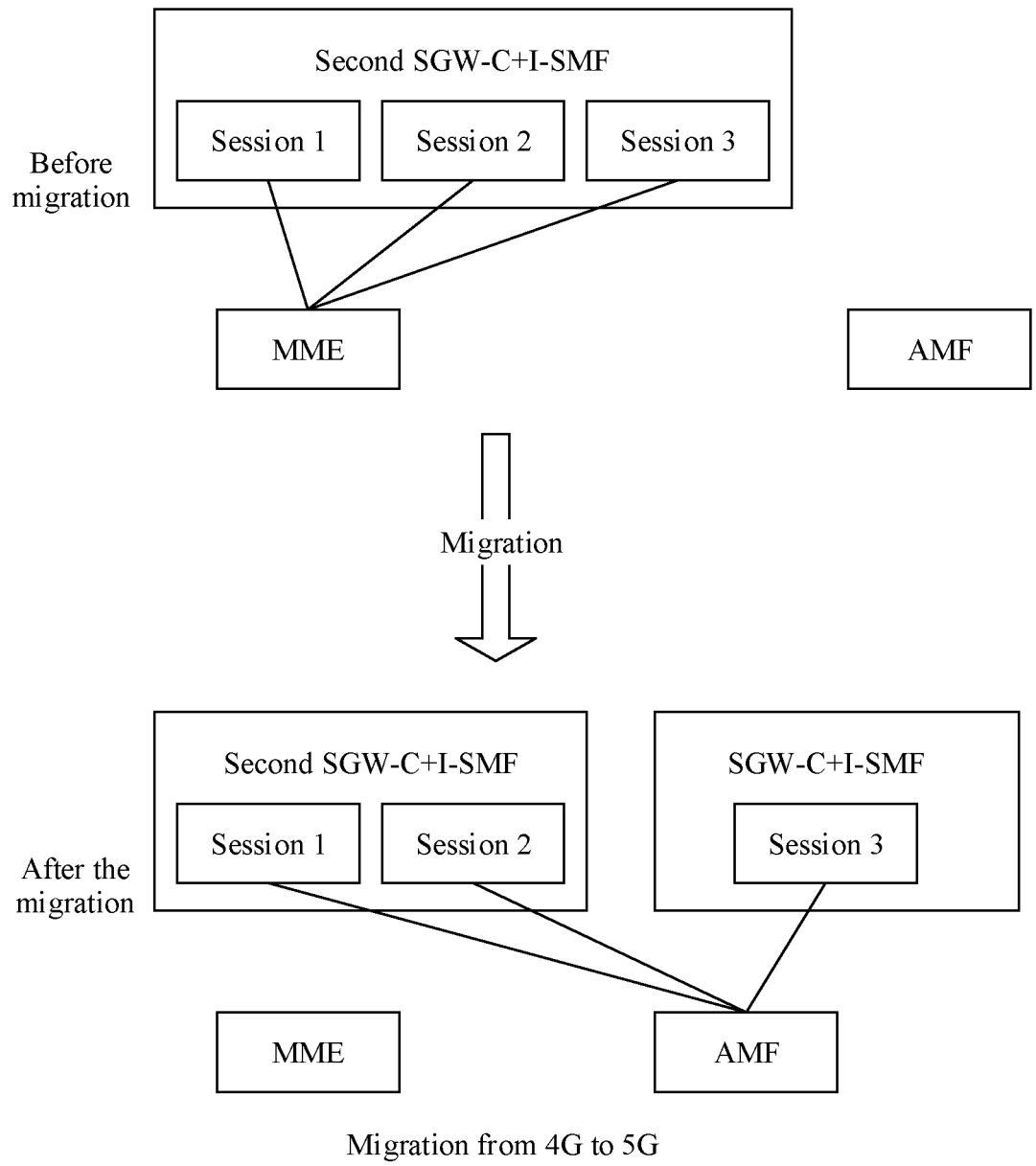
FIG. 13 is a schematic diagram of network migration according to an embodiment of this application.

For example, refer to FIG. 13. The N intermediate session management network elements are a second SGW-C+I-SMF. For a session 1 and a session 2, if the second SGW-C+I-SMF belongs to the M intermediate session management network elements, the second AMF may determine that the second SGW-C+I-SMF is a second intermediate session management network element corresponding to the session 1 and the session 2 of the terminal. For a session 3, if the second SGW-C+I-SMF does not belong to the M intermediate session management network elements, the second AMF may determine that one SGW-C+I-SMF in the M intermediate session management network elements is a second intermediate session management network element corresponding to the session 3 of the terminal.

According to the optional method, after the terminal is migrated from the 4G network to the 5G network, the session of the terminal may be anchored to the SGW-C+I-SMF, to improve overall communication efficiency of the network. For example, network address resources are reduced to simplify network planning and deployment complexity, a quantity of nodes in the network is reduced to simplify network operation and maintenance workload, and signaling between the nodes in the network is reduced to reduce network service load.

Optionally, the method further includes the following steps.

(11) The second AMF sends a request message to the SGW-C+I-SMF (namely, the second intermediate session management network element), where the request message is used to request the SGW-C+I-SMF to update the second session, and the request message includes a session identifier allocated by the SGW-C+I-SMF to the terminal in the 4G network, for example, an SGW F-TEID allocated by the SGW-C+I-SMF to the terminal.

(12) The SGW-C+I-SMF receives the request message, and updates the second session based on the request message.

(13) The SGW-C+I-SMF modifies an access type of the second session to the 5G network.

During implementation of step (12), the SGW-C+I-SMF may update the second session (for example, the session 1 or the session 2 in FIG. 13) based on the session identifier that is in the request message and that is allocated by the SGW-C+I-SMF to the terminal in the 4G network.

Optionally, the method further includes:

If the N intermediate session management network elements include the SGW-C+I-SMF, and the SGW-C+I-SMF belongs to the M intermediate session management network elements, the second AMF sets a session management node change flag bit corresponding to a session (for example, the session 1 or the session 2 in FIG. 13) managed by the SGW-C+I-SMF in the 5G network to false, and sets a session management node change flag bit corresponding to another session (for example, the session 3 in FIG. 13) of the terminal in the 5G network to true.

Alternatively, if the N intermediate session management network elements do not include the SGW-C+I-SMF, or the N intermediate session management network elements include the SGW-C+I-SMF but the SGW-C+I-SMF does not belong to the M intermediate session management network elements, the second AMF sets a session management node change identifier corresponding to a session of the terminal in the 4G network to true.

Optionally, the method further includes:

If a session management node change flag bit corresponding to at least one session of the terminal in the 5G network is set to false, the second AMF sets a session management node change flag bit of the terminal to false.

Alternatively, if session management node change flag bits corresponding to all sessions of the terminal in the 5G network are set to false, the second AMF sets the session management node change flag bit of the terminal to false.

Optionally, if the session management node change flag bit corresponding to the at least one session of the terminal in the 5G network is set to true but the session management node change flag bit of the terminal is set to false, it indicates that an intermediate session management network element corresponding to at least one of a plurality of sessions of the terminal in the 5G network is changed. In this case, the method further includes: The second AMF sends a release request to the N intermediate session management network elements, where the release request is used to request to release a session resource. The N intermediate session management network elements delete, based on the release request, a session whose access type is not modified to the 5G network, and do not delete a session whose access type is modified to the 5G network.

Figure 14:
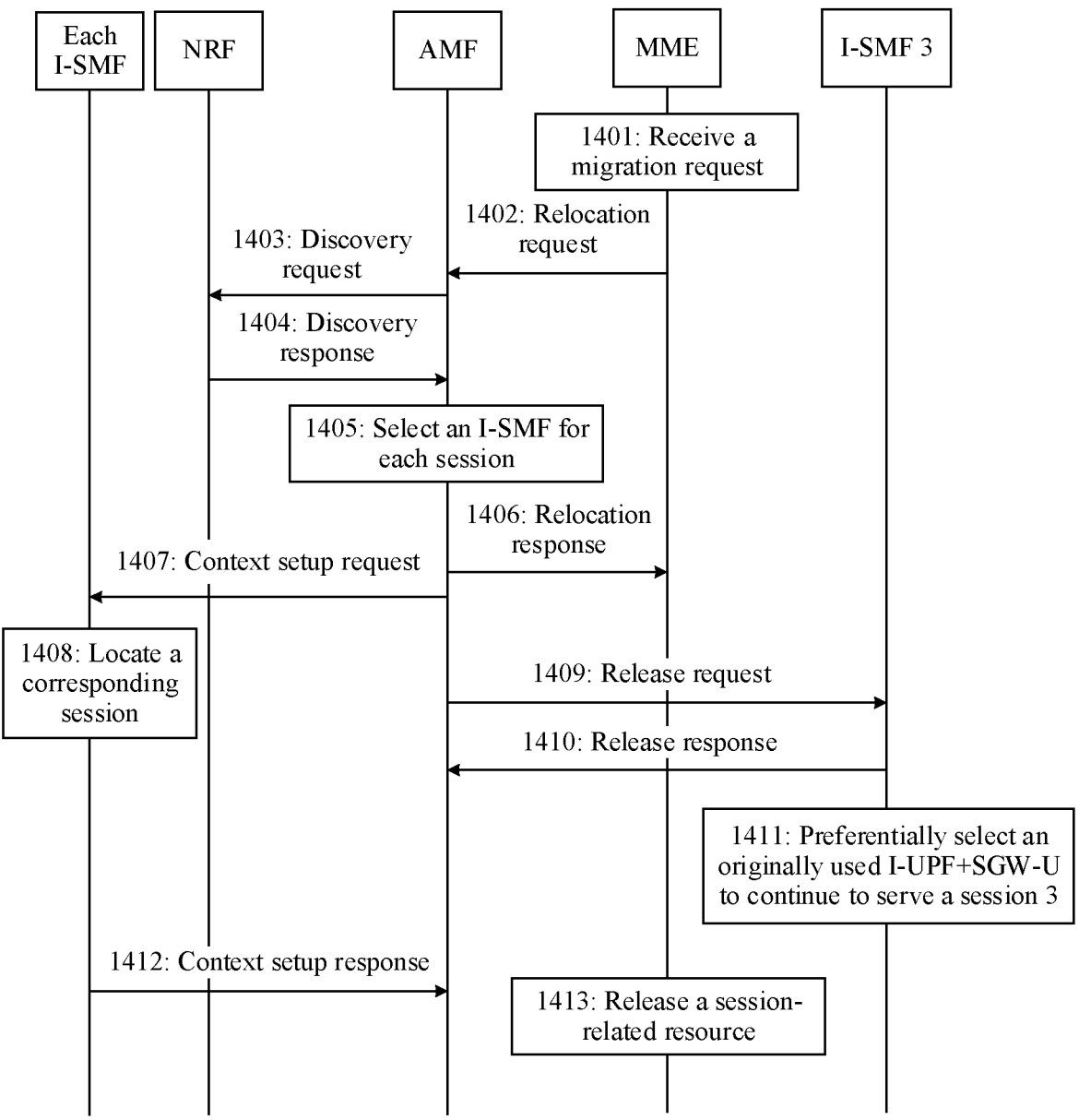
FIG. 14 to FIG. 17 are flowcharts of a communication method according to at least one embodiment of this application.

The following describes, using FIG. 14, an example of a process in which a terminal is migrated from a 4G network to a 5G network.

Refer to FIG. 14. The process includes the following steps.

1401: An MME receives a migration request, where the migration request is used to request to migrate to the 5G network.

When the terminal is migrated to the 5G network through a cell handover procedure, the migration request may be a Handover Required message sent by an E-UTRAN.

When the terminal is migrated to the 5G network through a registration update procedure, the migration request may be a Context Request message sent by an AMF.

1402: The MME sends a relocation request to the AMF.

The relocation request includes an SGW node name of an SGW-C of the terminal, an SGW F-TEID allocated by the SGW-C of the terminal to the terminal, an identifier of the terminal, and an EPS bearer ID of each session of the terminal in the 4G network.

When the terminal is migrated to the 5G network through a cell handover procedure, the relocation request may be a Forward Relocation Request message sent by the MME to the AMF.

When the terminal is migrated to the 5G network through a registration update procedure, the relocation request may be a Context Response message sent by the MME to the AMF.

1403: The AMF sends a discovery request to an NRF, where the discovery request is used to request to perform I-SMF discovery.

The discovery request may include information such as a location of the terminal.

For example, the discovery request may be an Nnrf_NF-Discovery Request message.

1404: The NRF returns a discovery response to the AMF.

The discovery response may include an I-SMF candidate list. The list includes address information of one or more I-SMFs that can provide related services for the terminal. The I-SMF is an independent I-SMF or an SGW-C+I-SMF. For the SGW-C+I-SMF, the discovery response further includes SGW node name information when the SGW-C+I-SMF serves as an SGW-C.

It should be noted that the AMF may determine, depending on whether one I-SMF has corresponding SGW node name information, whether the I-SMF is an SGW-C+I-SMF. For example, when one I-SMF has corresponding SGW node name information, the I-SMF is an SGW-C+I-SMF. Otherwise, the I-SMF is not the SGW-C+I-SMF.

During implementation of step 1404, the NRF may determine, based on the location of the terminal and location areas supported by I-SMFs, I-SMFs that can serve the terminal, include information about the I-SMFs in the discovery response, and send the discovery response to the AMF.

For example, the discovery response may be an Nnrf_NF-Discovery Response message.

1405: The AMF selects an I-SMF for each session.

It should be noted that the AMF may obtain an I-SMF candidate list once for each session corresponding to the SGW-C. In this case, during implementation of step 1405, for each session (for example, a session 3) corresponding to the SGW-C of the terminal, If the SGW node name that is of the SGW-C and that is included in the relocation request belongs to an I-SMF (denoted as an I-SMF 3) in the I-SMF candidate list obtained for the session 3, the AMF preferentially selects the I-SMF 3 as an I-SMF of the session 3, and may further set a session-level SGW change indication identifier of the session 3 to false. If the SGW node name that is of the SGW-C and that is included in the relocation request does not belong to an I-SMF in the I-SMF candidate list obtained for the session 3, the AMF preferentially selects an SGW-C+I-SMF in the I-SMF candidate list as the I-SMF of the session 3, and may further set the session-level SGW change indication identifier of the session 3 to true.

1406: The AMF sends a relocation response to the MME, where the relocation response includes a terminal-level SGW change indication identifier of the terminal. The MME records the terminal-level SGW change indication identifier of the terminal in the relocation response.

If a session-level SGW change indication identifier of at least one session of the terminal is false, the terminal-level SGW change indication identifier of the terminal is false.

If session-level SGW change indication identifiers of all sessions of the terminal are false, the terminal-level SGW change indication identifier of the terminal is false.

When the terminal is migrated to the 5G network through the cell handover procedure, the relocation response may be a Forward Relocation Response message sent by the AMF to the MME.

When the terminal is migrated to the 5G network through the registration update procedure, the relocation response may be a Context Acknowledge message sent by the AMF to the MME.

1407: The AMF sends a context setup request to each I-SMF selected for each session of the terminal.

The context setup request sent to one I-SMF includes the identifier of the terminal and the EPS bearer ID of the session that is managed by the I-SMF and that is of the terminal in the 4G network that are received in step 1402.

Optionally, for one session, if a session-level SGW change indication identifier of the session is false, the context request may further include the SGW F-TEID that is allocated by the SGW-C of the terminal to the terminal and that is received in step 1402.

For example, the context setup request may be an Nsmf_PDUSession_CreateSMContext Request message.

1408: Each I-SMF locates a corresponding session.

During implementation of step 1408, if the context request includes the SGW F-TEID allocated by the SGW-C of the terminal to the terminal, the I-SMF locates the corresponding session based on the SGW F-TEID. Otherwise, the I-SMF locates the corresponding session based on the identifier of the terminal and the EPS bearer ID corresponding to the session in the context request.

If the I-SMF locates the corresponding session, the I-SMF modifies an access type of the corresponding session to the 5G network.

1409: The AMF sends a release request to the I-SMF 3.

When at least one session-level SGW change indication identifier is true but the terminal-level SGW change indication identifier is false, the AMF may send the release request to the I-SMF 3, to request to release a resource of a session that is of the I-SMF 3 and whose intermediate session management network element is changed. The release request may include the identifier of the terminal and the EPS bearer IDs corresponding to the sessions that are received in step 1402. Optionally, the release request further includes the SGW F-TEID that is allocated by the SGW-C of the terminal to the terminal and that is received in step 1402 and a "4G session deletion identifier".

For example, the release request may be an Nsmf_PDUSession_CreateSMContext Request message.

1410: The I-SMF 3 sends a release response to the AMF.

During implementation of step 1410, if an access type of a session corresponding to the I-SMF 3 is the 5G network, the I-SMF 3 does not delete the session. If an access type of a session corresponding to the I-SMF 3 is the 4G network and the release request includes the "4G session deletion identifier", the I-SMF 3 deletes the session.

For example, the release response may be an Nsmf_PDUSession_CreateSMContext Response message.

1411: If an SGW-U used for the session 3 is an I-UPF+SGW-U, and the I-UPF+SGW-U can continue to serve the session 3, the I-SMF 3 preferentially selects the originally used I-UPF+SGW-U to continue to serve the session 3.

In this case, the I-SMF 3 sends a session modification request to the originally used I-UPF+SGW-U. After completing related processing based on the session modification request, the I-UPF+SGW-U returns a session modification response to the I-SMF 3.

The session modification request may be a PFCP Session Modification Request message. The session modification response may be a PFCP Session Modification Response message.

1412: After completing service processing, for example, interaction with an A-SMF, each I-SMF corresponding to each session of the terminal returns a context setup response to the AMF.

The context setup response may be an Nsmf_PDUSession_CreateSMContext Response message.

1413: The MME releases a related resource of the session.

If the terminal-level SGW change indication identifier that is of the terminal and that is stored by the MME in step 1406 is false, the MME does not send a release request to the SGW-C of the terminal in a subsequent processing procedure. Otherwise, the MME sends the release request to the SGW-C of the terminal in the subsequent processing procedure, to request to release the related resource of the session. If an access type of a session corresponding to the SGW-C of the terminal has been modified to the 5G network, the SGW-C of the terminal does not delete the session. Otherwise, the SGW-C of the terminal deletes the session.

For example, the release request may be a Delete Session Request message.

Application scenario 2: No N26 interface exists between the AMF and the MME.

In the application scenario 2, the MME and the AMF need to exchange information through an HSS+UDM.

Figure 15:
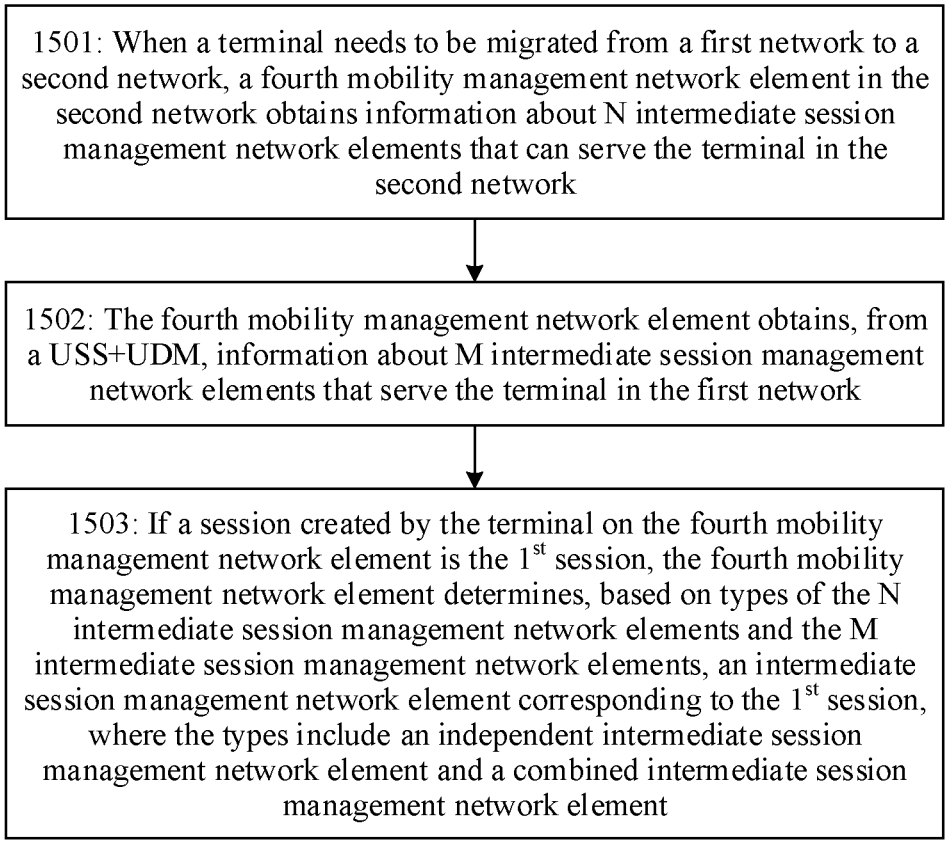

In the application scenario 2, this application provides a communication method. As shown in FIG. 15, the communication method includes the following steps.

1501: When a terminal needs to be migrated from a first network to a second network, a fourth mobility management network element in the second network obtains information about N intermediate session management network elements that can serve the terminal in the second network.

The first network is a 5G network and the second network is a 4G network, or the first network is a 4G network and the second network is a 5G network.

1502: The fourth mobility management network element obtains, from a USS+UDM, information about M intermediate session management network elements that serve the terminal in the first network.

1503: If a session created by the terminal on the fourth mobility management network element is the 1$^{st}$ session, the fourth mobility management network element determines, based on types of the N intermediate session management network elements and the M intermediate session management network elements, an intermediate session management network element corresponding to the 1$^{st}$ session, where the types include an independent intermediate session management network element and an SGW-C+I-SMF.

Optionally, during implementation, step 1503 includes the following.

If there is an SGW-C+I-SMF belonging to both the M intermediate session management network elements and the N intermediate session management network elements, the fourth mobility management network element selects the SGW-C+I-SMF belonging to both the M intermediate session management network elements and the N intermediate session management network elements as the intermediate session management network element corresponding to the 1$^{st}$ session.

Alternatively, if the M intermediate session management network elements do not include the SGW-C+I-SMF, or the M intermediate session management network elements include the SGW-C+I-SMF but the SGW-C+I-SMF in the M intermediate session management network elements does not belong to the N intermediate session management network elements, the fourth mobility management network element preferentially selects an SGW-C+I-SMF in the N intermediate session management network elements as the intermediate session management network element corresponding to the 1$^{st}$ session.

When the first network is the 5G network and the second network is the 4G network, after the intermediate session management network element corresponding to the 1$^{st}$ session is determined, an intermediate session management network element corresponding to another session in the 4G network is the same as the intermediate session management network element of the 1$^{st}$ session. When the first network is the 4G network and the second network is the 5G network, if the session created by the terminal on the fourth mobility management network element is not the 1$^{st}$ session, the fourth mobility management network element preferentially selects an SGW-C+I-SMF in an intermediate session management network element corresponding to a session that has been established by the terminal on the fourth mobility management network element as an intermediate session management network element corresponding to the created session.

According to the method provided in FIG. 15, when the terminal needs to be migrated from the first network to the second network, the SGW-C+I-SMF may be preferentially determined for the session of the terminal in the second network, such that the session of the terminal is anchored to the SGW-C+I-SMF after the network migration. Therefore, overall communication efficiency of the network is improved. For example, network address resources are reduced to simplify network planning and deployment complexity, a quantity of nodes in the network is reduced to simplify network operation and maintenance workload, and signaling between the nodes in the network is reduced to reduce network service load.

After accessing the 5G network, due to a reason such as cell handover or a tracking area update, the terminal may need to be migrated from the 5G network to the 4G network. The following describes, using FIG. 16, an example of a process in which the terminal is migrated from the 5G network to the 4G network.

1601: The terminal sends a connection request to an MME.

A request type (Request Type) included in the connection request may be "Handover", and the connection request further includes a PDU session identifier (PDU Session ID) allocated by the terminal to a session (denoted as a session 5).

For example, the connection request may be a PDN Connectivity Request message.

1602: The MME sends a discovery request to a DNS server.

For related explanations of step 1602, refer to step 1206.

1603: The DNS server returns a discovery response to the MME.

For related explanations of step 1603, refer to step 1207.

1604: The MME selects an SGW-C (denoted as an SGW-C 5) for the terminal.

During implementation of step 1604, if the session 5 is the 1$^{st}$ session established by the terminal on the MME, and in the process shown in FIG. 8, the MME records the terminal-level SGW node name of the terminal or the session-level SGW node name of the session of the terminal, the MME selects one SGW-C+I-SMF for the terminal from the terminal-level SGW node name or the session-level SGW node name of the session of the terminal. If the session 5 is the 1$^{st}$ session established by the terminal on the MME, and in the process shown in FIG. 8, the MME does not record the terminal-level SGW node name of the terminal or the session-level SGW node name of the session of the terminal, the MME selects one SGW-C+I-SMF for the terminal from an SGW-C list. If the session 5 is not the 1$^{st}$ session established by the terminal on the MME, the MME selects a used SGW-C as the SGW-C of the session 5.

1605: The MME sends a session establishment request to the SGW-C 5.

The session establishment request may include an identifier of the terminal and information about the PDU session ID that is obtained in step 1601.

For example, the session establishment request may be a Create Session Request message.

1606: The SGW-C 5 locates a corresponding session based on the session establishment request.

The SGW-C 5 may locate the corresponding session based on the identifier of the terminal and the PDU session ID that are in the session establishment request.

If the SGW-C 5 is selected from the terminal-level SGW node name of the terminal or the session-level SGW node name of the session of the terminal that is recorded by the MME, the SGW-C 5 updates the session 5 based on the session establishment request, and modifies an access type of the session 5 to the 4G network. Otherwise, the SGW-C 5 creates the session 5 based on the session establishment request.

1607: If an I-UPF used for the session 5 in the 5G network is an I-UPF+SGW-U, and the I-UPF+SGW-U can continue to serve the session 5, the SGW-C 5 preferentially selects the originally used I-UPF+SGW-U to continue to serve the terminal.

In this case, the SGW-C 5 sends a session modification request to the originally used I-UPF+SGW-U. After completing related processing based on the session modification request, the I-UPF+SGW-U returns a session modification response to the SGW-C 5.

The session modification request may be a PFCP Session Modification Request message. The session modification response may be a PFCP Session Modification Response message.

1608: After completing service processing, for example, interaction with a PGW-C, the SGW-C 5 returns a session establishment response to the MME.

For example, the session establishment response may be a Create Session Response message.

1609: After completing related service processing, the MME returns a connection response to the terminal.

For example, the connection response may be a PDN Connectivity Response message.

1610: An A-SMF sends a session release request to the SGW-C 5, where the session release request is used to request to release a related resource of a session in the 5G network.

For example, the session release request may be an Nsmf_PDUSession_StatusNotify Request message.

1611: The SGW-C 5 exchanges a message with an AMF in a session resource release procedure, to release the related resource of the session.

During implementation of step 1611, if the SGW-C 5 finds that an access type of a corresponding session has been modified to the 4G network, the SGW-C 5 does not delete the corresponding session.

1612: The SGW-C 5 returns a session release response to the A-SMF.

For example, the session release response may be an Nsmf_PDUSession_StatusNotify Response message.

After accessing the 4G network, due to a reason such as cell handover or a registration update, the terminal may need to be migrated from the 4G network to the 5G network. The following describes, using FIG. 17, an example of a process in which the terminal is migrated from the 4G network to the 5G network.

Figure 17:
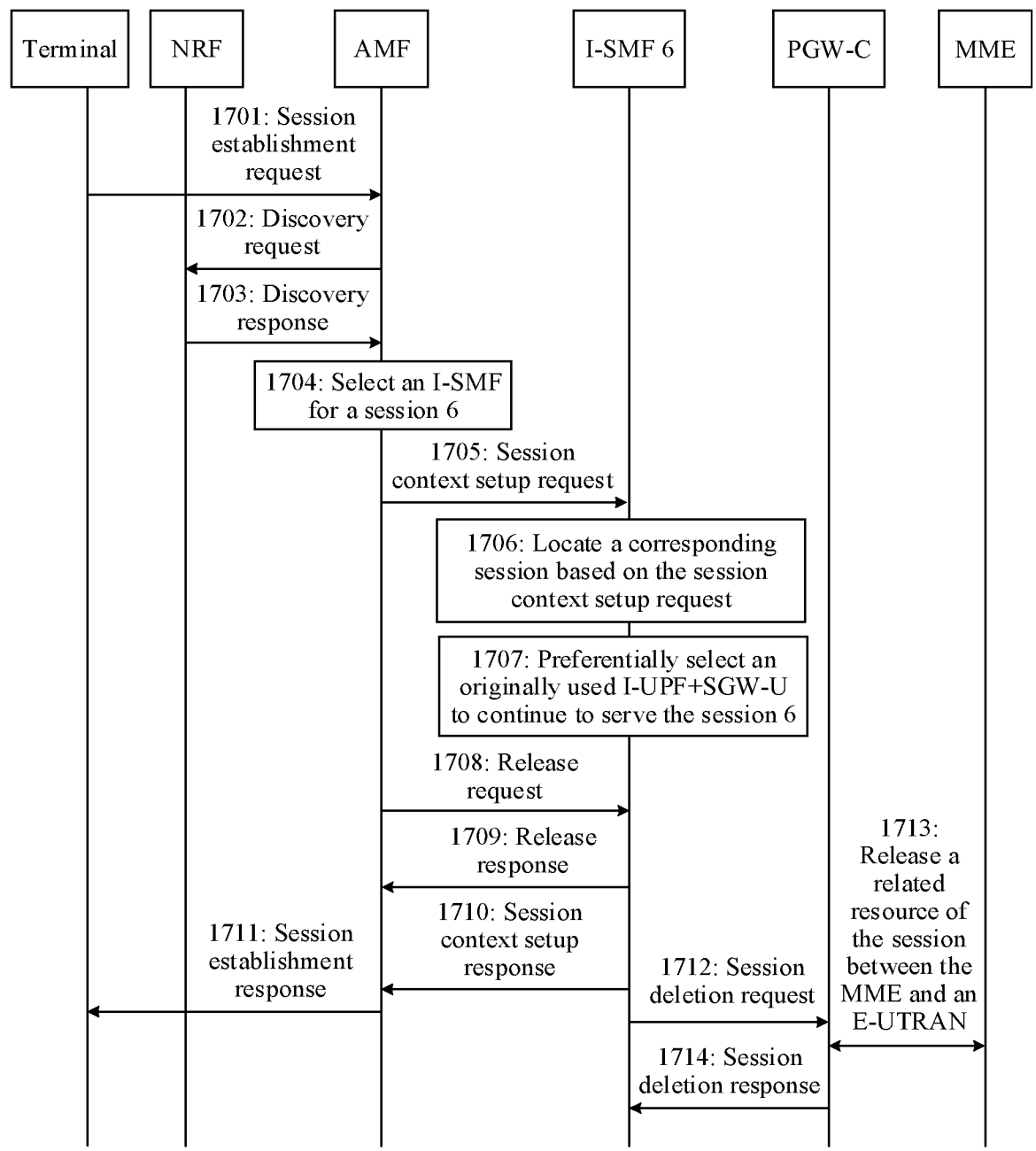

Refer to FIG. 17. The process includes the following steps.

1701: The terminal sends a session establishment request to an AMF, to request to establish a session.

The session establishment request may include a request type (Request Type) and a PDU session ID allocated by the terminal to a session (denoted as a session 6). The request type may be "Existing PDU Session".

For example, the session establishment request may be a PDU Session Establishment Request message.

1702: The AMF sends a discovery request to an NRF, where the discovery request is used to request to perform I-SMF discovery.

For related explanations of step 1702, refer to step 801.

1703: The NRF returns a discovery response to the AMF.

For related explanations of step 1703, refer to step 802.

1704: The AMF selects an I-SMF (denoted as an I-SMF 6) for the session 6.

During implementation of step 1704, when the AMF records a terminal-level SGW node name of the terminal, if the terminal-level SGW node name of the terminal belongs to an I-SMF list and an I-SMF corresponding to the terminal-level SGW node name is an SGW-C+I-SMF, the AMF preferentially selects the SGW-C+I-SMF corresponding to the terminal-level SGW node name of the terminal as the I-SMF 6, and may further set a session-level SGW change indication identifier of the session 6 to false. Otherwise, the AMF selects an SGW-C+I-SMF from the I-SMF list as the I-SMF of the session 6 and sets the session-level SGW change indication identifier of the session 6 to true.

Further, if a session-level SGW change indication identifier of at least one session of the terminal is false, the AMF sets the terminal-level SGW change indication identifier of the terminal to false. Alternatively, if session-level SGW change indication identifiers of all sessions of the terminal are false, the terminal-level SGW change indication identifier of the terminal is false.

1705: The AMF sends a session context setup request to the I-SMF 6.

The session context setup request includes an identifier of the terminal and information about the PDU session ID.

For example, the session context setup request may be an Nsmf_PDUSession_CreateSMContext Request message.

1706: The I-SMF 6 locates the corresponding session based on the session context setup request.

For example, the I-SMF 6 locates the corresponding session based on the identifier of the terminal and the PDU session ID that are in the session context setup request.

If the I-SMF 6 is selected from the terminal-level SGW node name that is of the terminal and that is recorded by the AMF, the I-SMF 6 updates the session 6 based on the session establishment request, and modifies an access type of the session 6 to the 5G network. Otherwise, the I-SMF 6 creates the session 6 based on the session establishment request.

1707: If an SGW-U used for the session 6 is an I-UPF+SGW-U, and the I-UPF+SGW-U can continue to serve the session 6, the I-SMF 6 preferentially selects the originally used I-UPF+SGW-U to continue to serve the session 6.

In this case, the I-SMF 6 sends a session modification request to the originally used I-UPF+SGW-U. After completing related processing based on the session modification request, the I-UPF+SGW-U returns a session modification response to the I-SMF 6.

The session modification request may be a PFCP Session Modification Request message. The session modification response may be a PFCP Session Modification Response message.

1708: The AMF sends a release request to the I-SMF 6.

When at least one session-level SGW change indication identifier is true but the terminal-level SGW change indication identifier is false, the AMF may send the release request to the I-SMF 6, to request to release a related resource of a session that is of the I-SMF 6 and whose intermediate session management network element is changed. The release request may include the identifier of the terminal and an EPS bearer ID corresponding to the session. Optionally, the release request further includes an SGW F-TEID allocated by an SGW-C of the terminal to the terminal and a "4G session deletion identifier".

For example, the release request may be an Nsmf_PDUSession_CreateSMContext Request message.

1709: The I-SMF 6 sends a release response to the AMF.

During implementation of step 1709, if an access type of a session corresponding to the I-SMF 6 is the 5G network, the I-SMF 6 does not delete the session. If an access type of a session corresponding to the I-SMF 6 is the 4G network and the release request includes the "4G session deletion identifier", the I-SMF 6 deletes the session.

For example, the release response may be an Nsmf_PDUSession_CreateSMContext Response message.

1710: After completing service processing, for example, interaction with a PGW-C, the I-SMF 6 returns a session context setup response to the AMF.

For example, the session context setup response may be an Nsmf_PDUSession_CreateSMContext Response response message.

1711: After completing related service processing, the AMF returns a session establishment response to the terminal.

For example, the session establishment response may be a PDU Session Establishment Accept Response message.

1712: The PGW-C sends a session deletion request to the I-SMF 6, to request to release a related resource of the session the 4G network.

For example, the session deletion request may be a Delete Session Request message.

1713: The I-SMF 6 exchanges a message with an MME in a session resource release procedure, to release the related resource of the session between the MME and an E-UTRAN.

If the access type of the session has been modified to the 5G network in the process of releasing the related resource of the session, the session is not deleted.

1714: The I-SMF 6 returns a session deletion response message to the PGW-C.

For example, the session deletion response may be a Delete Session Response message.

Indication information used to indicate that the I-SMF is the SGW-C+I-SMF in the foregoing embodiment may be denoted as first indication information.

It should be noted that, in the foregoing embodiment, the I-UPF+SGW-U is a network element that combines an I-UPF and an SGW-U. The network element that combines the I-UPF and the SGW-U may be a network element that combines only the I-UPF and the SGW-U, or may be a network element that combines the I-UPF and the SGW-U, and further combines another network element. Similarly, the I-SMF+SGW-C is a network element that combines an I-SMF and an SGW-C, and the network element that combines the I-SMF and the SGW-C may be a network element that combines only the I-SMF and the SGW-C, or may be a network element that combines the I-SMF and the SGW-C, and further combines another network element. For example, the other network element herein may be one or more of a PGW-C and an A-SMF.

A network element that combines the I-SMF, the SGW-C, the PGW-C, and the A-SMF is denoted as an I-SMF+SGW-C+PGW-C+A-SMF. The following describes an example of the method provided in the embodiments of this application from three aspects: registration of an I-SMF+SGW-C+PGW-C+A-SMF, selection of an intermediate session management network element in a session establishment process, and selection of an intermediate session management network element in a network migration process, which are described below using the fourth part to the sixth part. Descriptions in these parts are also applicable to a network element that combines the I-SMF, the SGW-C, and the PGW-C (where the network element may be denoted as an I-SMF+SGW-C+PGW-C). The I-SMF+SGW-C+PGW-C+A-SMF is replaced with the I-SMF+SGW-C+PGW-C for understanding.

Fourth Part: Registration of an I-SMF+SGW-C+PGW-C+A-SMF

When serving as an SMF (an I-SMF or an A-SMF), the I-SMF+SGW-C+PGW-C+A-SMF needs to register with an NRF. When serving as an SGW-C or a PGW-C, the I-SMF+SGW-C+PGW-C+A-SMF needs to be configured on a DNS server.

Figure 22:
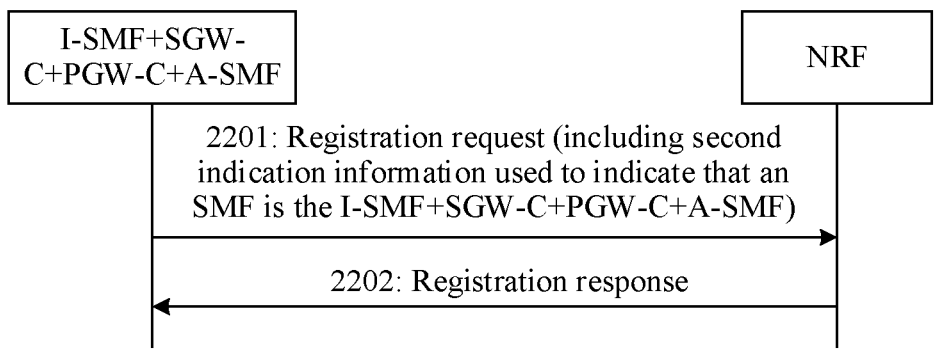

When an I-SMF+SGW-C+PGW-C+A-SMF serves as an SMF, this application provides a communication method. As shown in FIG. 22, the communication method includes the following steps.

2201: An SMF in a first network sends a registration request to an NRF in the first network. Correspondingly, the NRF receives the registration request from the SMF.

The first network is a 5G network. The registration request includes information about the SMF.

When the SMF is an I-SMF+SGW-C+PGW-C+A-SMF, the information about the SMF includes second indication information, and the second indication information is used to indicate that the SMF is the I-SMF+SGW-C+PGW-C+A-SMF. For example, the second indication information may be a PGW node name when the I-SMF+SGW-C+PGW-C+A-SMF serves as a PGW-C.

In FIG. 22, an example in which the SMF is the I-SMF+SGW-C+PGW-C+A-SMF is used for drawing.

For example, the information about the SMF further includes information such as a location area and an interface address that are supported when the I-SMF+SGW-C+PGW-C+A-SMF serves as the I-SMF.

2202: The NRF sends a registration response to the SMF. Correspondingly, the SMF receives the registration response from the NRF.

For a process in which the I-SMF+SGW-C+PGW-C+A-SMF is configured on a DNS server when the I-SMF+SGW-C+PGW-C+A-SMF serves as an SGW-C, refer to corresponding content in the foregoing first part. Details are not described again. A process in which the I-SMF+SGW-C+PGW-C+A-SMF is configured on the DNS server when the I-SMF+SGW-C+PGW-C+A-SMF serves as a PGW-C is well known to a person skilled in the art. Details are not described.

According to the method shown in the fourth part, the I-SMF+SGW-C+PGW-C+A-SMF may register with the NRF, and the NRF can determine, based on the carried second indication information, which SMFs are I-SMF+SGW-C+PGW-C+A-SMFs and which SMFs are independent SMFs, to support a subsequent process such as SMF selection. Similarly, the I-SMF+SGW-C+PGW-C+A-SMF can be configured on the DNS server. The DNS server can determine which SGW-Cs are I-SMF+SGW-C+PGW-C+A-SMFs and which SGW-Cs are independent SGW-Cs, to support a subsequent process such as SGW-C selection.

Figure 23:
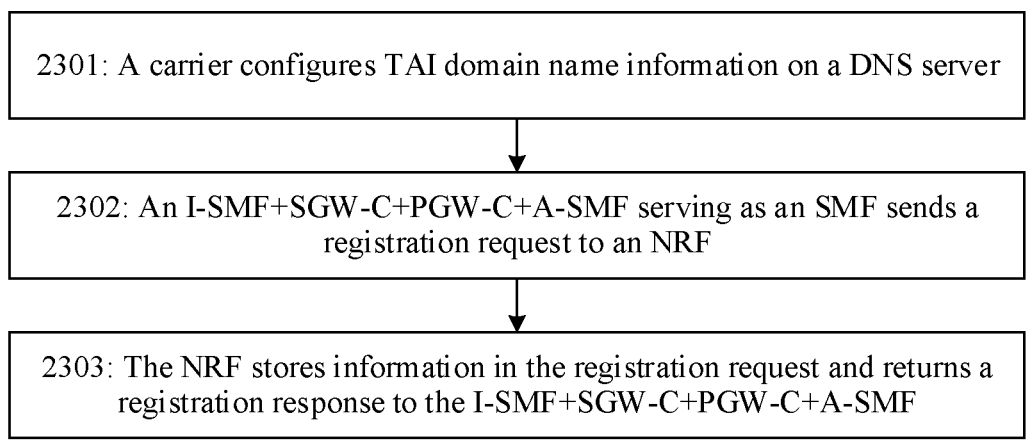

The following describes, using examples, a registration procedure when an I-SMF+SGW-C+PGW-C+A-SMF serves as an SMF and a configuration procedure when the I-SMF+SGW-C+PGW-C+A-SMF serves as an SGW-C. Refer to FIG. 23. The procedure includes the following steps.

2301: A carrier configures TAI domain name information on a DNS server.

For an implementation of step 2301, refer to step 401. Details are not described again.

2302: An I-SMF+SGW-C+PGW-C+A-SMF serving as an SMF sends a registration request to an NRF.

The registration request includes information such as a location area and an interface address that are supported when the I-SMF+SGW-C+PGW-C+A-SMF serves as an I-SMF, and further includes a PGW node name when the I-SMF+SGW-C+PGW-C+A-SMF serves as a PGW-C. The PGW node name indicates that the SMF has a PGW-C capability, that is, indicates that the SMF is the I-SMF+SGW-C+PGW-C+A-SMF.

For example, the registration request may be an Nnrf_NF-Management_NFRegister Request message.

2303: The NRF stores the information in the registration request, and returns a registration response to the I-SMF+SGW-C+PGW-C+A-SMF.

For example, the registration response may be an Nnrf_NFManagement_NFRegister Response message.

It should be noted that step 2301 is a registration process in which the I-SMF+SGW-C+PGW-C+A-SMF serves as an SGW-C. Step 2302 and step 2303 are a registration process in which the I-SMF+SGW-C+PGW-C+A-SMF serves as the SMF. How the I-SMF+SGW-C+PGW-C+A-SMF performs registration as the SGW-C and how the I-SMF+SGW-C+PGW-C+A-SMF performs registration as the SMF may be independent of each other.

Fifth Part: Selection of an Intermediate Session Management Network Element in a Session Establishment Process An implementation process of a communication method provided in the fifth part is similar to the implementation process in FIG. 5, except that the SGW-C+I-SMF is replaced with an I-SMF+SGW-C+PGW-C+A-SMF, and the SGW node name of the SGW-C is replaced with a PGW node name of a PGW-C for understanding. In addition, the session-level SGW node name information included in the registration request in step 503 may be derived by the first intermediate session management network element based on the PGW node name. For a derivation process, refer to the following descriptions. The registration request in step 503 may alternatively include both the SGW node name and the PGW node name. In addition, the AMF may further derive an SGW node name of the first intermediate session management network element based on the PGW node name of the first intermediate session management network element. For a derivation process, refer to the following descriptions.

In the method provided in the fifth part, a procedure in which the mobility management network element selects the intermediate session management network element for the terminal is related to whether the N26 interface exists between the AMF and the MME and a current network in which the terminal is located. The following provides descriptions using an application scenario 1 and an application scenario 2 separately.

Application scenario 1: The N26 interface exists between the AMF and the MME.

In the application scenario 1, the AMF and the MME can directly exchange information.

If the terminal accesses the 5G network, due to a reason such as session establishment or a location area change of the terminal, a process in which the AMF needs to select an I-SMF for a session is similar to the process in FIG. 6, except that the SGW-C+I-SMF needs to be replaced with an I-SMF+SGW-C+PGW-C+A-SMF, and the SGW node name of the SGW-C needs to be replaced with a PGW node name of a PGW-C for understanding.

If the terminal accesses the 4G network, due to a reason such as session establishment or a location area change of the terminal, the MME needs to select an SGW-C for a session. For a process, refer to the process shown in FIG. 7, except that the SGW-C+I-SMF needs to be replaced with an I-SMF+SGW-C+PGW-C+A-SMF for understanding. Details are not described herein again.

Application scenario 2: No N26 interface exists between the AMF and the MME.

In the application scenario 2, the MME and the AMF need to exchange information through an HSS+UDM.

If the terminal accesses the 5G network, due to a reason such as session establishment or a location area change of the terminal, the AMF needs to select an I-SMF for a session (denoted as a session 3), and reports terminal-level SGW node name information (where the terminal-level SGW node name information is information about an SGW node name of an SGW-C that manages a session of a terminal) or session-level SGW node name information to the HSS+UDM. The following describes an example of an I-SMF selection process in the 5G network using FIG. 24A and FIG. 24B.

Figure 24A:
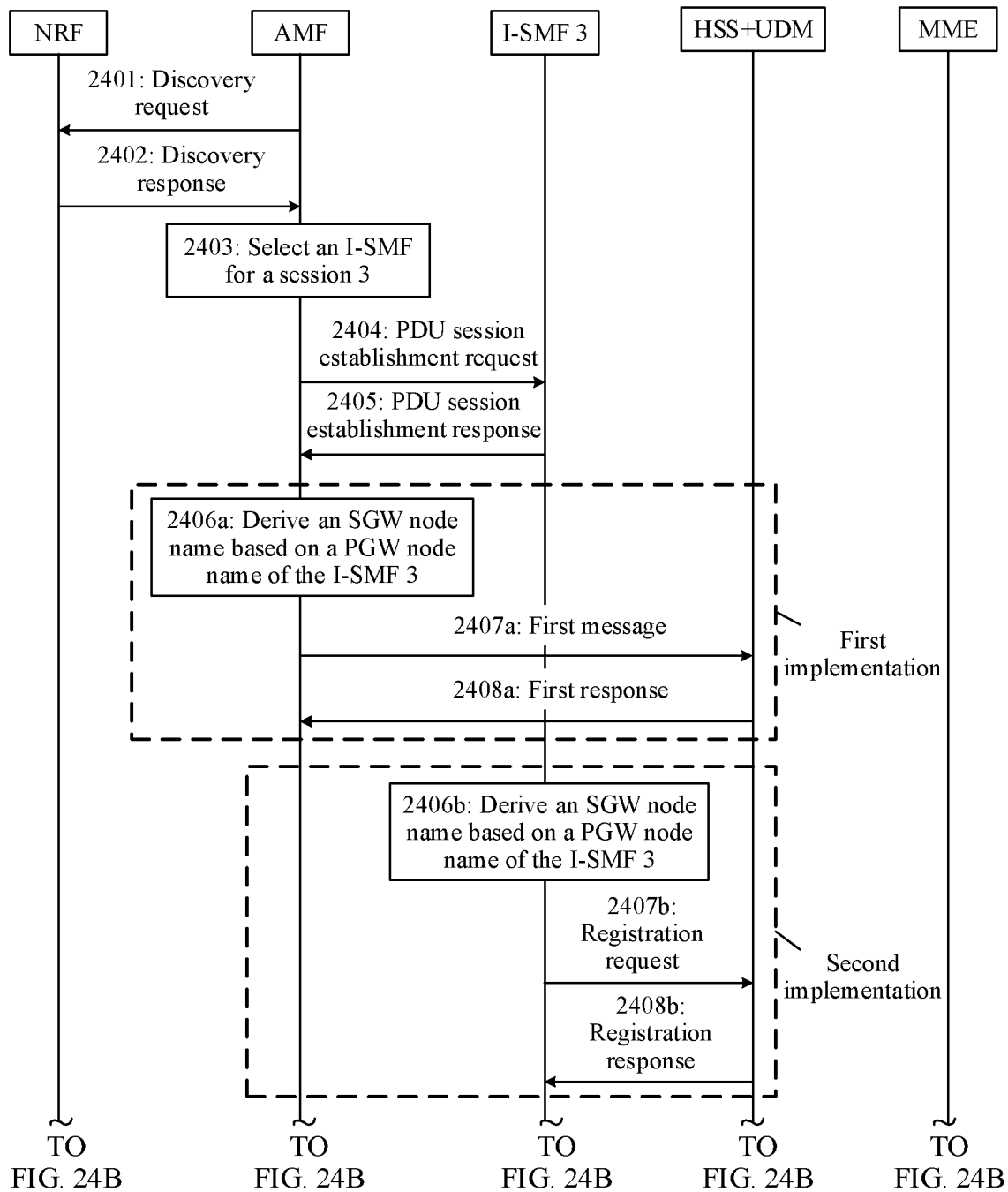
Figure 24B:
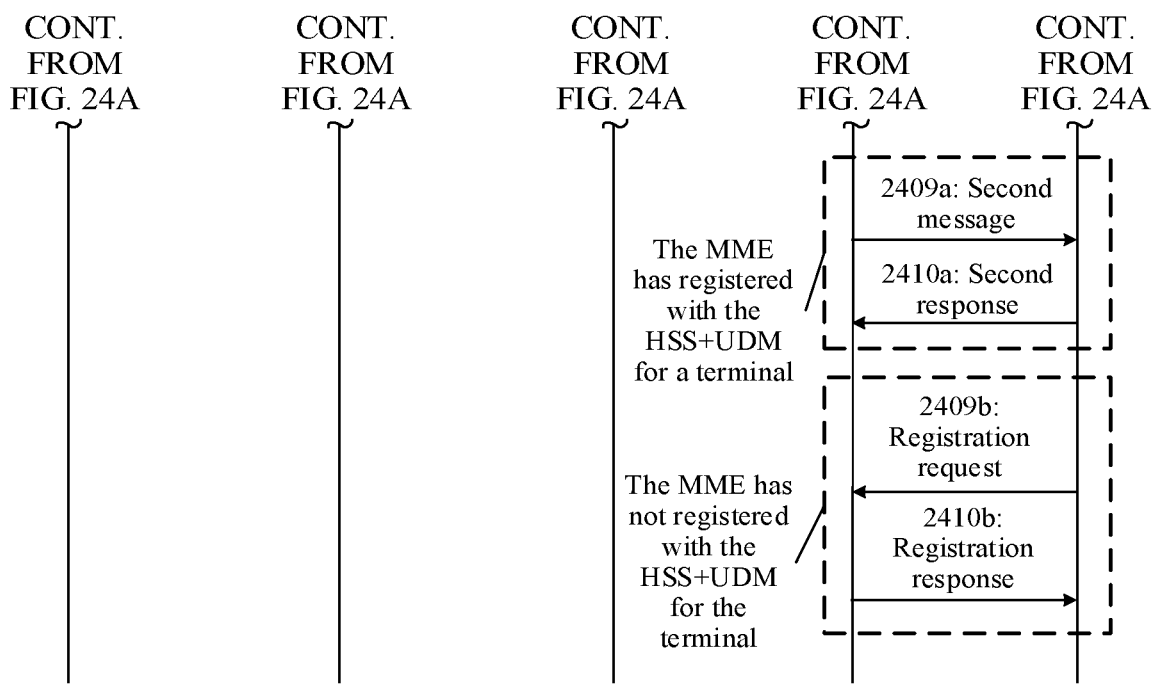

Refer to FIG. 24A and FIG. 24B. The process includes the following steps.

2401 to 2405: 2401 to 2405 are similar to 601 to 605, an only difference is a session herein is the session 3, a selected I-SMF herein may be different from the I-SMF 2 and is denoted as an I-SMF 3 herein, the SGW-C+I-SMF is replaced with an I-SMF+SGW-C+PGW-C+A-SMF, and the SGW node name of the SGW-C is replaced with a PGW node name of a PGW-C.

In a first implementation, after step 2405, step 2406a to step 2408a are performed. In a second implementation, after step 2405, step 2406b to step 2408b are performed.

2406a: The AMF derives an SGW node name based on the PGW node name of the I-SMF 3.

For a derivation method, refer to the following descriptions. Details are not described again. Certainly, the SGW node name of the I-SMF 3 may alternatively be configured on the AMF. This is not limited in this application.

2407a: The AMF sends a first message to the HSS+UDM, to report, to the HSS+UDM, SGW node name information of an I-SMF+SGW-C+PGW-C+A-SMF corresponding to the session of the terminal.

2408a: The HSS+UDM records the updated SGW node name information based on the first message, and returns a first response to the AMF.

Implementations of step 2407a and step 2408a are respectively similar to those of step 806a and step 807a, except that the SGW-C+I-SMF is replaced with the I-SMF+SGW-C+PGW-C+A-SMF for understanding.

2406b: The I-SMF 3 derives an SGW node name based on the PGW node name of the I-SMF 3.

For a derivation method, refer to the following descriptions. Details are not described again. Certainly, the SGW node name of the I-SMF 3 may alternatively be configured on the I-SMF 3. This is not limited in this application.

2407b: The I-SMF 3, serving as an I-SMF, sends a registration request to the HSS+UDM.

The registration request may include a session-level SGW node name of the session of the I-SMF 3.

For example, the registration request may be an Nudm_UECM_Registration Request message.

2408b: The HSS+UDM records information in the registration request, and returns a corresponding registration response to the I-SMF 3.

After step 2408a or step 2408b, if the MME has registered with the HSS+UDM for the terminal, step 2409a and step 2410a are performed. If the MME has not registered with the HSS+UDM for the terminal, step 2409b and step 2410b are performed.

2409a: The HSS+UDM sends a second message to the MME.

2410a: The MME records the terminal-level SGW node name or a session-level SGW node name based on the second message, and returns a second response to the HSS+UDM.

2409b: The MME sends a registration request to the HSS+UDM.

2410b: The HSS+UDM sends a registration response to the MME, where the registration response includes the terminal-level SGW node name or the session-level SGW node name. After receiving the registration response, the MME records information in the registration response.

Step 2409a, step 2410a, step 2409b, and step 2410b are respectively similar to step 808a, step 809a, step 808b, and step 809b, except that the SGW-C+I-SMF is replaced with the I-SMF+SGW-C+PGW-C+A-SMF for understanding.

When the terminal accesses the 4G network, due to a reason such as session establishment or a location area change of the terminal, a process in which the MME needs to select an SGW-C for a session (denoted as a session 4) is similar to that in FIG. 9, except that the SGW-C+I-SMF is replaced with an I-SMF+SGW-C+PGW-C+A-SMF for understanding. In addition, after 909a or 906b, the AMF obtains the SGW node name, and may derive a PGW node name based on the received SGW node name, to determine which node is the current node.

Sixth Part: Selection of an Intermediate Session Management Network Element in a Network Migration Process In the sixth part, when a terminal is moved from a 5G network to a 4G network, for an I-SMF being used by the terminal, if the I-SMF is an I-SMF+SGW-C+PGW-C+A-SMF, an AMF derives, according to a rule, identification information of an SGW-C (namely, an SGW node name of the SGW-C) using identification information that is of a PGW-C (namely, a PGW node name of a PGW-C) and that is included in the I-SMF; or the I-SMF+SGW-C+PGW-C+A-SMF derives, according to the rule, the SGW node name of the SGW-C using the PGW node name of the PGW-C and then sends the SGW node name of the SGW-C to the AMF. If an N26 interface exists between the AMF and an MME, the AMF may send the SGW node name of the SGW-C to the MME through the N26 interface, and the MME preferentially selects the I-SMF to serve the terminal. If no N26 interface exists between the AMF and the MME, the MME and the AMF exchange information through an HSS+UDM.

In the sixth part, when the terminal is moved from the 4G network to the 5G network, for an SGW-C being used by the terminal, if the SGW-C is an I-SMF+SGW-C+PGW-C+A-SMF and an N26 interface exists between an AMF and an MME, the MME sends an SGW node name of the SGW-C to the AMF through the N26 interface. The AMF derives, using the SGW node name of the SGW-C, a PGW node name of a PGW-C when the I-SMF+SGW-C+PGW-C+A-SMF serves as the PGW-C, and preferentially selects an I-SMF including the PGW node name to serve the terminal. If no N26 interface exists between the AMF and the MME, the MME and the AMF exchange information through an HSS+UDM.

The selection of the intermediate session management network element in the network migration process is related to whether the N26 interface exists between the AMF and the MME. The following provides descriptions using an application scenario 1 and an application scenario 2 separately.

Application scenario 1: The N26 interface exists between the AMF and the MME.

In the application scenario 1, the AMF and the MME can directly exchange information. For a process of selecting an intermediate session management network element in a network migration process, refer to FIG. 10, except that the SGW-C+I-SMF is replaced with an I-SMF+SGW-C+PGW-C+A-SMF for understanding.

A procedure in which the terminal is migrated from the 5G network to the 4G network is similar to the process shown in FIG. 12, and differences lie in step 1203 and that the SGW-C+I-SMF is replaced with an I-SMF+SGW-C+PGW-C+A-SMF for understanding in content in other parts.

Different from step 1203, in one case, the session context response message further includes an SGW node name when the I-SMF+SGW-C+PGW-C+A-SMF serves as the SGW-C and an SGW F-TEID allocated to the terminal when the I-SMF+SGW-C+PGW-C+A-SMF serves as the SGW-C. The AMF may determine whether an I-SMF is an I-SMF+SGW-C+PGW-C+A-SMF based on information about whether the I-SMF has a corresponding SGW node name. The SGW node name included in the session context response message may be derived based on a PGW node name carried when the I-SMF+SGW-C+PGW-C+A-SMF registers with an NRF. For a derivation method, refer to the following descriptions. Details are not described again. Certainly, the SGW node name may alternatively be configured in the I-SMF+SGW-C+PGW-C+A-SMF. This is not limited in this application.

In another case, the session context response message may not include the SGW node name but include the PGW node name. After receiving the session context response message, the AMF derives the SGW node name based on the received PGW node name. Certainly, the SGW node name when the I-SMF+SGW-C+PGW-C+A-SMF serves as the SGW-C may alternatively be configured in the AMF. This is not limited in this application.

A procedure in which the terminal is migrated from the 4G network to the 5G network is similar to the process shown in FIG. 14, and differences lie in step 1402, step 1403, and step 1404, and that the SGW-C+I-SMF is replaced with an I-SMF+SGW-C+PGW-C+A-SMF for understanding in content in other parts.

Different from step 1402, after step 1402, the AMF derives, based on an SGW node name when an I-SMF+SGW-C+PGW-C+A-SMF serves as an SGW-C, a PGW node name when the I-SMF+SGW-C+PGW-C+A-SMF serves as a PGW-C. Certainly, the SGW node name when the I-SMF+SGW-C+PGW-C+A-SMF serves as the SGW-C may alternatively be configured in the AMF. This is not limited in this application.

Different from step 1403 lies, in a first case, the discovery request includes the SGW node name or the PGW node name that is derived by the AMF. In a second case, the discovery request includes information such as a location of the terminal.

Different from step 1404, when the discovery request includes the SGW node name or the PGW node name that is derived by the AMF, the discovery response includes address information of an I-SMF requested by the AMF. When the discovery request includes the information such as the location of the terminal, the discovery response includes an I-SMF candidate list, and the list includes address information of one or more I-SMFs that can provide related services for the terminal. For the I-SMF+SGW-C+PGW-C+A-SMF, the discovery response further includes the PGW node name when the I-SMF+SGW-C+PGW-C+A-SMF serves as the PGW-C. After receiving the PGW node name, the AMF may derive the SGW node name when the I-SMF+SGW-C+PGW-C+A-SMF serves as the SGW-C. In a subsequent I-SMF selection process, an I-SMF may be selected based on a PGW node name or an SGW node name. This is not limited in this application.

Application scenario 2: No N26 interface exists between the AMF and the MME.

In the application scenario 2, the MME and the AMF need to exchange information through the HSS+UDM.

In the application scenario 2, this application provides a communication method. For a process of selecting an intermediate session management network element in a network migration process, refer to FIG. 15, except that the SGW-C+I-SMF is replaced with an I-SMF+SGW-C+PGW-C+A-SMF for understanding.

Figure 16:
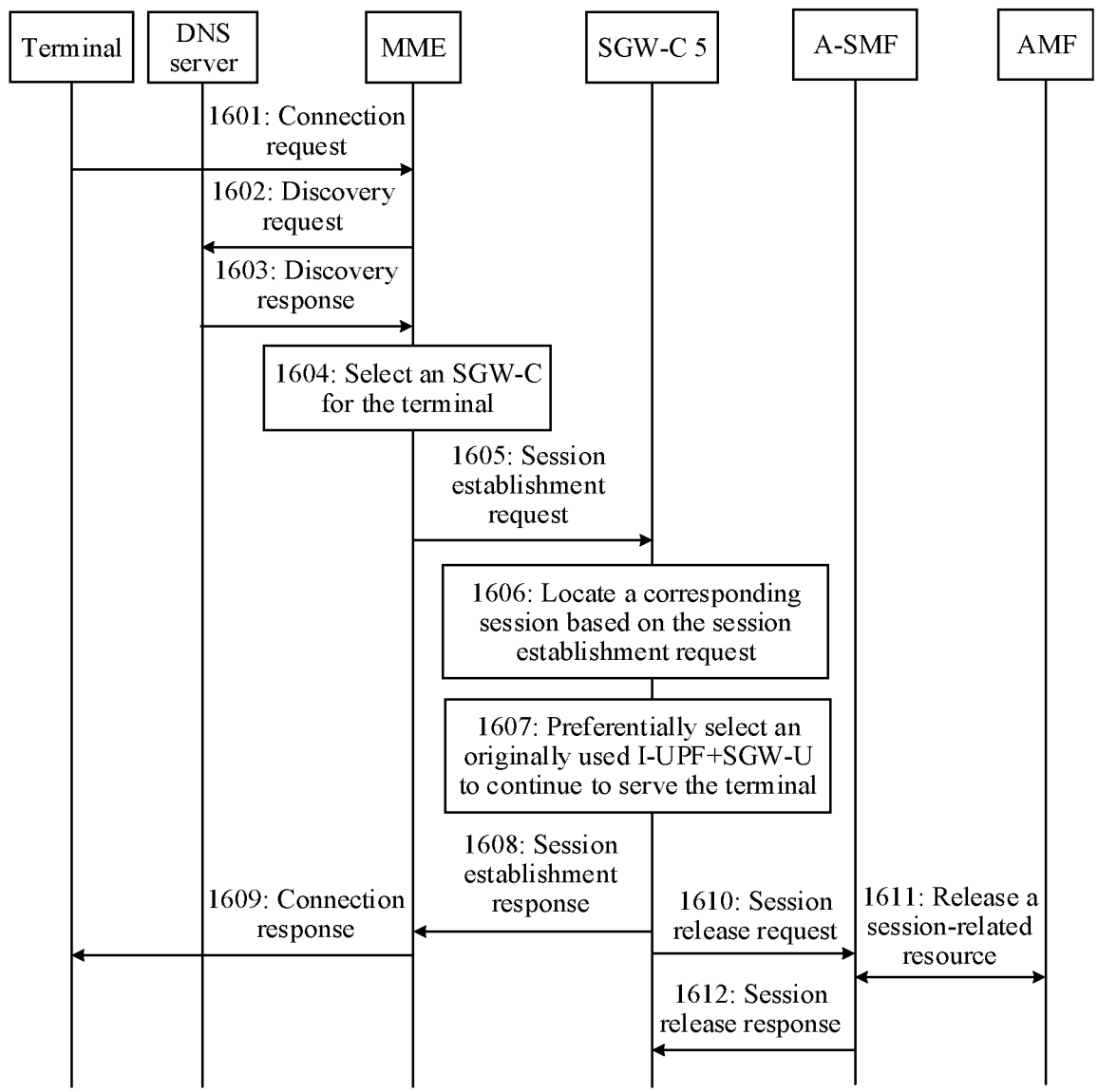

A procedure in which the terminal is migrated from the 5G network to the 4G network is similar to the process shown in FIG. 16, except that the SGW-C+I-SMF is replaced with an I-SMF+SGW-C+PGW-C+A-SMF for understanding.

A procedure in which the terminal is migrated from the 4G network to the 5G network is similar to the process shown in FIG. 17, and differences lie in step 1702, step 1703, and step 1704, and that the SGW-C+I-SMF is replaced with an I-SMF+SGW-C+PGW-C+A-SMF for understanding in content in other parts.

Different from step 1702, after step 1702, the AMF derives, based on an SGW node name when an I-SMF+SGW-C+PGW-C+A-SMF serves as an SGW-C, a PGW node name when the I-SMF+SGW-C+PGW-C+A-SMF serves as a PGW-C. Certainly, the SGW node name when the I-SMF+SGW-C+PGW-C+A-SMF serves as the SGW-C may alternatively be configured in the AMF. This is not limited in this application.

Different from step 1703, in a first case, the discovery request includes the PGW node name derived by the AMF.

In a second case, the discovery request includes information such as a location of the terminal.

Different from step 1704, when the discovery request includes the PGW node name derived by the AMF, the discovery response includes address information of an I-SMF requested by the AMF. In the second case, the discovery response includes an I-SMF candidate list, and the list includes address information of one or more I-SMFs that can provide related services for the terminal. For the I-SMF+SGW-C+PGW-C+A-SMF, the discovery response further includes the PGW node name when the I-SMF+SGW-C+PGW-C+A-SMF serves as the PGW-C. After receiving the PGW node name, the AMF may derive the SGW node name when the I-SMF+SGW-C+PGW-C+A-SMF serves as the SGW-C. In a subsequent I-SMF selection process, an I-SMF may be selected based on a PGW node name or an SGW node name. This is not limited in this application.

The following describes a derivation process between the SGW node name when the I-SMF+SGW-C+PGW-C+A-SMF serves as the SGW-C and the PGW node name when the I-SMF+SGW-C+PGW-C+A-SMF serves as the PGW-C in the foregoing embodiment.

As defined in the 3GPP technical specification (TS) 29.303, a format of a host name (Host Name or Node Name) of the SGW-C is the same as that of the PGW-C.

<"topon"|"topoff">.<single-label-interface-name>.<canonical-node-name>.

The first field <"topon"|"topoff"> indicates whether to configure and preferentially select a topologically closest node. When the I-SMF+SGW-C+PGW-C+A-SMF serves as the SGW-C and when the I-SMF+SGW-C+PGW-C+A-SMF serves as the PGW-C, the first fields are the same. Therefore, the first field of the PGW node name may be used as the first field of the SGW node name.

The second field <single-label-interface-name> is used to name an identifier of a specific interface on a node. As defined in the 3GPP TS 23.003, the MME finds that in scenarios of using the SGW-C and PGW-C, interface capabilities related to the SGW-C include s5, s8, and s11, and interface capabilities related to the PGW-C interface capabilities include s5 and s8.

In the 3GPP TS 23.003, a list of a group of "service-parms" (service parameters) names for "services" defined in the section 6.5 of the Internet Engineering Task Force (IETF) request for comments (RFC) 3958 in DNS parsing is regulated, as shown in Table 4.9.4-1 (which denoted below as Table 2 in this application) in the 3GPP TS 23.003.

Therefore, the AMF or the I-SMF+SGW-C+PGW-C+A-SMF may derive, based on the interface capabilities defined in the 3GPP, the second field of the PGW node name when the I-SMF+SGW-C+PGW-C+A-SMF serves as the PGW-C to the second field of the SGW node name when the I-SMF+SGW-C+PGW-C+A-SMF serves as the SGW-C; and vice versa. For example, interface information in the second field of the PGW node name is replaced with interface information of the SGW-C, and the interface information of the SGW-C is used as the second field of the SGW node name. For example, PGW-s5 in the second field of the PGW node name is replaced with SGW-s11, or PGW-s5-s8 in the second field of the PGW node name is replaced with SGW-s11. For example, a form of the interface information in the second field of the PGW node name is merely an example herein, or may be another form. This is not limited. In addition, the second fields of the node names when the I-SMF+SGW-C+PGW-C+A-SMF serves as the SGW-C and when the I-SMF+SGW-C+PGW-C+A-SMF serves as the PGW-C may alternatively be configured on the AMF or the I-SMF+SGW-C+PGW-C+A-SMF.

The third field <canonical-node-name> is a canonical node name of a particular node. This field usually includes a physical location and a domain name of a network element. A standard format of a 4G network realm is defined in the 3GPP TS 23.003, and the format is: node.eps.nc node.epc.mnc<MNC>.mcc<MCC>0.3gppnetwork.org. Physical locations of the PGW-C and the SGW-C are the same for the I-SMF+SGW-C+PGW-C+A-SMF. Therefore, the third field of the PGW node name may be used as the third field of the SGW node name.

Therefore, the third field of the SGW node name when the I-SMF+SGW-C+PGW-C+A-SMF serves as the SGW-C and the third field of the PGW node name when the I-SMF+SGW-C+PGW-C+A-SMF serves as the PGW-C may be considered the same. In addition, the third fields of the node names when the I-SMF+SGW-C+PGW-C+A-SMF serves as the SGW-C and when the I-SMF+SGW-C+PGW-C+A-SMF serves as the PGW-C may alternatively be configured on the AMF or the I-SMF+SGW-C+PGW-C+A-SMF.

For example, for the SGW node name (namely, an SGW Host Name) when the I-SMF+SGW-C+PGW-C+A-SMF serves as the SGW-C and the PGW node name (namely, a PGW Host Name) when the I-SMF+SGW-C+PGW-C+A-SMF serves as the PGW-C, refer to Table 3.

TABLE 2

List of 'app-service' (application service) and 'app-protocol' (application protocol) names

| Descriptions | IETF RFC 3958 section 6.5 "application service" name ('app-service' name) | IETF RFC 3958 section 6.5 "application protocol" name ('app-protocol' name) |
|---|---|---|
| PGW and interface types supported by the PGW | x-3gpp-pgw | x-s5-gtp, x-s5-pmip, x-s8-gtp , x-s8-pmip, x-s2a-pmip, x-s2a-mipv4, x-s2a-gtp, x-s2b-pmip, x-s2b-gtp, x-s2c-dsmip, x-gn, x-gp |
| SGW and interface types supported by the SGW | x-3gpp-sgw | x-s5-gtp, x-s5-pmip, x-s8-gtp, x-s8-pmip, x-s11, x-s12, x-s4, x-s1-u, x-s2a-pmip, x-s2b-pmip |

TABLE 3

| | |
|---|---|
| PGW Host Name | TOPON.PGW-S5.GWXXX.ProvinceABC.NODE.EPC.MNCXXX.MCCXXX.3GPPNETWORK.ORG |
| SGW Host Name | TOPON.SGW-S11.GWXXX.ProvinceABC.NODE.EPC.MNCXXX.MCCXXX.3GPPNETWORK.ORG |

In conclusion, the SGW node name when the I-SMF+SGW-C+PGW-C+A-SMF serves as the SGW-C and the PGW node name when the I-SMF+SGW-C+PGW-C+A-SMF serves as the PGW-C can be mutually converted based on the foregoing features or configured on the AMF or the I-SMF+SGW-C+PGW-C+A-SMF based on a format specified by a carrier.

The foregoing mainly describes the solutions of the embodiments of this application from a perspective of a method. It may be understood that, to implement the foregoing functions, the network elements, for example, the mobility management network element and the combined intermediate session management network element, includes at least one of corresponding hardware structures and software modules for performing the functions. A person skilled in the art should be easily aware that, with reference to units and algorithm steps in the examples described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the mobility management network element and the combined intermediate session management network element may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into units is an example, and is merely logical function division. In an actual implementation, another division manner may be used.

Figure 18:
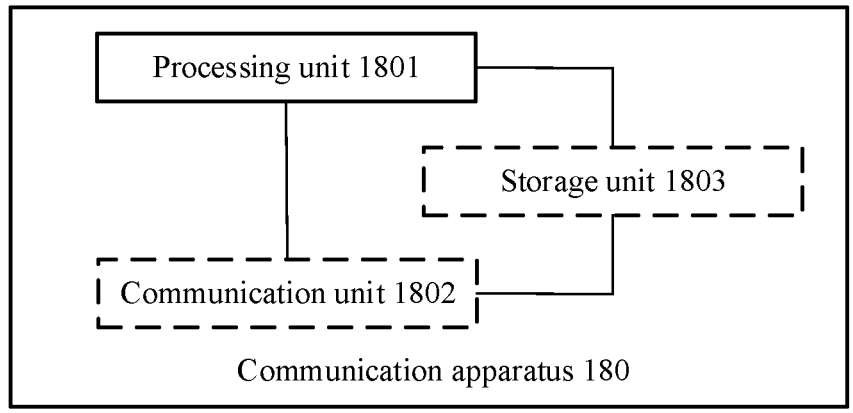
FIG. 18 is a schematic composition diagram of a communication apparatus according to an embodiment of this application.

For example, FIG. 18 is a possible schematic diagram of a structure of a communication apparatus 180 in the foregoing embodiments. The communication apparatus 180 includes a processing unit 1801. Optionally, the communication apparatus 180 further includes a communication unit 1802 and/or a storage unit 1803. The schematic diagram of the structure shown in FIG. 18 may be used to illustrate a structure of the mobility management network element or the combined intermediate session management network element in the foregoing embodiments.

When the schematic diagram of the structure shown in FIG. 18 is used to illustrate the structure of the combined intermediate session management network element in the foregoing embodiments, the processing unit 1801 is configured to control and manage an action of the combined intermediate session management network element. For example, the processing unit 1801 is configured to perform 301 and 302 in FIG. 3, 402 in FIG. 4, 503 in FIG. 5, 604 and 605 in FIG. 6, 704 and 705 in FIG. 7, 804, 805, 806b, and 807b in FIG. 8, 904 and 905 in FIG. 9, 1209 to 1213 in FIG. 12, 1409 to 1411 in FIG. 14, 1605 to 1608, 1610, and 1612 in FIG. 16, 1705 to 1710, 1712, and 1714 in FIG. 17, 2201 and 2202 in FIG. 22 (where in this case, the combined intermediate session management network element may be the I-SMF+SGW-C+PGW-C+A-SMF), 2302 in FIG. 23 (where in this case, the combined intermediate session management network element may be the I-SMF+SGW-C+PGW-C+A-SMF), 2404, 2405, 2406b to 2408b in FIG. 24A and FIG. 24B (where in this case, the combined intermediate session management network element may be the I-SMF+SGW-C+PGW-C+A-SMF), and/or an action performed by the combined intermediate session management network element in another process described in the embodiments of this application. The processing unit 1801 may communicate with another network entity through the communication unit 1802, for example, communicate with the NRF in FIG. 3. The storage unit 1803 is configured to store program code and data that are of the combined intermediate session management network element.

When the schematic diagram of the structure shown in FIG. 18 is used to illustrate a structure of the first mobility management network element in the foregoing embodiments, the processing unit 1801 is configured to control and manage an action of the first mobility management network element. For example, the processing unit 1801 is configured to perform 501 and 502 in FIG. 5, 601 to 605 in FIG. 6 (where in this case, the first mobility management network element is the AMF), 701 to 705 in FIG. 7 (where in this case, the first mobility management network element is the MME), 801 to 807a in FIG. 8 (where in this case, the first mobility management network element is the AMF), 901 to 907 in FIG. 9 (where in this case, the first mobility management network element is the MME), 2401 to 2408a in FIG. 24A and FIG. 24B (where in this case, the first mobility management network element is the AMF), and/or an action performed by the first mobility management network element in another process described in the embodiments of this application. The processing unit 1801 may communicate with another network entity through the communication unit 1802, for example, communicate with the I-SMF 1 shown in FIG. 6. The storage unit 1803 is configured to store program code and data that are of the first mobility management network element.

When the schematic diagram of the structure shown in FIG. 18 is used to illustrate a structure of the second mobility management network element in the foregoing embodiments, the processing unit 1801 is configured to control and manage an action of the second mobility management network element. For example, the processing unit 1801 is configured to perform 1001 and 1002 in FIGS. 10, 1201 to 1205 and 1208 in FIG. 12 (where in this case, the second mobility management network element is the AMF), 1402 to 1407, 1409, 1410, and 1412 in FIG. 14 (where in this case, the second mobility management network element is the AMF), and/or an action performed by the second mobility management network element in another process described in the embodiments of this application. The processing unit 1801 may communicate with another network entity through the communication unit 1802, for example, communicate with the MME shown in FIG. 12. The storage unit 1803 is configured to store program code and data that are of the second mobility management network element.

When the schematic diagram of the structure shown in FIG. 18 is used to illustrate a structure of the third mobility management network element in the foregoing embodiments, the processing unit 1801 is configured to control and manage an action of the third mobility management network element. For example, the processing unit 1801 is configured to perform 1205 to 1209, 1213, and 1214 in FIG. 12 (where in this case, the third mobility management network element is the MME), 1401, 1402, 1406, and 1413 in FIG. 14 (where in this case, the third mobility management network element is the MME), and/or an action performed by the third mobility management network element in another process described in the embodiments of this application. The processing unit 1801 may communicate with another network entity through the communication unit 1802, for example, communicate with the AMF shown in FIG. 12. The storage unit 1803 is configured to store program code and data that are of the third mobility management network element.

When the schematic diagram of the structure shown in FIG. 18 is used to illustrate a structure of the fourth mobility management network element in the foregoing embodiments, the processing unit 1801 is configured to control and manage an action of the fourth mobility management network element. For example, the processing unit 1801 is configured to perform 1501 to 1503 in FIGS. 15, 1601 to 1605, 1608, and 1609 in FIG. 16 (where in this case, the fourth mobility management network element is the MME), 1701 to 1705 and 1708 to 1711 in FIG. 17 (where in this case, the fourth mobility management network element is the AMF), and/or an action performed by the fourth mobility management network element in another process described in the embodiments of this application. The processing unit 1801 may communicate with another network entity through the communication unit 1802, for example, communicate with the terminal shown in FIG. 16. The storage unit 1803 is configured to store program code and data that are of the fourth mobility management network element.

The schematic diagram of the structure shown in FIG. 18 may alternatively be used to illustrate another network element (for example, the NRF, the USS+UDM, or the DNS server) in this application. In this case, each unit in FIG. 18 is configured to perform an action of a corresponding network element. For details, refer to the method part for understanding. Details are not described herein again.

The communication apparatus 180 may be a device, or may be a chip in the device. When the communication apparatus 180 is the device, the processing unit 1801 may be a processor or a controller, and the communication unit 1802 may be a communication interface, a transceiver, a transceiver machine, a transceiver circuit, a transceiver apparatus, or the like. The communication interface is a collective term, and may include one or more interfaces. The storage unit 1803 may be a memory. When the communication apparatus 180 is the chip in the device, the processing unit 1801 may be a processor or a controller, and the communication unit 1802 may be an input/output interface, a pin, a circuit, or the like. The storage unit 1803 may be a storage unit (for example, a register or a cache) inside the chip, or may be a storage unit (for example, a read-only memory or a random-access memory) that is in the device and that is located outside the chip.

The communication unit may also be referred to as a transceiver unit. An antenna and a control circuit that have receiving and sending functions in the communication apparatus 180 may be considered as the communication unit 1802 in the communication apparatus 180, and a processor that has a processing function may be considered as the processing unit 1801 in the communication apparatus 180. Optionally, a component configured to implement the receiving function in the communication unit 1802 may be considered as a receiving unit. The receiving unit is configured to perform the receiving step in the embodiments of this application. The receiving unit may be a receiver machine, a receiver, a receiver circuit, or the like. A component configured to implement the sending function in the communication unit 1802 may be considered as a sending unit. The sending unit is configured to perform the sending step in the embodiments of this application. The sending unit may be a transmitter machine, a transmitter, a transmitter circuit, or the like.

When an integrated unit in FIG. 18 is implemented in a form of a software functional module and sold or used as an independent product, the integrated unit may be stored in a computer-readable storage medium. Based on such an understanding, the technical solutions of the embodiments of this application essentially, or the part contributing to a conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of this application. The storage medium that stores the computer software product includes any medium that can store program code, such as a Universal Serial Bus (USB) flash drive, a removable hard disk, a read-only memory (ROM), a random-access memory (RAM), a magnetic disk, or an optical disc.

Figure 19:
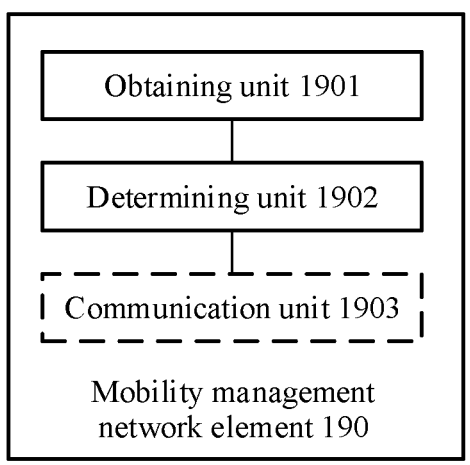
FIG. 19 is a schematic composition diagram of a mobility management network element according to an embodiment of this application.

For example, FIG. 19 further shows a possible schematic diagram of a structure of a mobility management network element 190 in the foregoing embodiments. The mobility management network element 190 includes an obtaining unit 1901 and a determining unit 1902. Optionally, the mobility management network element further includes a communication unit 1903. The communication unit 1903 may include a sending unit and/or a receiving unit.

When the schematic diagram of the structure shown in FIG. 19 is used to illustrate a structure of the first mobility management network element in the foregoing embodiments, the obtaining unit 1901 is configured to perform 501 in FIG. 5, the determining unit 1902 is configured to perform 502 in FIG. 5, and/or the obtaining unit 1901 and the determining unit 1902 perform other actions in the process described in the embodiments of this application. The communication unit 1903 is configured to communicate with another network entity, for example, communicate with the I-SMF 1 shown in FIG. 6.

When the schematic diagram of the structure shown in FIG. 19 is used to illustrate a structure of the second mobility management network element in the foregoing embodiments, the obtaining unit 1901 is configured to perform 1001 in FIG. 10, the determining unit 1902 is configured to perform 1002 in FIG. 10, and/or the obtaining unit 1901 and the determining unit 1902 perform other actions in the process described in the embodiments of this application.

The communication unit 1903 is configured to communicate with another network entity, for example, communicate with the MME shown in FIG. 12.

When the schematic diagram of the structure shown in FIG. 19 is used to illustrate a structure of the fourth mobility management network element in the foregoing embodiments, the obtaining unit 1901 is configured to perform 1501 and 1502 in FIG. 15, the determining unit 1902 is configured to perform 1503 in FIG. 15, and/or the obtaining unit 1901 and the determining unit 1902 perform other actions in the process described in the embodiments of this application. The communication unit 1903 is configured to communicate with another network entity, for example, communicate with the terminal shown in FIG. 16.

The schematic diagram of the structure shown in FIG. 19 may alternatively be used to illustrate another network element (for example, the NRF, the USS+UDM, or the DNS server) in this application. In this case, each unit in FIG. 19 is configured to perform an action of a corresponding network element. For details, refer to the method part for understanding. Details are not described herein again.

The units in FIG. 18 and FIG. 19 may also be referred to as modules. For example, the processing unit may be referred to as a processing module, and the determining unit may be referred to as a determining module.

Figure 20:
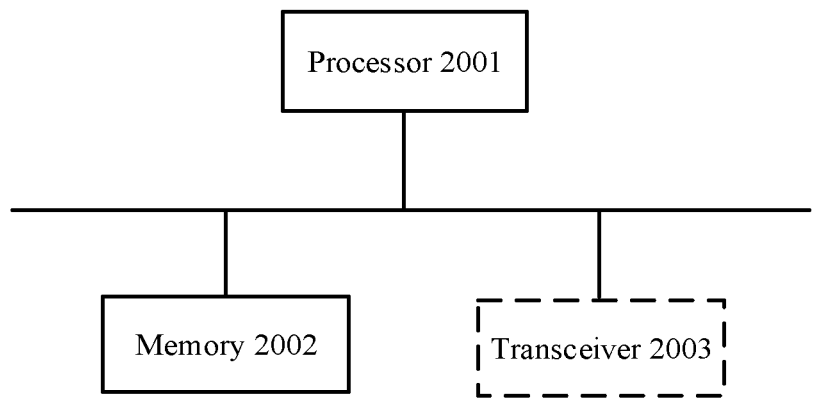
FIG. 20 and FIG. 21 are schematic diagrams of a hardware structure of a communication apparatus according to at least one embodiment of this application.
Figure 21:
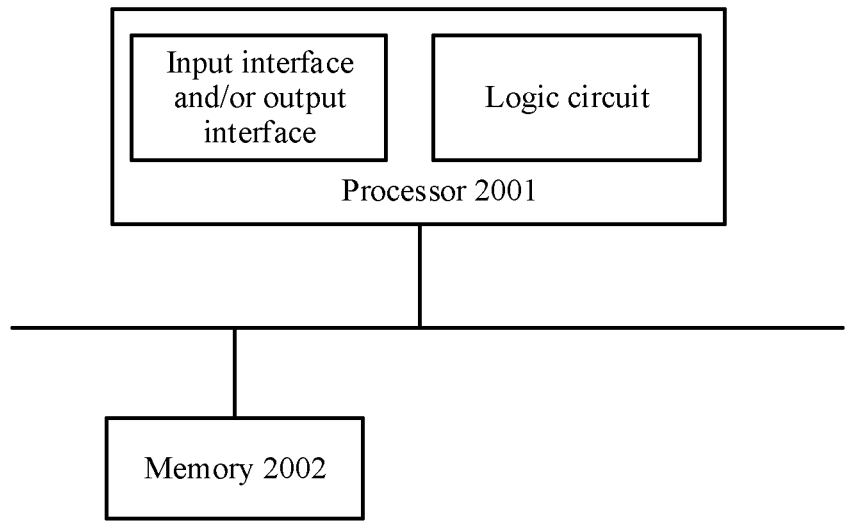

An embodiment of this application further provides a schematic diagram of a hardware structure of a communication apparatus. Refer to FIG. 20 or FIG. 21. The communication apparatus includes a processor 2001, and optionally, further includes a memory 2002 connected to the processor 2001.

The processor 2001 may be a general-purpose central processing unit (CPU), a microprocessor, an application-specific integrated circuit (ASIC), or one or more integrated circuits configured to control program execution of the solutions in this application. The processor 2001 may alternatively include a plurality of CPUs, and the processor 2001 may be a single-core (single-CPU) processor, or may be a multi-core (multi-CPU) processor. The processor herein may be one or more devices, circuits, and/or processing cores configured to process data (for example, computer program instructions).

The memory 2002 may be a ROM or another type of static storage device that can store static information and instructions, a RAM or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited in the embodiments of this application. The memory 2002 may exist independently. In this case, the memory 2002 may be located in the communication apparatus, or may be located outside the communication apparatus. Alternatively, the memory 2002 may be integrated with the processor 2001. The memory 2002 may include computer program code. The processor 2001 is configured to execute the computer program code stored in the memory 2002, to implement the method provided in the embodiments of this application.

In a first possible implementation, as shown in FIG. 20, the communication apparatus further includes a transceiver 2003. The processor 2001, the memory 2002, and the transceiver 2003 are connected through a bus. The transceiver 2003 is configured to communicate with another device or a communication network. Optionally, the transceiver 2003 may include a transmitter and a receiver. A component configured to implement a receiving function in the transceiver 2003 may be considered as a receiver. The receiver is configured to perform the receiving step in the embodiments of this application. A component configured to implement a sending function in the transceiver 2003 may be considered as a transmitter. The transmitter is configured to perform the sending step in the embodiments of this application.

Based on the first possible implementation, a schematic diagram of a structure shown in FIG. 20 may be used to illustrate a structure of the mobility management network element or the combined intermediate session management network element in the foregoing embodiments.

When the schematic diagram of the structure shown in FIG. 20 is used to illustrate the structure of the combined intermediate session management network element in the foregoing embodiments, the processor 2001 is configured to control and manage an action of the combined intermediate session management network element. For example, the processor 2001 is configured to perform 301 and 302 in FIG. 3, 402 in FIG. 4, 503 in FIG. 5, 604 and 605 in FIG. 6, 704 and 705 in FIG. 7, 804, 805, 806b, and 807b in FIG. 8, 904 and 905 in FIG. 9, 1209 to 1213 in FIG. 12, 1409 to 1411 in FIG. 14, 1605 to 1608, 1610, and 1612 in FIG. 16, 1705 to 1710, 1712, and 1714 in FIG. 17, 2201 and 2202 in FIG. 22 (where in this case, the combined intermediate session management network element may be the I-SMF+SGW-C+PGW-C+A-SMF), 2302 in FIG. 23 (where in this case, the combined intermediate session management network element may be the I-SMF+SGW-C+PGW-C+A-SMF), 2404, 2405, 2406b to 2408b in FIG. 24A and FIG. 24B (where in this case, the combined intermediate session management network element may be the I-SMF+SGW-C+PGW-C+A-SMF), and/or an action performed by the combined intermediate session management network element in another process described in the embodiments of this application. The processor 2001 may communicate with another network entity through the transceiver 2003, for example, communicate with the NRF in FIG. 3. The memory 2002 is configured to store program code and data that are of the combined intermediate session management network element.

When the schematic diagram of the structure shown in FIG. 20 is used to illustrate a structure of the first mobility management network element in the foregoing embodiments, the processor 2001 is configured to control and manage an action of the first mobility management network element. For example, the processor 2001 is configured to perform 501 and 502 in FIG. 5, 601 to 605 in FIG. 6 (where in this case, the first mobility management network element is the AMF), 701 to 705 in FIG. 7 (where in this case, the first mobility management network element is the MME), 801 to 807a in FIG. 8 (where in this case, the first mobility management network element is the AMF), 901 to 907 in FIG. 9 (where in this case, the first mobility management network element is the MME), 2401 to 2408a in FIG. 24A and FIG. 24B (where in this case, the first mobility management network element is the AMF), and/or an action performed by the first mobility management network element in another process described in the embodiments of this application. The processor 2001 may communicate with another network entity through the transceiver 2003, for example, communicate with the I-SMF 1 shown in FIG. 6. The memory 2002 is configured to store program code and data that are of the first mobility management network element.

When the schematic diagram of the structure shown in FIG. 20 is used to illustrate a structure of the second mobility management network element in the foregoing embodiments, the processor 2001 is configured to control and manage an action of the second mobility management network element. For example, the processor 2001 is configured to perform 1001 and 1002 in FIG. 10, 1201 to 1205 and 1208 in FIG. 12 (where in this case, the second mobility management network element is the AMF), 1402 to 1407, 1409, 1410, and 1412 in FIG. 14 (where in this case, the second mobility management network element is the AMF), and/or an action performed by the second mobility management network element in another process described in the embodiments of this application. The processor 2001 may communicate with another network entity through the transceiver 2003, for example, communicate with the MME shown in FIG. 12. The memory 2002 is configured to store program code and data that are of the second mobility management network element.

When the schematic diagram of the structure shown in FIG. 20 is used to illustrate a structure of the third mobility management network element in the foregoing embodiments, the processor 2001 is configured to control and manage an action of the third mobility management network element. For example, the processor 2001 is configured to perform 1205 to 1209, 1213, and 1214 in FIG. 12 (where in this case, the third mobility management network element is the MME), 1401, 1402, 1406, and 1413 in FIG. 14 (where in this case, the third mobility management network element is the MME), and/or an action performed by the third mobility management network element in another process described in the embodiments of this application. The processor 2001 may communicate with another network entity through the transceiver 2003, for example, communicate with the AMF shown in FIG. 12. The memory 2002 is configured to store program code and data that are of the third mobility management network element.

When the schematic diagram of the structure shown in FIG. 20 is used to illustrate a structure of the fourth mobility management network element in the foregoing embodiments, the processor 2001 is configured to control and manage an action of the fourth mobility management network element. For example, the processor 2001 is configured to perform 1501 to 1503 in FIGS. 15, 1601 to 1605, 1608, and 1609 in FIG. 16 (where in this case, the fourth mobility management network element is the MME), 1701 to 1705 and 1708 to 1711 in FIG. 17 (where in this case, the fourth mobility management network element is the AMF), and/or an action performed by the fourth mobility management network element in another process described in the embodiments of this application. The processor 2001 may communicate with another network entity through the transceiver 2003, for example, communicate with the terminal shown in FIG. 16. The memory 2002 is configured to store program code and data that are of the fourth mobility management network element.

The schematic diagram of the structure shown in FIG. 20 may alternatively be used to illustrate another network element (for example, the NRF, the USS+UDM, or the DNS server) in this application. In this case, each component in FIG. 20 is configured to perform an action of a corresponding network element. For details, refer to the method part for understanding. Details are not described herein again.

In a second possible implementation, the processor 2001 includes a logic circuit and an input interface and/or an output interface. The output interface is configured to perform a sending action in a corresponding method, and the input interface is configured to perform a receiving action in a corresponding method.

Based on the second possible implementation, as shown in FIG. 21, a schematic diagram of a structure shown in FIG. 21 may be used to illustrate a structure of the mobility management network element or the combined intermediate session management network element in the foregoing embodiments.

When the schematic diagram of the structure shown in FIG. 21 is used to illustrate the structure of the combined intermediate session management network element in the foregoing embodiments, the processor 2001 is configured to control and manage an action of the combined intermediate session management network element. For example, the processor 2001 is configured to perform 301 and 302 in FIG. 3, 402 in FIG. 4, 503 in FIG. 5, 604 and 605 in FIG. 6, 704 and 705 in FIG. 7, 804, 805, 806*b*, and 807*b* in FIG. 8, 904 and 905 in FIG. 9, 1209 to 1213 in FIG. 12, 1409 to 1411 in FIG. 14, 1605 to 1608, 1610, and 1612 in FIG. 16, 1705 to 1710, 1712, and 1714 in FIG. 17, 2201 and 2202 in FIG. 22 (where in this case, the combined intermediate session management network element may be the I-SMF+SGW-C+PGW-C+A-SMF), 2302 in FIG. 23 (where in this case, the combined intermediate session management network element may be the I-SMF+SGW-C+PGW-C+A-SMF), 2404, 2405, 2406*b* to 2408*b* in FIG. 24A and FIG. 24B (where in this case, the combined intermediate session management network element may be the I-SMF+SGW-C+PGW-C+A-SMF), and/or an action performed by the combined intermediate session management network element in another process described in the embodiments of this application. The processor 2001 may communicate with another network entity through at least one of the input interface or the output interface, for example, communicate with the NRF in FIG. 3. The memory 2002 is configured to store program code and data that are of the combined intermediate session management network element.

When the schematic diagram of the structure shown in FIG. 21 is used to illustrate a structure of the first mobility management network element in the foregoing embodiments, the processor 2001 is configured to control and manage an action of the first mobility management network element. For example, the processor 2001 is configured to perform 501 and 502 in FIGS. 5, 601 to 605 in FIG. 6 (where in this case, the first mobility management network element is the AMF), 701 to 705 in FIG. 7 (where in this case, the first mobility management network element is the MME), 801 to 807*a* in FIG. 8 (where in this case, the first mobility management network element is the AMF), 901 to 907 in FIG. 9 (where in this case, the first mobility management network element is the MME), 2401 to 2408*a* in FIG. 24A and FIG. 24B (where in this case, the first mobility management network element is the AMF), and/or an action performed by the first mobility management network element in another process described in the embodiments of this application. The processor 2001 may communicate with another network entity through at least one of the input interface or the output interface, for example, communicate with the I-SMF 1 shown in FIG. 6. The memory 2002 is configured to store program code and data that are of the first mobility management network element.

When the schematic diagram of the structure shown in FIG. 21 is used to illustrate a structure of the second mobility management network element in the foregoing embodiments, the processor 2001 is configured to control and manage an action of the second mobility management network element. For example, the processor 2001 is configured to perform 1001 and 1002 in FIG. 10, 1201 to 1205 and 1208 in FIG. 12 (where in this case, the second mobility management network element is the AMF), 1402 to 1407, 1409, 1410, and 1412 in FIG. 14 (where in this case, the second mobility management network element is the AMF), and/or an action performed by the second mobility management network element in another process described in the embodiments of this application. The processor 2001 may communicate with another network entity through at least one of the input interface or the output interface, for example, communicate with the MME shown in FIG. 12. The memory 2002 is configured to store program code and data that are of the second mobility management network element.

When the schematic diagram of the structure shown in FIG. 21 is used to illustrate a structure of the third mobility management network element in the foregoing embodiments, the processor 2001 is configured to control and manage an action of the third mobility management network element. For example, the processor 2001 is configured to perform 1205 to 1209, 1213, and 1214 in FIG. 12 (where in this case, the third mobility management network element is the MME), 1401, 1402, 1406, and 1413 in FIG. 14 (where in this case, the third mobility management network element is the MME), and/or an action performed by the third mobility management network element in another process described in the embodiments of this application. The processor 2001 may communicate with another network entity through at least one of the input interface or the output interface, for example, communicate with the AMF shown in FIG. 12. The memory 2002 is configured to store program code and data that are of the third mobility management network element.

When the schematic diagram of the structure shown in FIG. 21 is used to illustrate a structure of the fourth mobility management network element in the foregoing embodiments, the processor 2001 is configured to control and manage an action of the fourth mobility management network element. For example, the processor 2001 is configured to perform 1501 to 1503 in FIGS. 15, 1601 to 1605, 1608, and 1609 in FIG. 16 (where in this case, the fourth mobility management network element is the MME), 1701 to 1705 and 1708 to 1711 in FIG. 17 (where in this case, the fourth mobility management network element is the AMF), and/or an action performed by the fourth mobility management network element in another process described in the embodiments of this application. The processor 2001 may communicate with another network entity through at least one of the input interface or the output interface, for example, communicate with the terminal shown in FIG. 16. The memory 2002 is configured to store program code and data that are of the fourth mobility management network element.

The schematic diagram of the structure shown in FIG. 21 may alternatively be used to illustrate another network element (for example, the NRF, the USS+UDM, or the DNS server) in this application. In this case, each component in FIG. 21 is configured to perform an action of a corresponding network element. For details, refer to the method part for understanding. Details are not described herein again.

An embodiment of this application further provides a computer-readable storage medium, including instructions. When the instructions are run on a computer, the computer is enabled to perform any one of the foregoing methods.

An embodiment of this application further provides a computer program product including instructions. When the instructions are run on a computer, the computer is enabled to perform any one of the foregoing methods.

An embodiment of this application further provides a communication system, including at least two network elements, for example, the second AMF and the third MME, in the embodiments of this application.

An embodiment of this application further provides a communication method, comprising: when a terminal needs to be migrated from a first network to a second network, obtaining, by a fourth mobility management network element in the second network, information about N intermediate session management network elements that are capable of serving the terminal in the second network; obtaining, by the fourth mobility management network element from a subscriber data management network element, information about M intermediate session management network elements that serve the terminal in the first network; and if a session created by the terminal on the fourth mobility management network element is the 1st session, determining, by the fourth mobility management network element based on types of the N intermediate session management network elements and the M intermediate session management network elements, an intermediate session management network element corresponding to the 1st session, wherein the types comprise an independent intermediate session management network element and a combined intermediate session management network element, the combined intermediate session management network element is capable of providing session management in the first network and is capable of providing session management in the second network, and the independent intermediate session management network element is capable of providing session management only in either one of the first network and the second network.

In one or more aspects of the communication method, the determining, by the fourth mobility management network element based on types of the N intermediate session management network elements and the M intermediate session management network elements, an intermediate session management network element corresponding to the 1st session comprises: if there is a combined intermediate session management network element belonging to both the M intermediate session management network elements and the N intermediate session management network elements, selecting, by the fourth mobility management network element, the combined intermediate session management network element belonging to both the M intermediate session management network elements and the N intermediate session management network elements as the intermediate session management network element corresponding to the 1st session; or if the M intermediate session management network elements do not comprise the combined intermediate session management network element, or the M intermediate session management network elements comprise the combined intermediate session management network element but the combined intermediate session management network element in the M intermediate session management network elements does not belong to the N intermediate session management network elements, preferentially selecting, by the fourth mobility management network element, a combined intermediate session management network element in the N intermediate session management network elements as the intermediate session management network element corresponding to the 1st session.

In one or more aspects of the communication method, the first network is a 4th generation 4G network and the second network is a 5th generation 5G network, and the method further comprises: if the session created by the terminal on the fourth mobility management network element is not the 1st session, preferentially selecting, by the fourth mobility management network element, a combined intermediate session management network element in an intermediate session management network element corresponding to a session that has been established by the terminal on the fourth mobility management network element as an intermediate session management network element corresponding to the created session.

An embodiment of this application further provides a communication apparatus, wherein the apparatus is located in a first network and comprises: an obtaining unit, configured to obtain information about N intermediate session management network elements that are capable of serving a terminal in the first network, wherein the N intermediate session management network elements comprise a combined intermediate session management network element, the combined intermediate session management network element is capable of providing session management in the first network and is capable of providing session management in a second network, and N is an integer greater than 0; and a determining unit, configured to determine that the combined intermediate session management network element is a first intermediate session management network element corresponding to a first session of the terminal in the first network.

In one or more aspects of the communication apparatus, the first network is a 5th generation 5G network, the second network is a 4th generation 4G network, and the first session is the 1st session established by the terminal on the apparatus; or an intermediate session management network element corresponding to a session that has been established by the terminal on the apparatus is not the combined intermediate session management network element.

In one or more aspects of the communication apparatus, the first network is a 5G network and the second network is a 4G network; and the determining unit is specifically configured to: when an intermediate session management network element corresponding to at least one session that has been established by the terminal on the apparatus is the combined intermediate session management network element, determine that the combined intermediate session management network element is the first intermediate session management network element corresponding to the first session.

In one or more aspects of the communication apparatus, the first network is a 4G network and the second network is a 5G network, and the first session is the 1st session established by the terminal on the apparatus.

An embodiment of this application further provides a communication apparatus, wherein the apparatus is located in a first network and comprises: an obtaining unit, configured to: when a terminal needs to be migrated from a source network to a target network, obtain information about N intermediate session management network elements corresponding to a session of the terminal in the source network, wherein the information about the N intermediate session management network elements is used to indicate a type of each of the N intermediate session management network elements, the type comprises an independent intermediate session management network element or a combined intermediate session management network element, the combined intermediate session management network element is capable of providing session management in the first network and is capable of providing session management in a second network, the independent intermediate session management network element is capable of providing session management only in either one of the first network and the second network; the source network is the first network and the target network is the second network, or the source network is the second network and the target network is the first network; and N is an integer greater than 0; and a determining unit, configured to determine, based on the types of the N intermediate session management network elements, a second intermediate session management network element corresponding to a session of the terminal in the target network.

In one or more aspects of the communication apparatus, the source network is the first network, the first network is a 5th generation 5G network, the target network is the second network, and the second network is a 4th generation 4G network; and the determining unit is specifically configured to: if the N intermediate session management network elements comprise the combined intermediate session management network element, select the combined intermediate session management network element in the N intermediate session management network elements as the second intermediate session management network element corresponding to the session of the terminal in the second network.

In one or more aspects of the communication apparatus, the source network is the second network, the second network is a 4G network, the target network is the first network, the first network is a 5G network, and N=1; and the obtaining unit is further configured to obtain information about M intermediate session management network elements that are capable of serving the terminal in the first network, wherein the information about the M intermediate session management network elements is used to indicate a type of each of the M intermediate session management network elements; and the determining unit is specifically configured to determine, based on the types of the N intermediate session management network elements and the types of the M intermediate session management network elements, the second intermediate session management network element corresponding to a second session of the terminal in the first network.

An embodiment of this application further provides a communication apparatus, wherein the apparatus is located in a second network and comprises: a communication unit, configured to receive a relocation request from a second mobility management network element in a first network, wherein the relocation request comprises information about a second intermediate session management network element and indication information, the second intermediate session management network element is an intermediate session management network element that is determined by the second mobility management network element for a terminal and that corresponds to a session of the terminal in the second network, the indication information is used to indicate that the second intermediate session management network element is a combined intermediate session management network element, and the combined intermediate session management network element is capable of providing session management in the first network and is capable of providing session management in the second network; and a processing unit, configured to obtain information about M intermediate session management network elements that are capable of serving the terminal in the second network, wherein the processing unit is further configured to determine, based on the relocation request and the M intermediate session management network elements, that one combined intermediate session management network element is the intermediate session management network element corresponding to the session of the terminal in the second network.

An embodiment of this application further provides a communication apparatus, wherein the apparatus is located in a second network and comprises: an obtaining unit, configured to: when a terminal needs to be migrated from a first network to the second network, obtain information about N intermediate session management network elements that are capable of serving the terminal in the second network, wherein the obtaining unit is further configured to obtain, from a subscriber data management network element, information about M intermediate session management network elements that serve the terminal in the first network; and a determining unit, configured to: if a session created by the terminal on the apparatus is the 1st session, determine, based on types of the N intermediate session management network elements and the M intermediate session management network elements, an intermediate session management network element corresponding to the 1st session, wherein the types comprise an independent intermediate session management network element and a combined intermediate session management network element, the combined intermediate session management network element is capable of providing session management in the first network and is capable of providing session management in the second network, and the independent intermediate session management network element is capable of providing session management only in either one of the first network and the second network.

In one or more aspects of the communication apparatus, the determining unit is specifically configured to: if there is a combined intermediate session management network element belonging to both the M intermediate session management network elements and the N intermediate session management network elements, select the combined intermediate session management network element belonging to both the M intermediate session management network elements and the N intermediate session management network elements as the intermediate session management network element corresponding to the 1st session; and the determining unit is specifically configured to: if the M intermediate session management network elements do not comprise the combined intermediate session management network element, or the M intermediate session management network elements comprise the combined intermediate session management network element but the combined intermediate session management network element in the M intermediate session management network elements does not belong to the N intermediate session management network elements, preferentially select a combined intermediate session management network element in the N intermediate session management network elements as the intermediate session management network element corresponding to the 1st session.

All or some of the foregoing embodiments may be implemented using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), solid state disk, etc.), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to example features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, comprising:
obtaining, by a second mobility management network element in a first network, first information about N intermediate session management network elements when a terminal is to be migrated from a source network to a target network, wherein the N intermediate session management network elements correspond to a source session of the terminal in the source network, wherein the first information indicates a type of each of the N intermediate session management network elements, wherein the type comprises an independent intermediate session management network element or a combined intermediate session management network element, wherein the combined intermediate session management network element is configured to provide session management in the first network and in a second network, wherein the independent intermediate session management network element is configured to provide session management only in either the first network or the second network, wherein the source network is the first network, wherein the target network is the second network, and wherein N is an integer greater than 0; and determining, by the second mobility management network element based on the type of each of the N intermediate session management network elements, a second intermediate session management network element corresponding to a target session of the terminal in the target network, wherein determining the second intermediate session management network element comprises selecting, by the second mobility management network element when the N intermediate session management network elements comprise the combined intermediate session management network element, the combined intermediate session management network element in the N intermediate session management network elements as the second intermediate session management network element corresponding to a session of the terminal in the second network.

2. The communication method of claim 1, further comprising sending, by the second mobility management network element, a relocation request to a third mobility management network element in the second network, wherein the relocation request comprises second information about the second intermediate session management network element and indication information, and wherein the indication information indicates that the second intermediate session management network element is the combined intermediate session management network element.

3. The communication method of claim 2, wherein the second network is a 4th generation (4G) network, and wherein the indication information is a node name of the combined intermediate session management network element when the combined intermediate session management network element serves as the intermediate session management network element in the 4G network.

4. The communication method of claim 2, wherein the second network is a 4th generation (4G) network, wherein the combined intermediate session management network element further combines an anchor session management network element in the 4G network, wherein the indication information is a first node name of the combined intermediate session management network element when the combined intermediate session management network element serves as the intermediate session management network element in the 4G network, and wherein the first node name is associated with a second node name of the combined intermediate session management network element when the combined intermediate session management network element serves as the anchor session management network element in the 4G network.

5. The communication method of claim 1, wherein the first network is a 5th generation (5G) network.

6. The communication method of claim 1, wherein the second network is a 4th generation (4G).

7. A communication method, comprising:
obtaining, by a second mobility management network element in a first network, first information about N intermediate session management network elements when a terminal is to be migrated from a source network to a target network, wherein the N intermediate session management network elements correspond to a source session of the terminal in the source network, wherein the first information indicates a type of each of the N intermediate session management network elements, wherein the type comprises an independent intermediate session management network element or a combined intermediate session management network element, wherein the combined intermediate session management network element is configured to provide session management in the first network and in a second network, wherein the independent intermediate session management network element is configured to provide session management only in either the first network or the second network, wherein the source network is the second network, wherein the target network is the first network, and wherein N=1;

determining, by the second mobility management network element based on the type of each of the N intermediate session management network elements, a second intermediate session management network element corresponding to a target session of the terminal in the target network; and obtaining, by the second mobility management network element, second information about M intermediate session management network elements configured to serve the terminal in the first network, wherein the second information indicates a type of each of the M intermediate session management network elements, wherein determining the second intermediate session management network element comprises determining, by the second mobility management network element based on the type of each of the N intermediate session management network elements and the type of each of the M intermediate session management network elements, the second intermediate session management network element corresponding to a second session of the terminal in the first network.

8. The communication method of claim 7, wherein determining the second intermediate further comprises: comprises preferentially selecting, by the second mobility management network element from the M intermediate session management network elements, the combined intermediate session management network element as the second intermediate session management network element when the N intermediate session management network elements comprise the combined intermediate session management network element and the combined intermediate session management network element belongs to the M intermediate session management network elements.

9. The communication method of claim 8, further comprising sending, by the second mobility management network element, a request message to the combined intermediate session management network element, wherein the request message requests the combined intermediate session management network element to update the second session, and wherein the request message comprises a session identifier allocated by the combined intermediate session management network element to the terminal in the second network.

10. The communication method of claim 7, wherein the second network is a 4th generation (4G) network.

11. The communication method of claim 7, wherein the first network is a 5th generation (5G) network.

12. The communication method of claim 7, wherein determining the second intermediate session management network element further comprises preferentially selecting, by the second mobility management network element from the M intermediate session management network elements, the combined intermediate session management network element as the second intermediate session management network element when the N intermediate session management network elements do not comprise the combined intermediate session management network element.

13. The communication method of claim 12, further comprising sending, by the second mobility management network element, a request message to the combined intermediate session management network element, wherein the request message requests the combined intermediate session management network element to update the second session, and wherein the request message comprises a session identifier allocated by the combined intermediate session management network element to the terminal in the second network.

14. The communication method of claim 7, wherein determining the second intermediate session management network element further comprises preferentially selecting, by the second mobility management network element from the M intermediate session management network elements, the combined intermediate session management network element as the second intermediate session management network element when the N intermediate session management network elements comprise the combined intermediate session management network element but the combined intermediate session management network element does not belong to the M intermediate session management network elements.

15. The communication method of claim 14, further comprising sending, by the second mobility management network element, a request message to the combined intermediate session management network element, wherein the request message requests the combined intermediate session management network element to update the second session, and wherein the request message comprises a session identifier allocated by the combined intermediate session management network element to the terminal in the second network.

16. A communication system, comprising:
a second mobility management network element in a first network and configured to send a relocation request; and
a third mobility management network element in a second network, wherein the third mobility management network element is configured to:
receive the relocation request from the second mobility management network element, wherein the relocation request comprises second information about a second intermediate session management network element and indication information, wherein the second intermediate session management network element is an intermediate session management network element that is for a terminal and that corresponds to a session of the terminal in the second network, wherein the indication information indicates that the second intermediate session management network element is a combined intermediate session management network element configured to provide session management in the first network and in the second network;
obtain first information about M intermediate session management network elements that are configured to serve the terminal in the second network; and
determine, based on the relocation request and the M intermediate session management network elements, that one combined intermediate session management network element is the intermediate session management network element corresponding to the session of the terminal in the second network.

17. The communication system of claim 16, wherein the indication information is a node name of the combined intermediate session management network element when the combined intermediate session management network element serves as the intermediate session management network element in a 4th generation (4G) network.

18. The communication system of claim 16, wherein the combined intermediate session management network element further combines an anchor session management network element in a 4th generation (4G) network, wherein the indication information is a first node name of the combined intermediate session management network element when the combined intermediate session management network element serves as the intermediate session management network element in the 4G network, and wherein the first node name is associated with a second node name of the combined intermediate session management network element when the combined intermediate session management network element serves as the anchor session management network element in the 4G network.

19. The communication system of claim 16, wherein the third mobility management network element is further configured such that when the second intermediate session management network element belongs to the M intermediate session management network elements, the third mobility management network element determines that the second intermediate session management network element is the intermediate session management network element.

20. The communication system of claim 16, wherein the third mobility management network element is further configured such that when the second intermediate session management network element does not belong to the M intermediate session management network elements, the third mobility management network element determines that one combined intermediate session management network element in the M intermediate session management network elements is the intermediate session management network element corresponding to the session of the terminal in the second network.

* * * * *